*(12)* United States Patent
Xu et al.

(10) Patent No.: US 12,418,587 B2
(45) Date of Patent: Sep. 16, 2025

(54) PACKET TRANSMISSION METHOD AND RELATED APPARATUS

(71) Applicant: HUAWEI TECHNOLOGIES CO., LTD., Guangdong (CN)

(72) Inventors: Yishan Xu, Shanghai (CN); Hualin Zhu, Shanghai (CN); Haoren Zhu, Shanghai (CN); Yu Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/521,252

(22) Filed: Nov. 28, 2023

(65) Prior Publication Data

US 2024/0098145 A1    Mar. 21, 2024

Related U.S. Application Data

(63) Continuation of application No. PCT/CN2021/097471, filed on May 31, 2021.

(51) Int. Cl.
*H04L 12/24*       (2006.01)
*H04L 41/0803*     (2022.01)
(Continued)

(52) U.S. Cl.
CPC .......... *H04L 67/12* (2013.01); *H04L 67/564* (2022.05); *H04W 76/12* (2018.02); *H04W 76/11* (2018.02); *H04W 80/08* (2013.01)

(58) Field of Classification Search
CPC ...... H04L 67/12; H04L 67/564; H04W 80/08; H04W 76/11; H04W 76/12; H04W 4/80; H04W 4/70
(Continued)

(56) References Cited

U.S. PATENT DOCUMENTS 8,937,942 B1 *   1/2015   Li ........................... H04L 69/22
                                                                                 709/227
2006/0276213 A1 *   12/2006   Gottschalk .............. H04W 4/10
                                                                               455/518
(Continued)

FOREIGN PATENT DOCUMENTS

EP            3756336 A1     12/2020

OTHER PUBLICATIONS

3rd Generation Partnership Project; Technical Specification Group Services and System Aspects; Study on Cellular Internet of Things (CIoT) support and evolution for the 5G System (5GS) (Release 16), 3GPP Standard; Technical Report; 3GPP TR 23.724, 3rd Generation Partnership Project (3GPP), Mobile Competence Centre ; 650, route des Lucioles ; F-06921 Sophia-Antipolis Cedex ; France, vol. SA WG2, No. V16_1.0, Jun. 11, 2019, pp. 1-274, XP051753964.

(Continued)

*Primary Examiner* — Ario Etienne
*Assistant Examiner* — Elizabeth Kassa
(74) *Attorney, Agent, or Firm* — WOMBLE BOND DICKINSON (US) LLP

(57) ABSTRACT

Embodiments of this application disclose a packet transmission method and a related apparatus. An access network device receives a first packet from an Internet-of-things (IoT) function network element; the access network device obtains first information, where the first information indicates that the first packet includes a passive or semi-active IoT instruction; and the access network device performs a passive or semi-active IoT operation based on the first packet. According to the foregoing method, the access network device learns that the packet from the IoT function network element is related to a passive or semi-active internet of things, and the access network device performs (Continued)

the passive or semi-active IoT operation based on the first packet. This resolves a packet transmission problem in a scenario in which a passive or semi-active IoT system is converged with a cellular network.

19 Claims, 18 Drawing Sheets

(51) Int. Cl.
  *H04L 67/12* (2022.01)
  *H04L 67/564* (2022.01)
  *H04W 4/70* (2018.01)
  *H04W 76/12* (2018.01)
  *H04W 76/11* (2018.01)
  *H04W 80/08* (2009.01)

(58) Field of Classification Search
  USPC .......................................................... 709/201
  See application file for complete search history.

(56) References Cited

U.S. PATENT DOCUMENTS

| | | | | |
|---|---|---|---|---|
| 2007/0206705 A1* | 9/2007 | Stewart | ..................... | H04B 1/59 375/316 |
| 2009/0092064 A1* | 4/2009 | Fan | ........................ | H04L 45/02 370/255 |
| 2009/0323703 A1* | 12/2009 | Bragagnini | ......... | H04L 63/0209 370/401 |
| 2015/0347791 A1* | 12/2015 | Desai | .................. | G06K 19/0717 340/10.1 |
| 2016/0004953 A1* | 1/2016 | Karani | ............. | G06K 19/07758 235/492 |
| 2017/0285623 A1 | 10/2017 | Figoli et al. | | |
| 2019/0200405 A1* | 6/2019 | Gupta | ..................... | H04W 4/70 |
| 2019/0386880 A1* | 12/2019 | Dhanabalan | ............ | H04L 67/12 |
| 2020/0053636 A1* | 2/2020 | Mas Rosique | ........ | H04W 48/18 |
| 2020/0280771 A1* | 9/2020 | Hoang | .................. | G01D 4/002 |
| 2021/0012071 A1* | 1/2021 | Lopez | ................ | G06K 7/10029 |
| 2022/0180014 A1* | 6/2022 | Barr | ........................ | H04W 4/70 |

OTHER PUBLICATIONS

3GPP TS 23.316 V16.6.0 (Dec. 2020), 3rd Generation Partnership Project; Technical Specification Group Services and System Aspects; Wireless and wireline convergence access support for the 5G System (5GS) (Release 16), total 83 pages.

3GPP TS 23.502 V17.0.0 (Mar. 2021), 3rd Generation Partnership Project; Technical Specification Group Services and System Aspects; Procedures for the 5G System (5GS); Stage 2 (Release 17), total 646 pages.

* cited by examiner

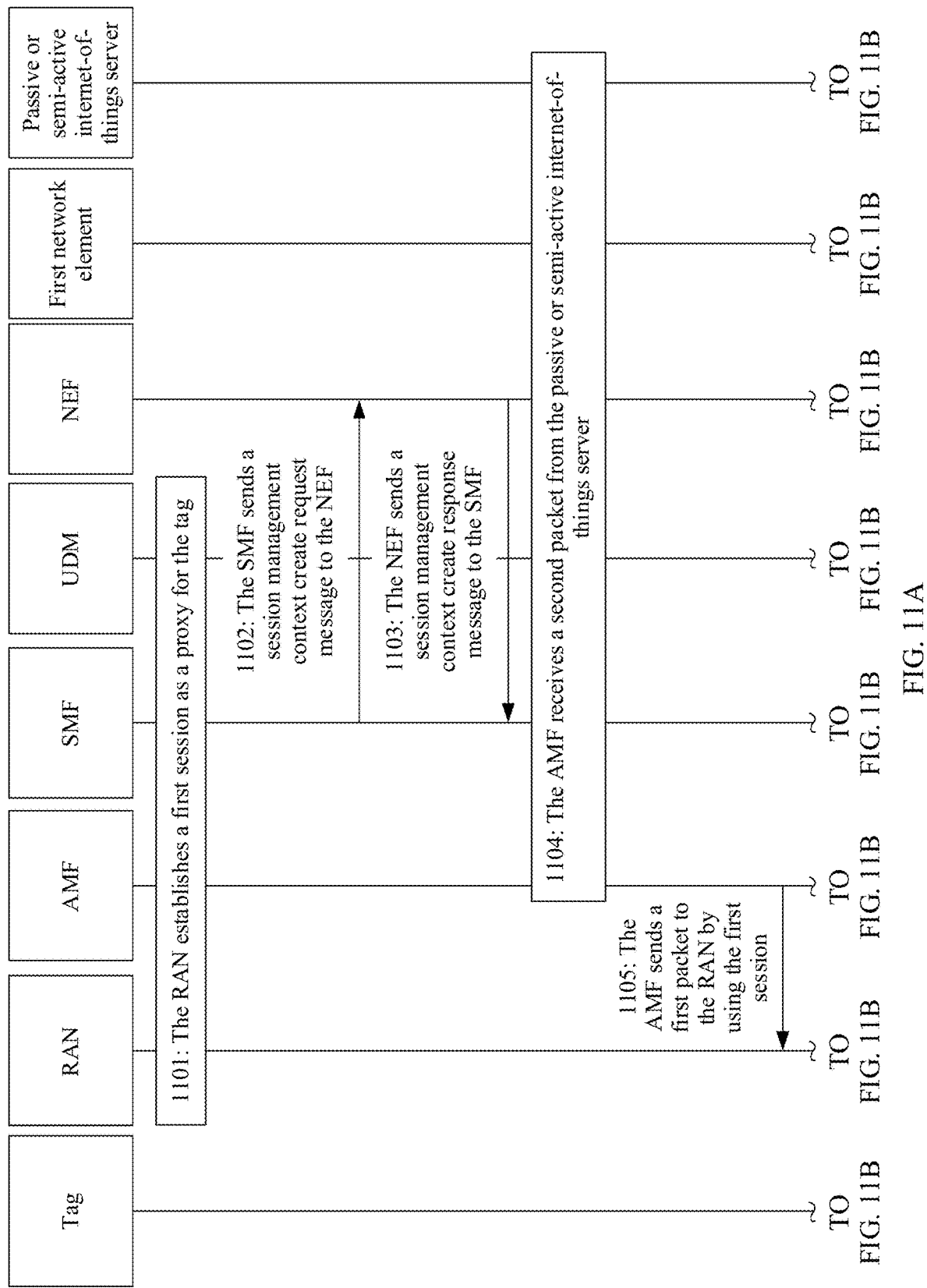

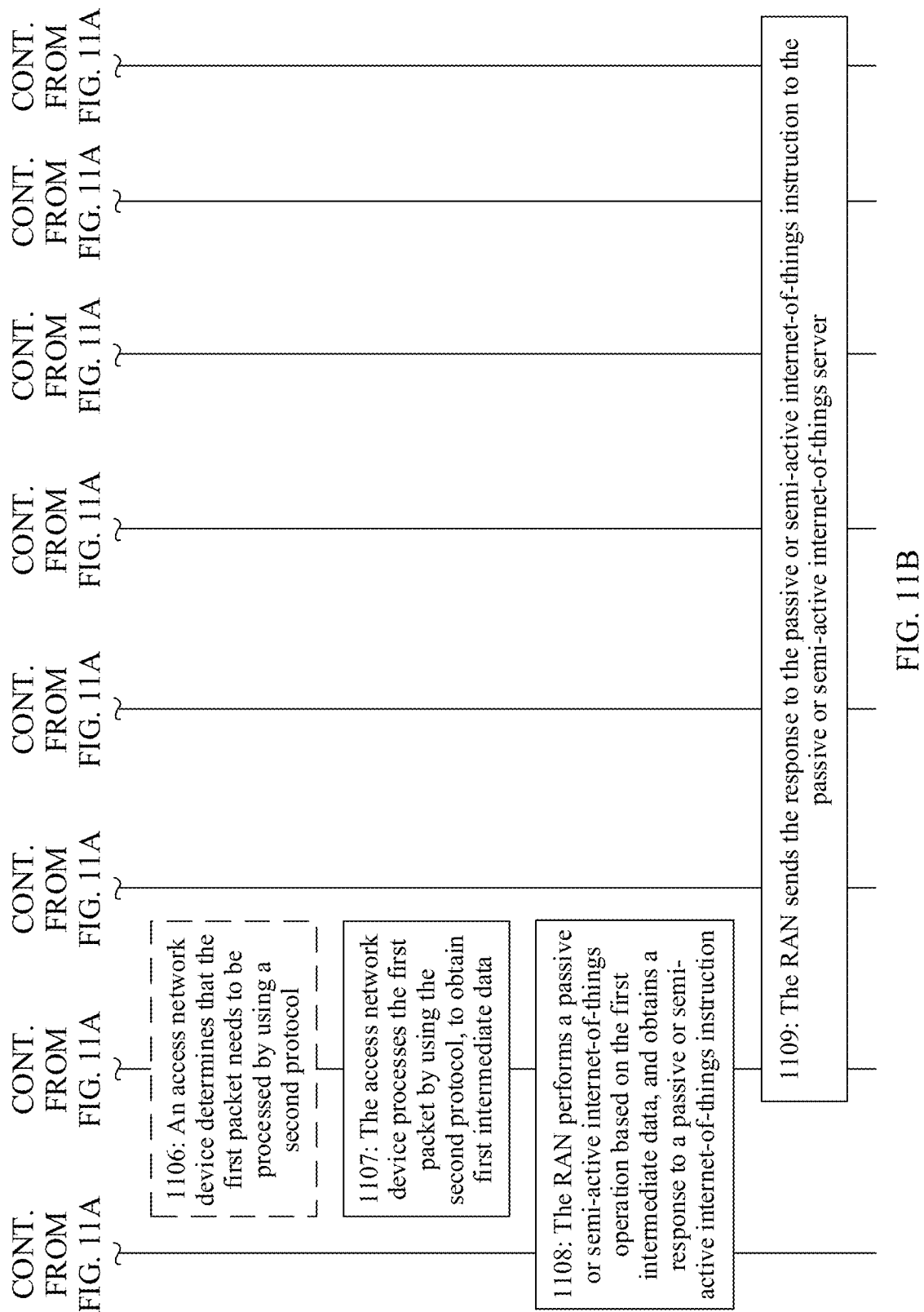

PACKET TRANSMISSION METHOD AND RELATED APPARATUS

CROSS-REFERENCE TO RELATED APPLICATIONS

This application is a continuation of International Application No. PCT/CN2021/097471, filed on May 31, 2021, the disclosure of which is hereby incorporated by reference in its entirety.

TECHNICAL FIELD

This application relates to the field of communication technologies, and in particular, to a packet transmission method and a related apparatus.

BACKGROUND

A passive or semi-active internet-of-things (IoT) technology is one of automatic identification technologies. A reader performs non-contact bidirectional data communication in a radio frequency manner, and reads and writes an electronic tag or a radio frequency card in the radio frequency manner, to identify a target and exchange data.

A passive or semi-active IoT system includes a passive or semi-active IoT tag and a passive or semi-active IoT reader. Optionally, the passive or semi-active IoT system may further include middleware (e.g., Filtering & Collection) and a server. The passive or semi-active IoT reader and the middleware use a low level reader protocol (LLRP). A protocol between the middleware and the server is an application level event (ALE) protocol.

To reduce costs, a cellular network may be used to support a passive or semi-active IoT application. In this case, the cellular network needs to integrate passive or semi-active IoT technologies (or passive or semi-active IoT network architectures).

SUMMARY

Embodiments of this application provide a packet transmission method and a related apparatus, so that a cellular network can support processing of a passive or semi-active IoT application packet.

According to a first aspect, a packet transmission method is provided. An access network device receives a first packet from an IoT function network element; the access network device obtains first information, where the first information indicates that the first packet includes a passive or semi-active IoT instruction; and the access network device performs a passive or semi-active IoT operation based on the first packet.

Specifically, the first information may be sent by the IoT function network element to the access network device. Alternatively, the first information may be obtained by the access network device from the IoT function network element, or the first information may be obtained by the access network device from context information. This is not limited herein. Optionally, the first packet may include the first information, or the first packet and the first information may be independent of each other. This is not limited herein.

It should be noted that the packet in this embodiment of this application may also be referred to as a data packet, signaling, an instruction, or the like. This is not limited herein.

In an embodiment of this application, the access network device obtains the first information from the IoT function network element (or the access network device obtains the first information from the context information), and the first information indicates that the first packet includes the passive or semi-active IoT instruction. According to the foregoing method, the access network device learns that the packet from the IoT function network element is related to a passive or semi-active internet of things, and the access network device performs the passive or semi-active IoT operation based on the first packet. This resolves a packet transmission problem in a scenario in which a passive or semi-active IoT system is converged with a cellular network. In this way, the cellular network can parse a passive or semi-active IoT application packet, and can perform a related operation based on the application packet.

In an embodiment, the first information includes one or more of the following: a message type of the first packet, a container type of the first packet, or tunnel identifier information of the first packet. Alternatively, the first information is an information type of the first packet, a session type of a first session, or a session identifier of the first session. The first session is used to transmit the first packet, the session type of the first session is the passive or semi-active internet of things, and the session identifier of the first session indicates that the first session is related to the passive or semi-active internet of things.

In an embodiment, the message type of the first packet may be a message type field in a packet header of the first packet. The container type of the first packet may be a newly added container type in the first packet. The tunnel identifier information of the first packet is tunnel identifier information of the access network device, such as a radio access network (RAN) device simply referred to as RAN, regarding the first session, namely, an endpoint identifier of an N3 tunnel when the RAN establishes the first session. The IoT function network element determines the session type of the first session by using the tunnel identifier information. The information type of the first packet is an information type field that is newly added to the first packet and that indicates the first packet. This embodiment of this application provides a plurality of implementation solutions of the first information, thereby improving implementation flexibility of the solutions.

In an embodiment, the access network device processes the first packet based on the first information by using a second protocol, to obtain the passive or semi-active IoT instruction. In an embodiment, the second protocol is a low level reader protocol (LLRP). The passive or semi-active IoT instruction includes an event cycle specification (ECSpecs) instruction or a command cycle specification (CCSpecs) instruction. The event cycle specification instruction or the command cycle specification instruction includes a tag range that needs to be inventoried, or a tag range on which a read operation or a write operation needs to be performed.

In an embodiment, the access network device obtains a response to the passive or semi-active IoT instruction. The access network device processes the response to the passive or semi-active IoT instruction by using the second protocol, to generate a third packet. The access network device sends the third packet to the IoT function network element.

In an embodiment, the RAN performs the passive or semi-active IoT operation according to the passive or semi-active IoT instruction included in first intermediate data, and obtains the response to the passive or semi-active IoT instruction. For example, the passive or semi-active IoT operation includes but is not limited to a tag read/write operation, a tag inventory operation, and the like. The response to the passive or semi-active IoT instruction includes but is not limited to read data of a tag, an inventory operation result of a tag, or the like. The RAN processes the response to the passive or semi-active IoT instruction by using the second protocol, to obtain the third packet. Specifically, first, the RAN processes the response to the passive or semi-active IoT instruction, to obtain a message packet including the response to the passive or semi-active IoT instruction. Then, the RAN further encapsulates the message packet to obtain the third packet. The third packet includes the response to the passive or semi-active IoT instruction.

In this embodiment of this application, according to the foregoing method, the access network device notifies the IoT function network element that the third packet is related to the passive or semi-active internet of things, and the IoT function network element obtains the response to the passive or semi-active IoT instruction based on the third packet. This resolves a packet transmission problem in a scenario in which a passive or semi-active IoT system is converged with a cellular network.

In an embodiment, the access network device sends second information to the IoT function network element. The second information indicates that the third packet is related to the passive or semi-active internet of things, or that the third packet needs to be processed by using the second protocol.

Specifically, in this embodiment of this application, information indicating that the third packet is related to the passive or semi-active internet of things, or indicating that the third packet needs to be processed by using the second protocol is referred to as the second information. The second information may be sent by the access network device to the IoT function network element, or the second information may be obtained by the IoT function network element or from the access network device. This is not limited herein. In an embodiment, the third packet may include the second information, or the third packet and the second information may be independent of each other. This is not limited herein. Further, the second information includes one or more of the following: a message type of the third packet, a container type of the third packet, or tunnel identifier information of the third packet. Alternatively, the second information is an information type of the third packet.

In an embodiment of this application, the access network device notifies the IoT function network element by using the second information, and the third packet is related to the passive or semi-active internet of things, so that the IoT function network element efficiently processes the third packet. This embodiment of this application provides a plurality of implementation solutions of the second information, thereby improving implementation flexibility of the solutions.

In an embodiment, the second information includes one or more of the following: the message type of the third packet, the container type of the third packet, or the tunnel identifier information of the third packet. Alternatively, the second information is the information type of the third packet, the information type of the third packet, the session type of the first session, or the session identifier of the first session. The first session is used to transmit the first packet, the session type of the first session is the passive or semi-active internet of things, and the session identifier of the first session indicates that the first session is related to the passive or semi-active internet of things.

In an embodiment, the message type of the third packet may be a message type field in a packet header of the third packet. The container type of the third packet may be a newly added container type in the third packet. The tunnel identifier information of the third packet is tunnel identifier information of the RAN regarding the first session, namely, an endpoint identifier of the N3 tunnel when the RAN establishes the first session. The IoT function network element determines the session type of the first session by using the tunnel identifier information. The information type of the third packet is an information type field that is newly added to the third packet and that indicates the third packet. This embodiment of this application provides a plurality of implementation solutions of the second information, thereby improving implementation flexibility of the solutions.

In an embodiment, when receiving a first packet from an IoT function network element, the access network device sends a request message, where the request message is for establishing the first session, and the session type of the first session is the passive or semi-active internet of things, or the session identifier of the first session indicates that the first session is related to the passive or semi-active internet of things. The access network device receives, by using the first session, the first packet sent by the IoT function network element.

For example, the request message is a protocol data unit (PDU) session establishment request message (PDU session establishment request) sent by the RAN to an AMF. The PDU session establishment request message is for establishing the first session. The session type of the first session is the passive or semi-active internet of things, or the session identifier of the first session indicates that the first session is related to the passive or semi-active internet of things.

In an embodiment, the PDU session establishment request message includes PDU session type information. The PDU session type information indicates that the session type of the first session is the passive or semi-active internet of things, or the PDU session type information indicates that the first session transmits data related to the passive or semi-active internet of things.

In an embodiment, the RAN sends the session type of the first session to the AMF during establishing a PDU session. Specifically, the session type of the first session is also referred to as PDU session type information. The AMF obtains the PDU session type information in a plurality of manners. For example, the RAN sends the PDU session type information to the AMF by using a non-access stratum NAS message, or the RAN sends the PDU session type information to the AMF by using an N2 message. Alternatively, the AMF obtains the PDU session type information from subscription data of the RAN. Alternatively, the AMF obtains the PDU session type information from data stored in the AMF. This is not limited herein. The first session may be used to transmit the first packet sent by the IoT function network element to a RAN, thereby improving implementation flexibility of the solutions.

In an embodiment, the access network device sends the third packet to the IoT function network element by using the first session. The first session may be further used to transmit the third packet sent by the RAN to the IoT function network element, thereby improving implementation flexibility of the solutions.

In an embodiment, the first information further includes the session type of the first session or the session identifier of the first session. In this embodiment of this application, the access network device may determine, based on the session type of the first session or the session identifier of the first session, that the first packet transmitted in the first session includes the passive or semi-active IoT instruction.

In an embodiment, the second information further includes the session type of the first session or the session identifier of the first session. In this embodiment of this application, the access network device may determine, based on the session type of the first session or the session identifier of the first session, that the third packet transmitted in the first session is related to the passive or semi-active internet of things.

In an embodiment, the IoT function network element includes: a user plane function (UPF), the access and mobility management function (AMF), a session management function (SMF), a network repository function (NRF), or a first network element.

According to a second aspect, an embodiment of this application provides a packet transmission method. An IoT function network element sends a first packet to an access network device, where the first packet includes a passive or semi-active IoT instruction; and the IoT function network element sends first information to the access network device, where the first information indicates that the first packet includes the passive or semi-active IoT instruction, to enable the access network device to perform a passive or semi-active IoT operation.

Specifically, the first information may be sent by the IoT function network element to the access network device. Alternatively, the first information may be obtained by the access network device from the IoT function network element, or the first information may be obtained by the access network device from context information. This is not limited herein. Optionally, the first packet may include the first information, or the first packet and the first information may be independent of each other. This is not limited herein.

In an embodiment of this application, first, the access network device receives the first packet sent by the IoT function network element. Then, the access network device obtains the first information. Specifically, the access network device obtains the first information from the first packet. That is, the first packet includes the first information. Alternatively, the access network device obtains the first information from the IoT function network element or another network element. For example, the access network device obtains, from the IoT function network element (or the access network device obtains, from the context information), related information of a first session (including a session identifier of the first session or a session type of the first session) for transmitting the first packet. The first information is related information of the first session. According to the foregoing method, the access network device learns that the packet from the IoT function network element is related to the passive or semi-active internet of things, and the access network device performs the passive or semi-active IoT operation based on the first packet. This resolves a packet transmission problem in a scenario in which a passive or semi-active IoT system is converged with a cellular network. In this way, the cellular network can parse a passive or semi-active IoT application packet, and can perform a related operation based on the application packet.

In an embodiment, the IoT function network element includes: a UPF, an AMF, an SMF, an NRF, or a first network element.

In an embodiment, the IoT function network element receives a second packet from a passive or semi-active IoT server. The IoT function network element generates the first packet based on the second packet, where the first packet includes the passive or semi-active IoT instruction included in the second packet. The IoT function network element sends the first packet to the access network device. Specifically, the IoT function network element determines, based on a packet header of the second packet, that the second packet is from the passive or semi-active IoT server. Alternatively, the IoT function network element transmits a related identifier of a session of the second packet, and determines whether the second packet is from the passive or semi-active IoT server. After determining that the second packet is from the passive or semi-active IoT server, the IoT function network element determines that the second packet includes the passive or semi-active IoT instruction. Therefore, the IoT function network element generates the first packet based on the second packet, to ensure that the access network device obtains the passive or semi-active IoT instruction.

In an embodiment, the IoT function network element processes the second packet by using a first protocol, to generate first intermediate data. The IoT function network element processes the first intermediate data by using a second protocol, to generate the first packet. Specifically, the IoT function network element processes (or parses) the second packet by using the first protocol, and data obtained through processing is referred to as the first intermediate data. Then, the IoT function network element processes the first intermediate data by using the second protocol, to generate the first packet. In an embodiment, the first protocol is an application level event (ALE) protocol. In an embodiment, the second protocol is a low level reader protocol (LLRP). The IoT function network element may process the second packet and generate the first packet, thereby improving implementation flexibility of the solutions.

In an embodiment, the IoT function network element sends the second packet to the first network element. The IoT function network element receives second intermediate data sent by the first network element, where the second intermediate data is data obtained by the first network element processing the second packet by using the first protocol and the second protocol. The IoT function network element processes the second intermediate data, to generate the first packet. The IoT function network element may collaborate with another network element (for example, the first network element) to process the second packet and generate the first packet, thereby improving implementation flexibility of the solutions.

In an embodiment, the IoT function network element receives a third packet from the access network device. The IoT function network element obtains second information, where the second information indicates that the third packet is related to the passive or semi-active internet of things, or that the third packet needs to be processed by using the second protocol. The IoT function network element processes the third packet based on the second information by using the second protocol, to generate a fourth packet. The third packet and the fourth packet include responses to the passive or semi-active IoT instruction obtained by the access network device.

In an embodiment, the third packet is a response to the first packet. After receiving the third packet, the IoT function network element determines, based on the second information (for example, a message type of the third packet or a packet header of the third packet), that the third packet needs to be processed by using the second protocol. In still another embodiment, after receiving the third packet, the IoT function network element determines, based on identifier information of the first session, the session identifier of the first session, or the session type of the first session, that the third packet transmitted in the first session includes the response to the passive or semi-active IoT instruction. Then, the IoT function network element determines that the third packet needs to be processed by using the second protocol. For example, the second protocol is the LLRP protocol. First, the IoT function network element processes (or parses) the third packet by using the LLRP protocol, to obtain the response to the passive or semi-active IoT instruction. Then, the IoT function network element processes the response to the passive or semi-active IoT instruction by using the first protocol (for example, the ALE protocol), to generate the fourth packet. The IoT function network element may send the fourth packet to the passive or semi-active IoT server. The fourth packet carries a response including the passive or semi-active IoT instruction. The IoT function network element may efficiently identify, based on the second information, a response that carries the passive or semi-active IoT instruction in the third packet, and process the third packet by using the second protocol, to generate the fourth packet. The IoT function network element sends the fourth packet to the passive or semi-active IoT server, to improve working efficiency of the passive or semi-active IoT system.

In an embodiment, the IoT function network element is the user plane function. That the user plane function generates the first packet based on the second packet includes: The user plane function generates the first packet based on the second packet according to a first rule and/or a second rule. The first rule and/or the second rule are/is configured by the session management function SMF or the first rule and/or the second rule are/or pre-configured in the user plane function. Specifically, that the user plane function generates the first packet based on the second packet according to a first rule and/or a second rule includes: The user plane function determines a source of the second packet according to the first rule; and the user plane function processes the second packet from the passive or semi-active IoT server according to the second rule, to generate the first packet.

The first rule indicates how the IoT function network element determines whether the received packet is from the passive or semi-active IoT server. The second rule indicates how the IoT function network element processes the packet from the passive or semi-active IoT server, that is, indicates a protocol type that needs to be used by the IoT function network element to process the second packet. Optionally, the second rule includes a forwarding action rule (FAR), and the first rule includes a packet detection rule (PDR). Further, the first rule and/or the second rule may be an enhanced N4 rule. The enhanced N4 rule is related to a passive or semi-active IoT service. The first rule may include an enhanced FAR rule, and the second rule includes an enhanced PDR rule. The first rule and/or the second rule are/is configured, so that the user plane function can determine the source of the second packet, process the second packet, and generate the first packet according to the first rule and/or the second rule, thereby improving an application scope of the solutions.

In an embodiment, the IoT function network element sends the first packet to the access network device by using the first session. The session type of the first session is the passive or semi-active internet of things, or the session identifier of the first session indicates that the first session is related to the passive or semi-active internet of things. The first session may be used to transmit the first packet sent by the IoT function network element to a RAN, thereby improving implementation flexibility of the solutions.

In an embodiment, the second information further includes the session type of the first session or the session identifier of the first session. In this embodiment of this application, the IoT function network element may determine, based on the session type of the first session or the session identifier of the first session, that the first packet transmitted in the first session includes the passive or semi-active IoT instruction.

In an embodiment, the IoT function network element sends a subscription request to a second network element, where the subscription request is used to obtain information about the access network device. The information about the access network device includes one or more pieces of the following information: a permanent identifier of the access network device, information about a core network element that serves the access network device, and reader identifier information of the access network device. The second network element includes one or more of the following: the AMF, the SMF, a unified data management function (UDM), or the NRF. In this operation, each time a RAN, as a proxy for a tag, establishes a control plane channel at a granularity of a RAN or a tag, the IoT function network element may learn, by using an event reported by the second network element, which RAN establishes (establishes as a proxy for short) the control plane channel as a proxy, SUPI information established by the RAN as a proxy, and the like. Subsequently, when the passive or semi-active IoT server sends the passive or semi-active IoT instruction (or information or data) to the IoT function network element, a network element (or a network function such as an NEF, the AMF, the UDM, or the SMF) responsible for forwarding a packet learns a destination of the packet, that is, a RAN to which the packet needs to be sent.

In an embodiment, the first information includes one or more of the following: a message type of the first packet, a container type in the first packet, or tunnel identifier information of the first packet. Alternatively, the first information is an information type of the first packet.

Specifically, the message type of the first packet may be a message type field in a packet header of the first packet. The container type of the first packet may be a newly added container type in the first packet. The tunnel identifier information of the first packet is tunnel identifier information of the RAN regarding the first session, namely, an endpoint identifier of an N3 tunnel when the RAN establishes the first session. The IoT function network element determines the session type of the first session by using the tunnel identifier information. The information type of the first packet is an information type field that is newly added to the first packet and that indicates the first packet. This embodiment of this application provides a plurality of implementation solutions of the first information, thereby improving implementation flexibility of the solutions.

In an embodiment, the second information includes one or more of the following: a message type of the third packet, a container type of the third packet, tunnel identifier information of the third packet, or an information type of the third packet. Specifically, the message type of the third packet may be a message type field in a packet header of the third packet. The container type of the third packet may be a newly added container type in the third packet. The tunnel identifier information of the third packet is tunnel identifier information of the RAN regarding the first session, namely, an endpoint identifier of the N3 tunnel when the RAN establishes the first session. The IoT function network element determines the session type of the first session by using the tunnel identifier information. The information type of the third packet is an information type field that is newly added to the third packet and that indicates the third packet. This embodiment of this application provides a plurality of implementation solutions of the second information, thereby improving implementation flexibility of the solutions.

According to a third aspect, an embodiment of this application provides a communication apparatus, including:
a transceiver module, configured to receive a first packet from an IoT function network element, where
the transceiver module is further configured to obtain first information, where the first information indicates that the first packet includes a passive or semi-active IoT instruction; and
a processing module, configured to perform a passive or semi-active IoT operation based on the first packet.

In an embodiment, the communication apparatus is a network device. In an embodiment, the processing module may be a processor, and the transceiver module may be a transceiver.

In another embodiment, the network device is a chip, a chip system, or a circuit configured in the network device. The processing module may be a processor, a processing circuit, a logic circuit, or the like. The transceiver module may be an input and/or output interface, an interface circuit, an output circuit, an input circuit, a pin, a related circuit, or the like on the chip, the chip system, or the circuit. Optionally, the foregoing "receive" may also be understood as "input".

In an embodiment, the first information includes one or more of the following: a message type of the first packet, a container type of the first packet, or tunnel identifier information of the first packet. Alternatively, the first information is an information type of the first packet.

In an embodiment, the processing module is further configured to process the first packet based on the first information by using a second protocol, to obtain the passive or semi-active IoT instruction.

In an embodiment, the transceiver module is further configured to obtain a response to the passive or semi-active IoT instruction.

The processing module is further configured to process the response to the passive or semi-active IoT instruction by using the second protocol, to generate a third packet.

The transceiver module is further configured to send the third packet to the IoT function network element.

In an embodiment, the transceiver module is further configured to send second information to the IoT function network element. The second information indicates that the third packet is related to the passive or semi-active internet of things, or that the third packet needs to be processed by using the second protocol.

In an embodiment, the second information includes one or more of the following: a message type of the third packet, a container type of the third packet, or tunnel identifier information of the third packet. Alternatively, the second information is an information type of the third packet.

In an embodiment, the transceiver module is further configured to send a request message, where the request message is for establishing the first session.

The session type of the first session is the passive or semi-active internet of things, or the session identifier of the first session indicates that the first session is related to the passive or semi-active internet of things.

The transceiver module is further configured to receive, by using the first session, the first packet sent by the IoT function network element.

In an embodiment, the transceiver module is further configured to send the third packet to the IoT function network element by using the first session.

In an embodiment, the first information further includes the session type of the first session or the session identifier of the first session.

In an embodiment, the second information further includes the session type of the first session or the session identifier of the first session.

In an embodiment, the IoT function network element includes: a UPF, an AMF, an SMF, an NRF, or a first network element.

According to a fourth aspect, an embodiment of this application provides a communication apparatus, including:
a transceiver module, configured to send a first packet to an access network device, where the first packet includes a passive or semi-active IoT instruction.

The transceiver module is further configured to send first information to the access network device. The first information indicates that the first packet includes the passive or semi-active IoT instruction, to enable the access network device to perform a passive or semi-active IoT operation.

In an embodiment, the transceiver module is further configured to receive a second packet from a passive or semi-active IoT server.

A processing module is configured to generate the first packet based on the second packet. The first packet includes the passive or semi-active IoT instruction included in the second packet.

The transceiver module is further configured to send the first packet to the access network device.

In an embodiment, the communication apparatus is a network device. In an embodiment, the processing module may be a processor, and the transceiver module may be a transceiver.

In another embodiment, the network device is a chip, a chip system, or a circuit configured in the network device. The processing module may be a processor, a processing circuit, a logic circuit, or the like. The transceiver module may be an input and/or output interface, an interface circuit, an output circuit, an input circuit, a pin, a related circuit, or the like on the chip, the chip system, or the circuit. Optionally, the foregoing "receive" may also be understood as "input".

In an embodiment, the processing module is configured to process the second packet by using a first protocol, to generate first intermediate data.

The processing module is configured to process the first intermediate data by using a second protocol, to generate the first packet.

In an embodiment, the transceiver module is configured to send the second packet to the first network element.

The transceiver module is configured to receive second intermediate data sent by the first network element. The second intermediate data is data obtained by the first network element processing the second packet by using the first protocol and the second protocol.

The processing module is configured to process the second intermediate data, to generate the first packet.

In an embodiment, the transceiver module is further configured to receive a third packet from the access network device.

The transceiver module is further configured to obtain second information. The second information indicates that the third packet is related to a passive or semi-active internet of things, or that the third packet needs to be processed by using the second protocol.

The processing module is further configured to determine, based on the second information, to process the third packet by using the second protocol, to generate a fourth packet.

The third packet and the fourth packet include responses to the passive or semi-active IoT instruction obtained by the access network device.

In an embodiment, the processing module is further configured to generate the first packet based on the second packet according to a first rule and/or a second rule.

The first rule and/or the second rule are/is configured by a session management function SMF, or the first rule and/or the second rule are/is pre-configured in the user plane function.

In an embodiment, the second rule includes a forwarding action rule, and the first rule includes a packet detection rule.

In an embodiment, the transceiver module is further configured to send the first packet to the access network device by using a first session. A session type of the first session is the passive or semi-active internet of things.

Alternatively, a session identifier of the first session indicates that the first session is related to the passive or semi-active internet of things.

In an embodiment, the second information further includes the session type of the first session or the session identifier of the first session.

In an embodiment, the transceiver module is further configured to send a subscription request to a second network element. The subscription request is used to obtain information about the access network device.

The information about the access network device includes one or more pieces of the following information: a permanent identifier of the access network device, information about a core network element that serves the access network device, and reader identifier information of the access network device.

The second network element includes one or more of the following: an AMF, the SMF, a UDM, or an NRF.

In an embodiment, the IoT function network element includes: a UPF, an AMF, an SMF, an NRF, or a first network element.

In an embodiment, the first information includes one or more of the following: a message type of the first packet, a container type of the first packet, tunnel identifier information of the first packet, or an information type of the first packet.

In an embodiment, the second information includes one or more of the following: a message type of the third packet, a container type of the third packet, tunnel identifier information of the third packet, or an information type of the third packet.

According to a fifth aspect, a communication apparatus is provided, to implement the foregoing methods. The communication apparatus may be the communication apparatus in any one of the first aspect or the possible embodiments of the first aspect, or any one of the second aspect or the possible embodiments of the second aspect, or may be an apparatus included in the communication apparatus, for example, a system chip. The communication apparatus according to the fifth aspect includes a corresponding module, unit, or means for implementing the foregoing methods. The module, unit, or means may be implemented by using hardware or software, or implemented by hardware executing corresponding software. The hardware or the software includes one or more modules or units corresponding to the foregoing functions.

According to a sixth aspect, a communication apparatus is provided, including a processor and a memory. The memory is configured to store computer instructions. When the processor executes the instructions, the communication apparatus is enabled to perform the method according to any one of the foregoing aspects. The communication apparatus may be the communication apparatus in any one of the first aspect or the possible embodiments of the first aspect, or any one of the second aspect or the possible embodiments of the second aspect, or may be an apparatus including the communication apparatus, or may be an apparatus included in the communication apparatus, for example, a system chip.

According to a seventh aspect, a communication apparatus is provided, including a processor. The processor may be coupled to a memory, and after reading instructions in the memory, perform the method in any one of the foregoing aspects based on the instructions. The memory and the communication apparatus are independent of each other. The communication apparatus may be the communication apparatus in any one of the first aspect or the possible embodiments of the first aspect, or any one of the second aspect or the possible embodiments of the second aspect, or may be an apparatus including the communication apparatus, or may be an apparatus included in the communication apparatus, for example, a system chip.

According to an eighth aspect, a computer-readable storage medium is provided. The computer-readable storage medium stores instructions. When the instructions are executed on a communication apparatus, the communication apparatus is enabled to perform the method according to any one of the foregoing aspects. The communication apparatus may be the communication apparatus in any one of the first aspect or the possible embodiments of the first aspect, or any one of the second aspect or the possible embodiments of the second aspect, or may be an apparatus including the communication apparatus, or may be an apparatus included in the communication apparatus, for example, a system chip.

According to a ninth aspect, a computer program product including instructions is provided. When the instructions are run on a communication apparatus, the communication apparatus is enabled to perform the method according to any one of the foregoing aspects. The communication apparatus may be the communication apparatus in any one of the first aspect or the possible embodiments of the first aspect, or any one of the second aspect or the possible embodiments of the second aspect, or may be an apparatus including the communication apparatus, or may be an apparatus included in the communication apparatus, for example, a system chip.

According to a tenth aspect, a communication apparatus (for example, the communication apparatus may be a chip or a chip system) is provided. The communication apparatus includes a processor, and is configured to implement a function according to any one of the foregoing aspects. In a possible design, the communication apparatus further includes a memory. The memory is configured to store necessary program instructions and data. When the communication apparatus is a chip system, the communication apparatus may include a chip, or may include a chip and another discrete component.

According to an eleventh aspect, a chip is provided. The chip includes a processor and a communication interface. The communication interface is configured to communicate with a module other than the shown chip. The processor is configured to run a computer program or instructions, so that an apparatus installed with the chip can perform the method according to any one of the foregoing aspects.

For technical effects brought by any one of the designs of the third aspect to the eleventh aspect, refer to technical effects brought by different designs of the first aspect or the second aspect. Details are not described herein again.

According to a twelfth aspect, a communication system is provided. The communication system includes the communication apparatus in the foregoing aspects.

BRIEF DESCRIPTION OF DRAWINGS

FIG. 10a-1, FIG. 10a-2, and FIG. 10a-3 are a schematic flowchart of an embodiment of a packet transmission method according to an embodiment of this application;

FIG. 11A and FIG. 11B are a schematic flowchart of an embodiment of a packet transmission method according to an embodiment of this application;

DESCRIPTION OF EMBODIMENTS

Figure 1A:
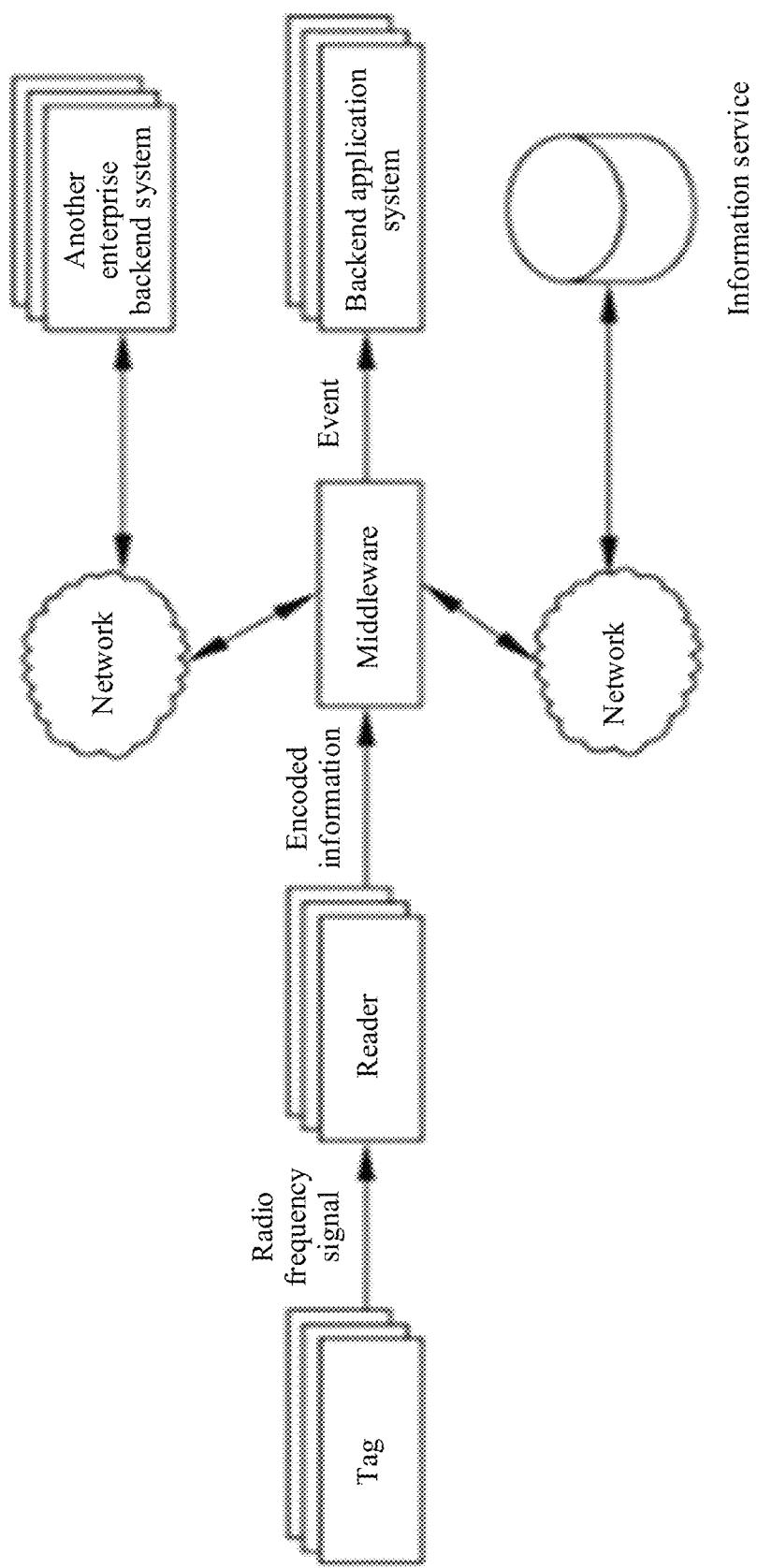
FIG. 1a is a schematic diagram of a passive or semi-active IoT system according to an embodiment of this application.

The following clearly and completely describes the technical solutions in embodiments of this application with reference to the accompanying drawings in embodiments of this application. It is clear that the described embodiments are merely some rather than all of the embodiments of this application.

In this specification, claims, and accompanying drawings of this application, the terms "first", "second", and the like are intended to distinguish between similar objects but do not necessarily indicate a specific order or sequence. It should be understood that the terms used in such a way are interchangeable in appropriate circumstances, which is merely a discrimination manner that is used when objects having a same attribute are described in embodiments of this application. In addition, the terms "include", "have", and any variants thereof are intended to cover a non-exclusive inclusion, so that a process, method, system, product, or device including a series of units is not necessarily limited to those units, but may include other units not explicitly listed or inherent to the process, method, system, product, or device.

In descriptions of this application, "/" means "or" unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists. In addition, in the descriptions of this application, "at least one" means one or more, and "a plurality of" means two or more. "At least one of the following" or similar expressions thereof refer to any combination of these items, including any combination of single items or a plurality of items. For example, at least one of a, b, or c may indicate: a, b, c, a and b, a and c, b and c, or a, b, and c, where a, b, and c may be singular or plural.

The technical solutions in embodiments of this application may be applied to various communication systems, for example, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a fifth generation (5G) system, NR, and a sixth generation (6G) communication system.

A communication network may be a public land mobile network (PLMN) network. The public land mobile network is a network established and operated by a government or an operator authorized by the government for a purpose of providing land mobile communication services for the public, and is mainly a public network that a mobile network operator (MNO) provides mobile broadband access services for a user. Alternatively, the communication network may be a network built by an enterprise, controlled by the enterprise, or managed by the enterprise. The communication network described in embodiments of this application may be a network that meets a requirement of the 3rd Generation Partnership Project (3GPP) standard, and is referred to as a 3GPP network for short, including but not limited to a 5G network, a fourth-generation (4G) network, or a third-generation (3G) network. The communication network further includes a 6G network.

For ease of understanding embodiments of this application, a passive or semi-active IoT system shown in FIG. 1a is first described. FIG. 1a is a schematic diagram of a passive or semi-active IoT system according to an embodiment of this application. The passive or semi-active IoT system in embodiments of this application may be considered as a radio frequency identification system or a radio frequency identification technology (RFID) system. It should be noted that the RFID system in this embodiment of this application is merely an example of the passive or semi-active IoT system in embodiments of this application, and the passive or semi-active IoT system in embodiments of this application is not limited to the RFID system. With development of technologies, a name of a "passive or semi-active internet of things" may also change. The "passive or semi-active internet of things" in embodiments of this application may alternatively be a system (or a communication technology) that has the foregoing "passive or semi-active internet of things" structure or function in a future communication system.

RFID is one of automatic identification technologies. A reader performs non-contact bidirectional data communication in a radio frequency manner, and reads and writes an electronic tag or a radio frequency card in the radio frequency manner, to identify a target and exchange data. The RFID technology operates in two modes: One is that when an RFID tag enters a valid identification range of the reader, the RFID tag receives a radio frequency signal sent by the reader and sends, by using energy obtained by an induced current, information (corresponding to a passive tag) stored in a chip. The other is that the RFID tag actively sends a signal (corresponding to an active tag) of a frequency. After the reader receives and decodes the information, an RFID information service system or a back-end application system processes related data. This technology is widely applied in various industries. The following describes two application scenarios.

(1) Logistics application scenario.

RFID tags are embedded in goods. When the goods are in a logistics process, information about the goods is automatically collected by the reader. In this way, management personnel can quickly query the information about the goods in the system, thereby reducing a risk of goods discarding or theft, improving a delivery speed of the goods, improving accuracy, and implementing anti-counterfeiting and anti-channel conflict.

(2) Fixed asset management.

In places where valuables are stored, such as libraries, art museums, and museums, RFID tags are set on these valuables. By monitoring the RFID tags, the management personnel know, in a timely manner, whether storage locations of the valuables change abnormally.

Figure 1B:
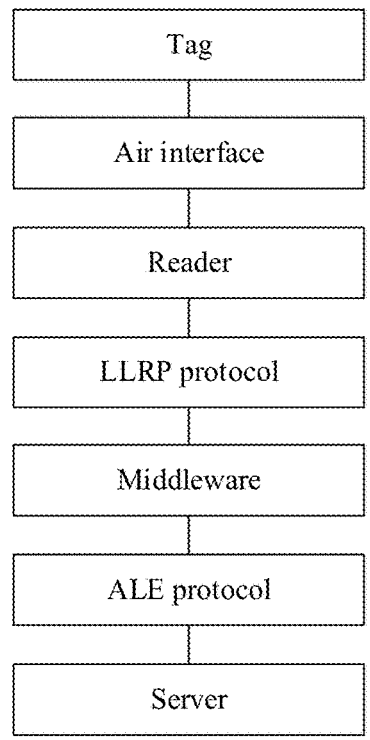
FIG. 1B is a schematic diagram of an RFID system according to an embodiment of this application.

The product electronic code (EPC) standard organization defines an architecture of the RFID system. Specifically, refer to FIG. 1b. FIG. 1b is a schematic diagram of an RFID system according to an embodiment of this application. The RFID system includes a tag, a reader, middleware, and a server. The tag (e.g., a Gen 2 RFID Tag) communicates with the reader (e.g., a RFID Reader) by using an air interface protocol (for example, the Gen 2 Air Interface protocol). The reader communicates with the middleware (e.g., Filtering & Collection) by using a low level reader protocol (LLRP). The protocol between the middleware and the server is an application level event (ALE) protocol.

To support applications of a passive or semi-active internet of things, a cellular network needs to integrate a passive or semi-active IoT technology (or a passive or semi-active IoT network architecture). Optionally, in a feasible embodiment, an IoT function network element in the cellular network implements some or all functions of the middleware in the passive or semi-active internet of things. The IoT function network element may be a control plane network element, or may be a user plane network element. The IoT function network element may be a newly added network element, or may be integrated into another defined network element. For ease of description, in this embodiment of this application, a network element having an IoT function is referred to as a first network element. There are a plurality of converged network architecture solutions based on deployment modes of the IoT function network element. Details are described in subsequent embodiments, and details are not described herein. In this embodiment of this application, it should be noted that the IoT function network element in this embodiment of this application may also be referred to as an application level event proxy function (ALE proxy).

Figure 1C:
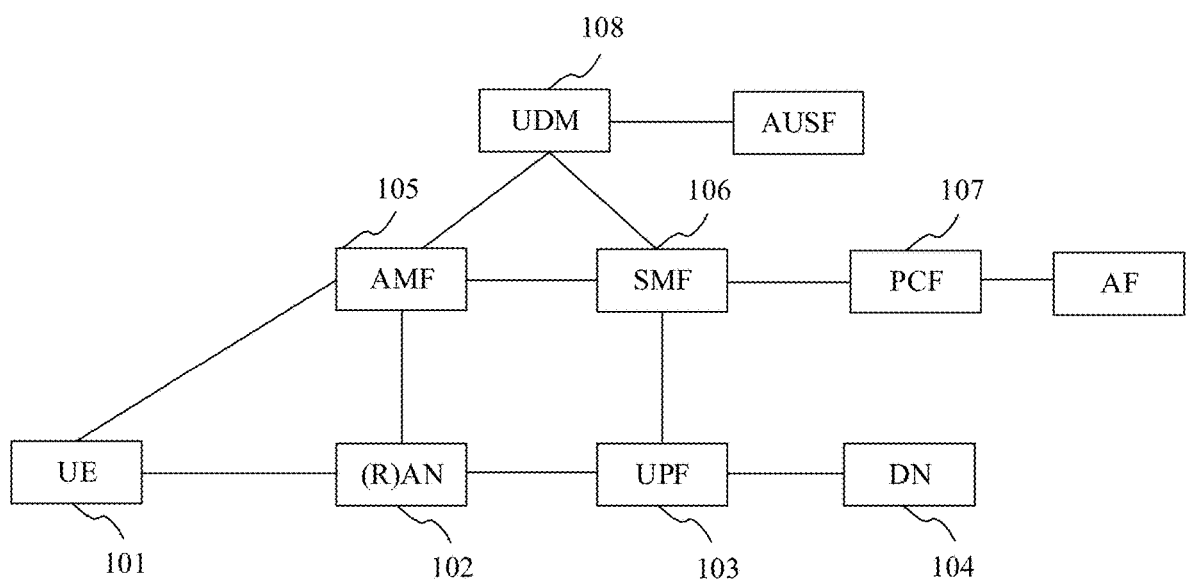
FIG. 1c is a schematic diagram of a network architecture of a communication system.

The following describes a cellular network in embodiments of this application. A 5G network architecture shown in FIG. 1c is used as an example to describe the cellular network in this application. FIG. 1c is a schematic diagram of a network architecture of a communication system. The network architecture may include a terminal device (also referred to as a user equipment part), a communication network part, and a data network (DN) 104 part.

The terminal device part includes a terminal device 101, and the terminal device 101 may also be referred to as user equipment (UE). The terminal device 101 in embodiments of this application is a device having a wireless transceiver function, and may communicate with one or more core networks (CNs) by using an access network device in a (radio) access network (R)AN 102. The terminal device 101 may also be referred to as an access terminal, a terminal, a subscriber unit, a subscriber station, a mobile station, a remote station, a remote terminal, a mobile device, a user terminal, a wireless network device, a user agent, a user apparatus, or the like. The terminal device 101 may be deployed on land, including indoors or outdoors, and may be held in hands or deployed in vehicles; or may be deployed on water (for example, a ship); or may be deployed in the air (for example, on aircraft, a balloon, or a satellite). The terminal device 101 may be a cellular phone, a cordless phone, a session initiation protocol (SIP) phone, a smartphone, a mobile phone, a wireless local loop (WLL) station, a personal digital assistant (PDA), a handheld device having a wireless communication function, a computing device or another device connected to a wireless modem, a vehicle-mounted device, a wearable device, an uncrewed aerial vehicle device or an internet of things, a terminal in an internet of vehicles, a terminal in any form in a fifth generation (5G) network and a future network, relay user equipment, a terminal in a future evolved public land mobile network (PLMN), or the like. The relay user equipment may be, for example, a 5G residential gateway (RG). For example, the terminal device 101 may be a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. This is not limited in embodiments of this application.

The communication network may include unified data management UDM) 108, an access and mobility management function (AMF) 105, a session management function (SMF) 106, a policy control network element (PCF) 107, a user plane function (UPF) 103, a (R)AN 102, and the like. In the communication network, a part other than the (R)AN part may be referred to as a core network (CN) part or a core network part. For ease of description, in this embodiment of this application, a RAN is used as an example of the (R)AN for description.

The data network DN 104 may also be referred to as a protocol data network (PDN), and may be a data network of an operator or an enterprise, or may be a third-party data network. The communication network may access a plurality of data networks DN 104, and a plurality of services may be deployed on the data network DN 104, to provide a data service and/or a voice service for the terminal device. For example, the data network DN 104 may be a private network of a smart factory, a sensor installed in a workshop of the smart factory may be the terminal device, a control server of the sensor is deployed in the data network DN 104, and the control server may provide a service for the sensor. The sensor may communicate with the control server, to obtain instructions of the control server, transmit collected sensor data to the control server according to the instructions, and the like. For another example, the data network DN 104 may be an internal office network of a company, a mobile phone or a computer of an employee of the company may be the terminal device, and the mobile phone or the computer of the employee may access information, data resources, and the like on the internal office network of the company.

The terminal device may establish a connection to the communication network by using an interface (for example, N1) provided by the communication network, and use a service, such as data and/or voice, provided by the communication network. The terminal device may further access the data network DN 104 through the communication network, and use an operator service deployed on the data network DN 104 and/or a service provided by a third party. The third party may be a service provider other than the communication network and the terminal device, and may provide another service such as a data service and/or a voice service for the terminal device. A specific representation form of the third party may be determined based on an actual application scenario. This is not limited herein.

The following briefly describes a network function in the communication network.

The (R)AN 102 in embodiments of this application is a device that provides a wireless communication function for the terminal device. To access the communication network, the terminal device first passes through the (R)AN 102, and then may be connected to a service node of the communication network by using the (R)AN 102. The access network device (or RAN device) 102 and the (R)AN in this embodiment of this application include but are not limited to: a next generation node base station (gNB) in a 5G system, an evolved NodeB (eNB) in long term evolution (LTE), a radio network controller (RNC), a NodeB (NB), a base station controller (BSC), a base transceiver station (BTS), a home base station (for example, a home evolved NodeB, or a home NodeB, HNB), a baseband unit (BBU), a transmitting and receiving point (TRP), a transmitting point (TP), a small cell device (pico), a mobile switching center, an access point in a non-3GPP (such as a wireless local area network, WLAN, or Bluetooth) network, or a network device in a future network. In systems using different radio access technologies, devices with functions of the access network device may have different names. For ease of description, in embodiments of this application, the foregoing apparatus that provides a wireless communication function for the terminal device are collectively referred to as an access network device or briefly referred to as a RAN 102 or an AN 102.

It should be understood that a specific type of the access network device is not limited in this specification. The access network device integrates some or all functions of the reader in the passive or semi-active internet of things. For a communication procedure between the access network device and the tag, for example, a tag inventorying procedure and a tag reading/writing procedure, refer to descriptions in FIG. 3 and FIG. 4. The access and mobility management function AMF 105 (which may also be referred to as an AMF network element, an AMF network function, or an AMF network function entity) is a control plane network function provided by the communication network, and is responsible for access control and mobility management when the tag accesses the communication network, for example, including functions such as mobility status management, temporary user identifier assignment, and user authentication and authorization.

The SMF 106 (which may also be referred to as an SMF network element, an SMF network function, or an SMF network function entity) is a control plane network function provided by the communication network, and is responsible for managing a protocol data unit (PDU) session of the tag. The PDU session is a channel for transmitting a PDU, and the tag and the data network DN 104 need to send PDUs to each other by using the PDU session. The SMF network function 106 is responsible for establishment, maintenance, deletion, and the like of the PDU session. The SMF network function 106 includes functions related to a session, for example, session management (for example, session establishment, modification, and release, including tunnel maintenance between the user plane function UPF 103 and the (R)AN 102), selection and control of the UPF network function 103, service and session continuity (service and session continuity, SSC) mode selection, and roaming.

The user plane function UPF 103 (which may also be referred to as a UPF network element, a UPF network function, or a UPF network function entity) is a gateway provided by an operator, and is a gateway for communication between the communication network and the data network DN 104. The UPF network function 103 includes functions related to a user plane, for example, data packet routing and transmission, data packet detection, service usage reporting, quality of service (QoS) processing, lawful interception, uplink data packet detection, and downlink data packet storage.

The unified data management network element UDM 108 (which may also be referred to as a UDM network element, a UDM network function, or a UDM network function entity) is a control plane function provided by an operator, and is responsible for storing information such as a subscriber permanent identity (SUPI) in the communication network, a generic public subscription identifier (GPSI), and a credential. The SUPI is first encrypted during transmission, and an encrypted SUPI is referred to as a subscription concealed identifier (SUCI). The information stored in the UDM 108 may be used for authentication and authorization when the tag accesses the communication network. A subscriber of the communication network may be a subscriber who uses a service provided by the communication network, for example, a subscriber who uses a mobile phone chip card of an operator A. A credential of the subscriber may be a long-term key stored in the mobile phone chip card or a small file stored in the mobile phone chip card, such as information related to encryption of the mobile phone chip card, and is used for authentication and/or authorization. It should be noted that a permanent identifier, a credential, a security context, authentication data (cookie), and a token are equivalent to information related to verification/authentication and authorization, and are not limited or distinguished between each other for ease of description in embodiments of this application.

A policy control entity (PCF) is responsible for policy control, charging policy control, quality of service (QoS) control, and the like. The PCF 107 may interact with an AF to obtain a QoS parameter, or provide the QoS parameter for the AF, so as to implement a function that may affect data transmission of an application program.

The application function AF interacts with the 3GPP core network to provide application level services. The application function AF may be located in a DN. For example, the application function provides application level data routing and network access capabilities. The AF may interact with the PCF 107. The AF may be located inside or outside a 5G core network. If the AF is inside the 5G core network, the AF may directly interact with the PCF 107. If the AF is outside the 5G core network, a network exposure function (NEF) is used as an intermediate node to forward content exchanged between the AF and the PCF 107. For example, the content is forwarded by using the NEF.

An authentication management function (AUSF) (which may also be referred to as an AUSF network element, an AUSF network function, or an AUSF network function entity) is a control plane function provided by an operator, and is usually used for primary authentication, that is, authentication between a tag 101 (e.g., a subscriber) and the communication network. After receiving an authentication request initiated by the subscriber, the AUSF may perform authentication and/or authorization on the subscriber by using authentication information and/or authorization information stored in the UDM 108, or generate authentication and/or authorization information of the subscriber by using the UDM 108. The AUSF may feed back the authentication information and/or the authorization information to the subscriber. In an embodiment, the AUSF may alternatively be co-located with the UDM.

During actual deployment, network elements in the core network may be co-located. For example, the access and mobility management function and the session management function may be co-located, and the session management function and the user plane function may be co-located. When two network elements are co-located, interaction between the two network elements provided in embodiments of this application becomes an internal operation of the co-located network elements or may be omitted.

It should be noted that, in a communication network architecture on which this embodiment of this application is based, the tag may communicate with a passive or semi-active IoT server in the DN by using a communication network having some or all functions of the reader in the passive or semi-active internet of things. The (R)AN further has some functions of the terminal device, that is, requests the core network to establish a control plane channel and a user plane channel, which may also be referred to as that the (R)AN establishes the control plane channel and the user plane channel for the tag as a proxy. For details, refer to descriptions in FIG. 8 and FIG. 9a in this application. It should be noted that the tag in this embodiment of this application may be an electronic price tag of a supermarket, a mother/infant wristband for medical care, an asset tag of a smart park, or the like.

For ease of description, in this embodiment of this application, the AMF 105 is used as an example of the access and mobility management network function for description. Alternatively, the access and mobility management network function may be another network function that has the foregoing AMF network functions in a future communication system. Alternatively, the access and mobility management network function 105 in this application may be a mobility management network element (MME) in LTE, or the like. Further, the AMF network function is referred to as the AMF for short. That is, the AMF described below in embodiments of this application may be replaced with the access and mobility management network function.

In an embodiment of this application, the SMF 106 is used as an example of the session management function for description. Alternatively, the session management function may be another network function that has the foregoing SMF network functions in a future communication system. Further, the SMF network function is referred to as the SMF for short. That is, the SMF described below in embodiments of this application may be replaced with the session management function.

In an embodiment of this application, the unified data management UDM 108 is used as an example for description. Alternatively, the unified data management may be another network function that has the foregoing UDM network functions in a future communication system. Further, the UDM network function is referred to as the UDM for short. That is, the UDM described below in embodiments of this application may be replaced with the unified data management.

The user plane function UPF 103 in this embodiment of this application may alternatively be another network function that has the foregoing UPF network functions in a future communication system. This is not limited herein.

The packet transmission method provided in this application may be applied to various communication systems, for example, an internet of things (IoT), a narrow band internet of things (NB-IoT), long term evolution (LTE), a 5G communication system, a hybrid architecture of LTE and 5G, a 5G new radio (NR) system, and a new communication system emerging in future communication development. The 5G communication system described in this application may include at least one of a non-standalone (NSA) 5G communication system and a standalone (SA) 5G communication system. Alternatively, the communication system may be a PLMN, a device-to-device (D2D) network, a machine to machine (M2M) network, or another network.

The "packet" in this embodiment of this application may alternatively be replaced with "data packet", "data", "instruction", "signaling", or the like. This is not limited herein.

In addition, embodiments of this application are also applicable to another future-oriented communication technology, for example, 6G. Network architectures and the service scenarios described in this application are intended to describe the technical solutions in this application more clearly, and do not constitute a limitation on the technical solutions provided in this application. A person of ordinary skill in the art may learn that, with evolution of network architectures and emergence of new service scenarios, network functions in this application may change, and the technical solutions provided in this application are also applicable to similar technical problems.

Figure 2:
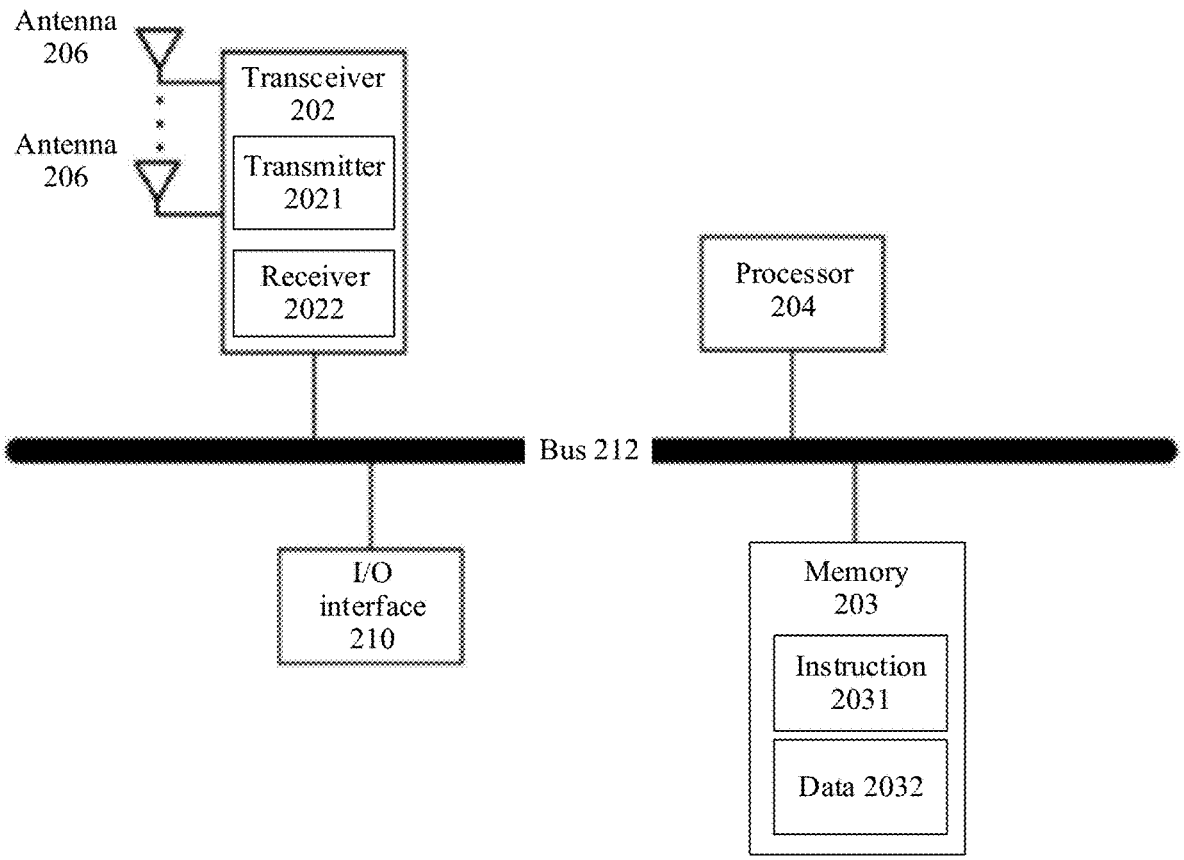
FIG. 2 is a schematic diagram of a hardware structure of a communication apparatus according to an embodiment of this application.

FIG. 2 is a schematic diagram of a hardware structure of a communication apparatus according to an embodiment of this application. The communication apparatus may be a possible implementation of the access network device or the IoT function network element in this embodiment of this application. It should be noted that the IoT function network element provided in this embodiment of this application may further be co-located with another core network element, for example, co-located with a UPF. This is not limited herein. As shown in FIG. 2, the communication apparatus includes at least a processor 204 and a memory 203. The memory 203 is further configured to store instructions 2031 and data 2032. Optionally, the communication apparatus includes an I/O (input/output) interface 210 and a bus 212. Optionally, the communication apparatus may further include a transceiver 202 and antennas 206. The transceiver 202 further includes a transmitter 2021 and a receiver 2022. In addition, the processor 204, the transceiver 202, the memory 203, and the I/O interface 210 are communicatively connected to each other through the bus 212. The antennas 206 are connected to the transceiver 202.

The processor 204 may be a general-purpose processor, for example, but not limited to a central processing unit (CPU). Alternatively, the processor 204 may be a dedicated processor, for example, but not limited to a digital signal processor (DSP), an application-specific integrated circuit (ASIC), and a field programmable gate array (FPGA). Alternatively, the processor 204 may be a neural-network processing unit (NPU). In addition, the processor 204 may alternatively be a combination of a plurality of processors. In particular, in the technical solutions provided in embodiments of this application, the processor 204 may be configured to perform related operations of a packet transmission method in subsequent method embodiments. The processor 204 may be a processor that is specially designed to perform the foregoing steps and/or operations, or may be a processor that performs the foregoing steps and/or operations by reading and executing the instructions 2031 stored in the memory 203. The processor 204 may need to use the data 2032 in a process of performing the foregoing steps and/or operations.

The transceiver 202 includes a transmitter 2021 and a receiver 2022. In an embodiment, the transmitter 2021 is configured to send a signal through the antennas 206. The receiver 2022 is configured to receive a signal by using at least one of the antennas 206. In particular, in the technical solutions provided in embodiments of this application, the transmitter 2021 may be configured to perform an operation through at least one of the antennas 206, for example, an operation performed by a receiving module or a sending module in the network device when a packet transmission method in a subsequent method embodiment is applied to the network device.

In an embodiment of this application, the transceiver 202 is configured to support the communication apparatus in performing the foregoing receiving function and sending function. A processor having a processing function is considered as the processor 204. The receiver 2022 may also be referred to as an input port, a receiving circuit, or the like. The transmitter 2021 may be referred to as a transmitter, a transmitting circuit, or the like.

The processor 204 may be configured to execute instructions stored in the memory 203, to control the transceiver 202 to receive a message and/or send a message, to realize a function of the communication apparatus in the method embodiment of this application. In an embodiment, it may be considered that a function of the transceiver 202 is implemented by using a transceiver circuit or a dedicated transceiver chip. In this embodiment of this application, that the transceiver 202 receives a message may be understood as that the transceiver 202 inputs a message, and that the transceiver 202 sends a message may be understood as that the transceiver 202 outputs a message.

The memory 203 may be various types of storage media, for example, a random access memory (RAM), a read-only memory (ROM), a non-volatile RAM (NVRAM), a programmable ROM (PROM), an erasable PROM (EPROM), an electrically erasable PROM(EEPROM), a flash memory, an optical memory, and a register. The memory 203 is configured to store the instructions 2031 and the data 2032. The processor 204 may perform the steps and/or the operations in the method embodiments of this application by reading and executing the instructions 2031 stored in the memory 203. The data 2032 may need to be used in a process of performing the operations and/or the steps in the method embodiment of this application.

Before embodiments of this application are described, technical content in embodiments of this application is first described.

(1) Tag inventorying procedure.

Figure 3:
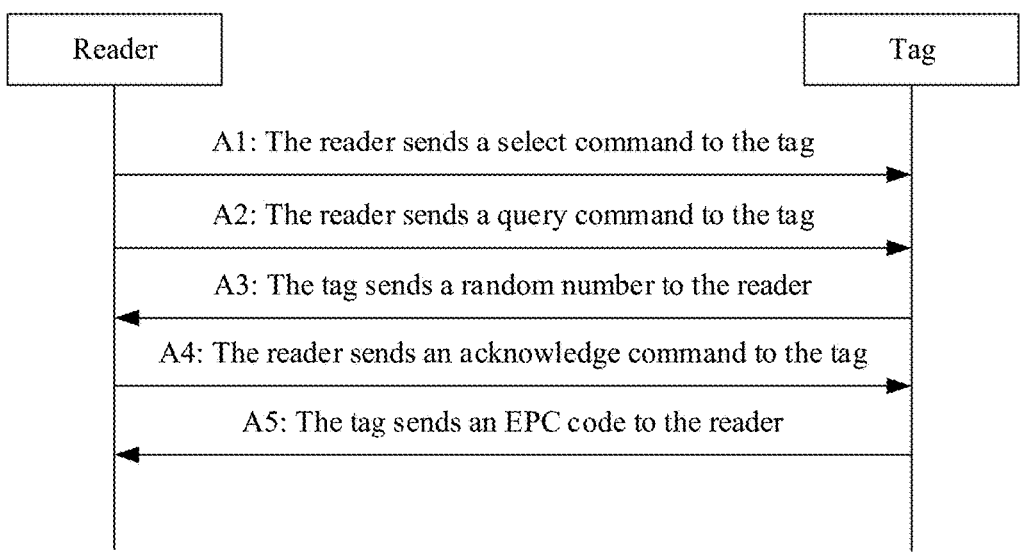
FIG. 3 is a schematic flowchart of inventorying tags according to an embodiment of this application.

The tag inventorying procedure is used to inventory existing tags. Each tag has its own identifier information. Optionally, in an embodiment, the identifier information may be an electronic product code (EPC). The following uses an example in which the identifier information is the EPC code for description. However, in this embodiment of this application, the identifier information of the tag is not limited to the EPC code. In the inventorying procedure, the tag sends the EPC code to the reader, so that the reader can learn which tags are within a range of the reader. The information is finally reported by the reader to middleware and a server. FIG. 3 is a schematic flowchart of inventorying tags according to an embodiment of this application.

A1: The reader sends a select command to the tag.

In operation A1, the reader receives an inventory command from the IoT function network element. The inventory command may be delivered by the passive or semi-active IoT server to the IoT function network element, and then sent by the IoT function network element to the reader. After receiving the inventory command, the reader generates a select command. The command includes a range of the tag, for example, an EPC code within a specific range.

After listening to the select command, the tag determines whether the tag belongs to a tag range in the select command. If the tag belongs to the tag range in the select command, the tag feeds back information after listening to a query command in a subsequent procedure; or if the tag does not belong to the tag range in the select command, the tag does not perform an action in a subsequent procedure.

A2: The reader sends the query command to the tag.

In operation A2, the reader continues to send the query command.

A3: The tag sends a random number to the reader.

In operation A3, when the tag determines that the tag belongs to the tag range in the select command, the tag sends a random number (RN), for example, an RN 16, to the reader in a contention manner.

A4: The reader sends an acknowledge command to the tag.

In operation A4, after the reader receives the random number from the tag, the reader sends the acknowledge (ACK) command. The acknowledge command includes the random number (RN16) received in operation A3.

A5: The tag sends an EPC code to the reader.

In operation A5, after the tag receives the acknowledge command sent by the reader, the tag verifies the random number in the acknowledge command. After the verification is successful, the tag sends its own EPC code to the reader to complete the inventorying procedure.

(2) Tag reading/writing procedure.

Figure 4:
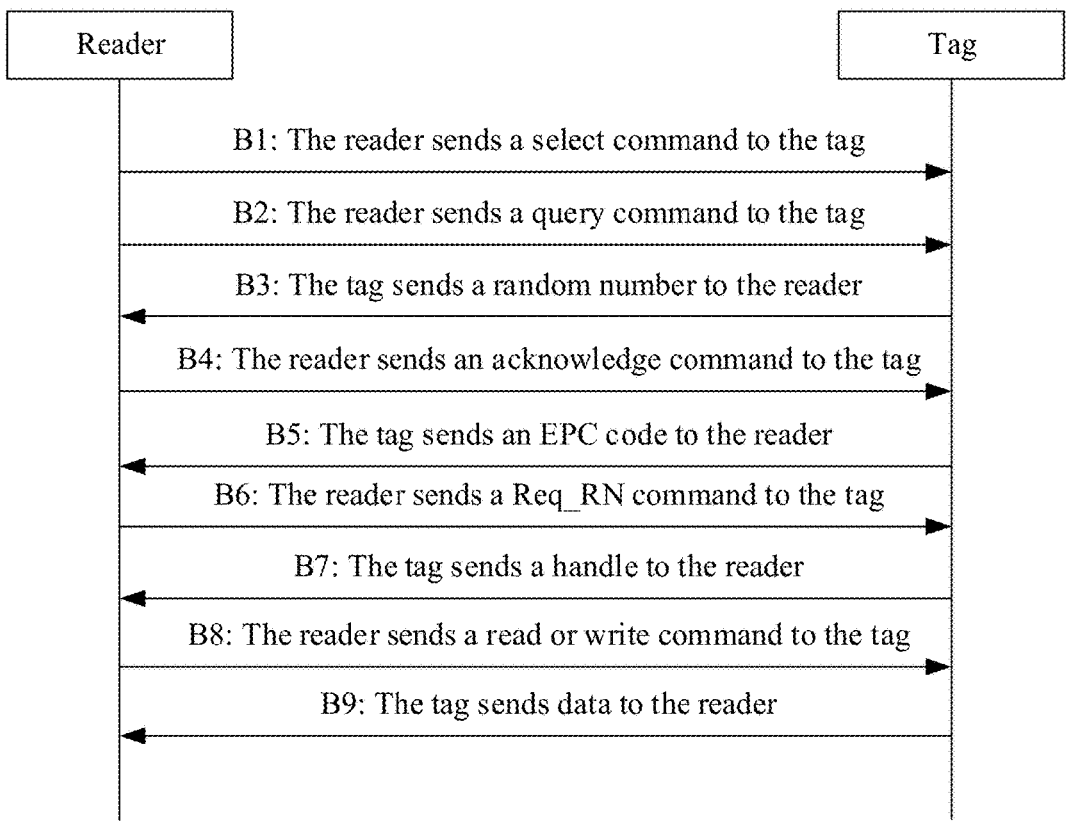
FIG. 4 is a schematic flowchart of reading and writing a tag according to an embodiment of this application.

The tag reading/writing procedure is a write or read operation on a tag. If an operation is the write operation, data is written into a storage area of the tag, or if an operation is the read operation, data in a storage area of the tag is read. In the reading/writing procedure, the reader sets a tag range in a select command as a tag range that needs to be read/written (for example, if the range in the select command is an EPC code, a read/write operation is performed on a tag corresponding to the EPC code). FIG. 4 is a schematic flowchart of reading and writing a tag according to an embodiment of this application.

B1: The reader sends a select command to the tag.
B2: The reader sends a query command to the tag.
B3: The tag sends a random number to the reader.
B4: The reader sends an acknowledge command to the tag.
B5: The tag sends an EPC code to the reader.

Operations B1 to B5 are consistent with the foregoing operations A1 to A5, and details are not described herein again.

B6: The reader sends a random number request (Req_RN) command to the tag.

In operation B6, the reader sends the Req_RN command to the tag, where the Req_RN command includes the random number RN 16 received in operation B3.

B7: The tag sends a handle to the reader.

In operation B7, after the tag verifies that the random number received in operation B6 is correct, the tag sends the handle to the reader. The handle needs to be included in a subsequent read/write procedure.

B8: The reader sends a read or write command to the tag.

In operation B8, the reader sends a read command or a write command to the tag, where both the read command and the write command need to include the handle. The write command further needs to include data written into a storage area of the tag.

B9: The tag sends the data to the reader.

If operation B8 is the read command, operation B9 is performed.

In operation B9, the tag sends the data in the storage area of the tag to the reader, and the data includes the handle.

(3) Passive or semi-active IoT (passive IoT) architecture.

The passive or semi-active IoT architecture in embodiments of this application includes a plurality of implementation solutions. The following separately provides descriptions with reference to the accompanying drawings.

(3.1) A user plane network element integrates an IoT function network element.

Figure 5:
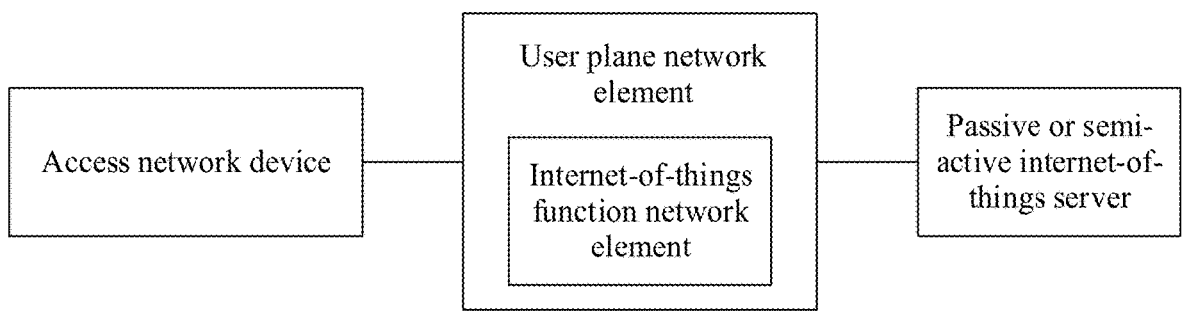
FIG. 5 is a schematic diagram of a passive or semi-active IoT architecture according to an embodiment of this application.

In an embodiment, FIG. 5 is a schematic diagram of a passive or semi-active IoT architecture according to an embodiment of this application. The IoT function network element is integrated into the user plane network element. That is, the user plane network element has a function of the IoT function network element, or the user plane network element and the IoT function network element are co-located.

Passive or semi-active IoT data is transmitted through a user plane channel. In this architecture, downlink data is sent from a passive or semi-active IoT server to the user plane network element (that is, an IoT function network element in the user plane network element), and then the user plane network element sends the downlink data to a tag by using an access network device. On an uplink data side, uplink data is sent by the tag to the access network device, the access network device sends the uplink data to the user plane network element (an IoT function network element) through the user plane channel, and then the user plane network element (the IoT function network element) sends the uplink data to the passive or semi-active IoT server.

Figure 6:
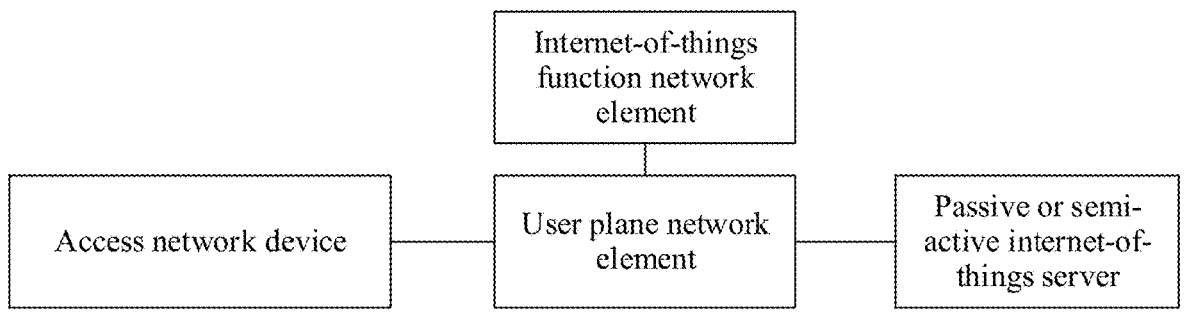
FIG. 6 is a schematic diagram of another passive or semi-active IoT architecture according to an embodiment of this application.

In an embodiment, FIG. 6 is a schematic diagram of another passive or semi-active IoT architecture according to an embodiment of this application. The IoT function network element is connected to the user plane network element, and the IoT function network element and the user plane network element are independent of each other.

(3.2) The IoT function network element is used as a control plane network element.

Figure 7A:
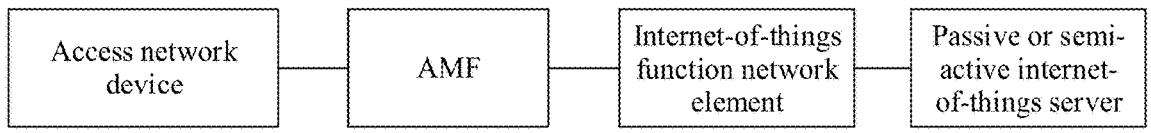
FIG. 7a and FIG. 7b are schematic diagrams of another passive or semi-active IoT architecture according to an embodiment of this application.
Figure 7B:
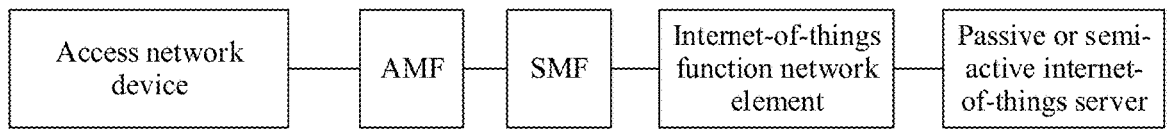

FIG. 7a and FIG. 7b are schematic diagrams of another passive or semi-active IoT architecture according to an embodiment of this application. The IoT function network element is deployed in a core network as a control plane network element. In this case, the passive or semi-active IoT data is communicated through a control plane channel. In this architecture, the passive or semi-active IoT server sends the downlink data to the IoT function network element, and then the IoT function network element sends the downlink data to the access network device by using an SMF (optional) and an AMF, and then sends the downlink data to the tag. On the uplink data side, the uplink data is directly sent by the tag to the access network device, the access network device sends the uplink data to the IoT function network element through the control plane channel (by using the AMF and the SMF (optional)), and the IoT function network element sends the uplink data to the passive or semi-active IoT server.

(3.3) The IoT function network element and the user plane network element are not co-located.

When the IoT function network element is not co-located with the user plane network element, the IoT function network element serves as a network element in a local communication network to establish a communication connection to the user plane network element. In an embodiment, the user plane network element communicates with the IoT function network element through a dedicated interface (for example, an N4 interface). In an embodiment, the user plane network element communicates with the IoT function network element through a service-based interface.

(4) A RAN establishes the control plane channel as a proxy.

Figure 8:
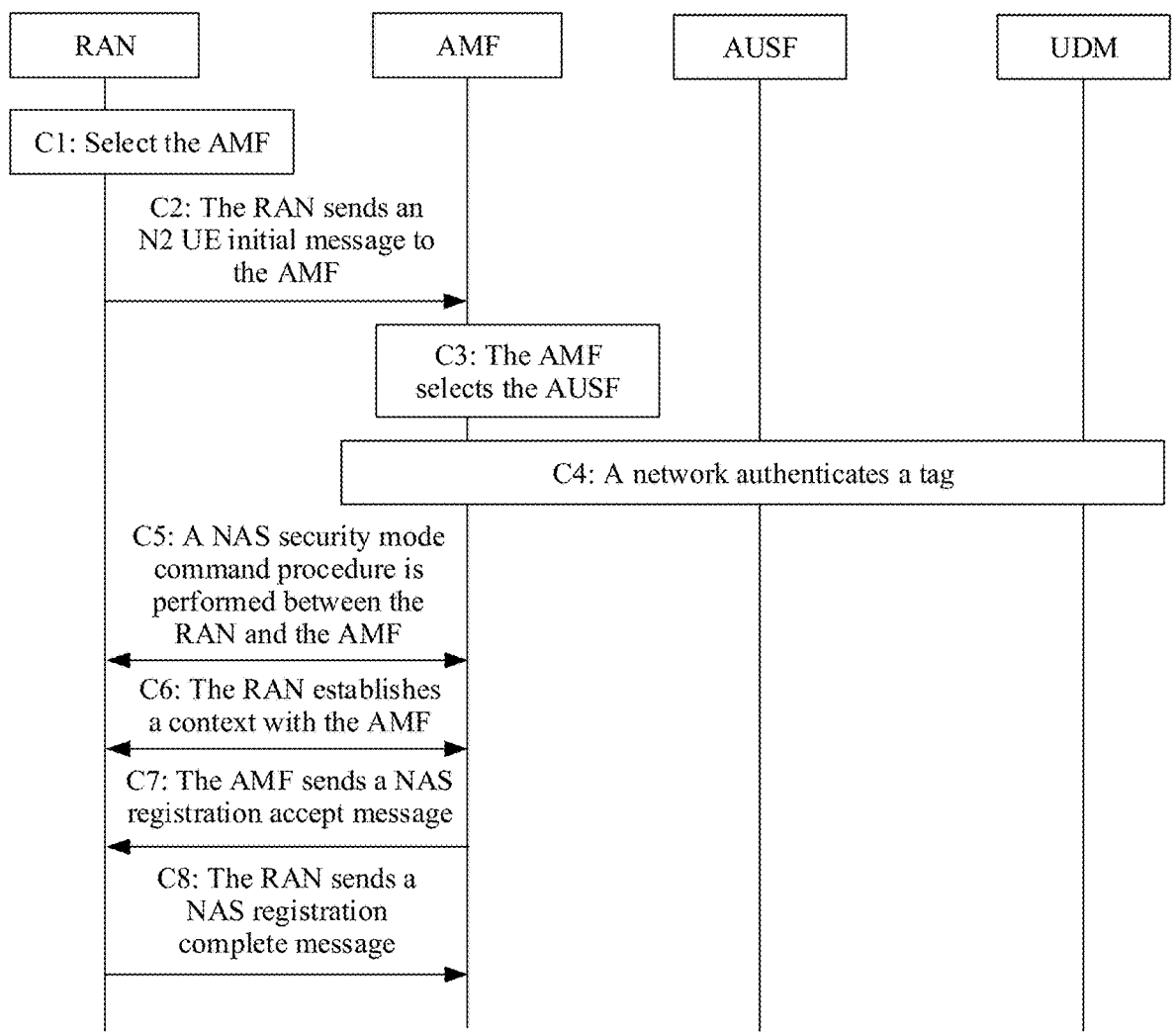
FIG. 8 is a schematic flowchart of establishing a control plane channel by a RAN as a proxy according to an embodiment of this application.

In architectures shown in (3.1) to (3.3), to transmit a passive or semi-active IoT instruction, the RAN needs to establish, as a proxy, the control plane (or user plane) channel at a granularity of a RAN or a tag. "Establishing as a proxy" may also be referred to as "establishing as a proxy" in this embodiment of this application. The control plane (or user plane) channel at a granularity of a RAN means that the RAN establishes the control plane (or user plane) channel for communication of the passive or semi-active IoT data. In this case, each RAN has a corresponding identifier (which may also be referred to as an SUPI established by the RAN as a proxy for the tag) of a terminal. The RAN supports a function of the terminal, and establishes the control plane (or user plane) channel of the terminal with the core network by using the identifier of the terminal. The control plane (or user plane) channel of the terminal is used to transmit control signaling or user plane data of the tag within a coverage area of the RAN. The control plane (or user plane) channel at a granularity of a tag means that the RAN establishes the control plane (or user plane) channel as a proxy for each tag. For example, the RAN constructs a terminal identifier (which may also be referred to as an SUPI established by the RAN as a proxy for the tag) by using an identifier corresponding to the tag, and establishes the control plane (or user plane) channel for the tag by using the constructed terminal identifier. The control plane (or user plane) channel is a channel between the RAN and the core network, and is used to transmit control plane signaling or user plane data of a corresponding tag. For example, the RAN establishes the control plane channel as a proxy for the tag. "Establishing as a proxy" means that the RAN constructs non-access stratum (non-access stratum, NAS) signaling for the tag, and completes a procedure of establishing the control plane channel based on the signaling. For a specific procedure of "establishing the control plane channel as a proxy", refer to FIG. 8. FIG. 8 is a schematic flowchart of establishing a control plane channel by a RAN as a proxy according to an embodiment of this application.

C1: The RAN selects an AMF.

In operation C1, the RAN selects the AMF.

C2: The RAN sends an N2 UE initial message to the AMF.

In operation C2, the RAN sends the N2 UE initial message to the AMF. The N2 UE initial message includes non-access stratum (NAS) signaling. The NAS signaling is a registration request message, and the registration request message includes a terminal identifier. When the RAN establishes a control plane channel at a granularity of a tag, the terminal identifier is a terminal identifier constructed based on an identifier of the tag. When the RAN establishes a control plane channel at a granularity of a RAN, the terminal identifier is an identifier of a terminal corresponding to the RAN. The terminal identifier may be in a form of a SUCI.

C3: The AMF selects an AUSF.

C4: A network authenticates the tag.

In operation C4, the network authenticates the tag.

C5: A NAS security mode command procedure is performed between the RAN and the AMF.

In operation C5, after the authentication is successful, the AMF initializes a NAS security mode command procedure. The RAN responds to the AMF with a NAS security mode complete message through an N2 uplink NAS message. In this case, the RAN replaces the tag to establish a NAS security context with the AMF.

C6: The RAN establishes a context with the AMF.

In operation C6, after receiving the NAS security mode complete message from the RAN, the AMF sends an initial context request (N2 Initial Ctx Request) to the RAN. After completing context creation, the RAN sends a response message (N2 Initial Ctx Response) to the AMF. In this case, the RAN establishes the context in place of the tag.

C7: The AMF sends a NAS registration accept message.

C8: The RAN sends a NAS registration complete message.

Operations C7 and C8 show that a procedure of establishing the control plane channel by the RAN as a proxy for the tag is completed, and the tag is successfully registered with the core network.

(5) The RAN completes a PDU session establishment procedure for the tag.

Figure 9A:
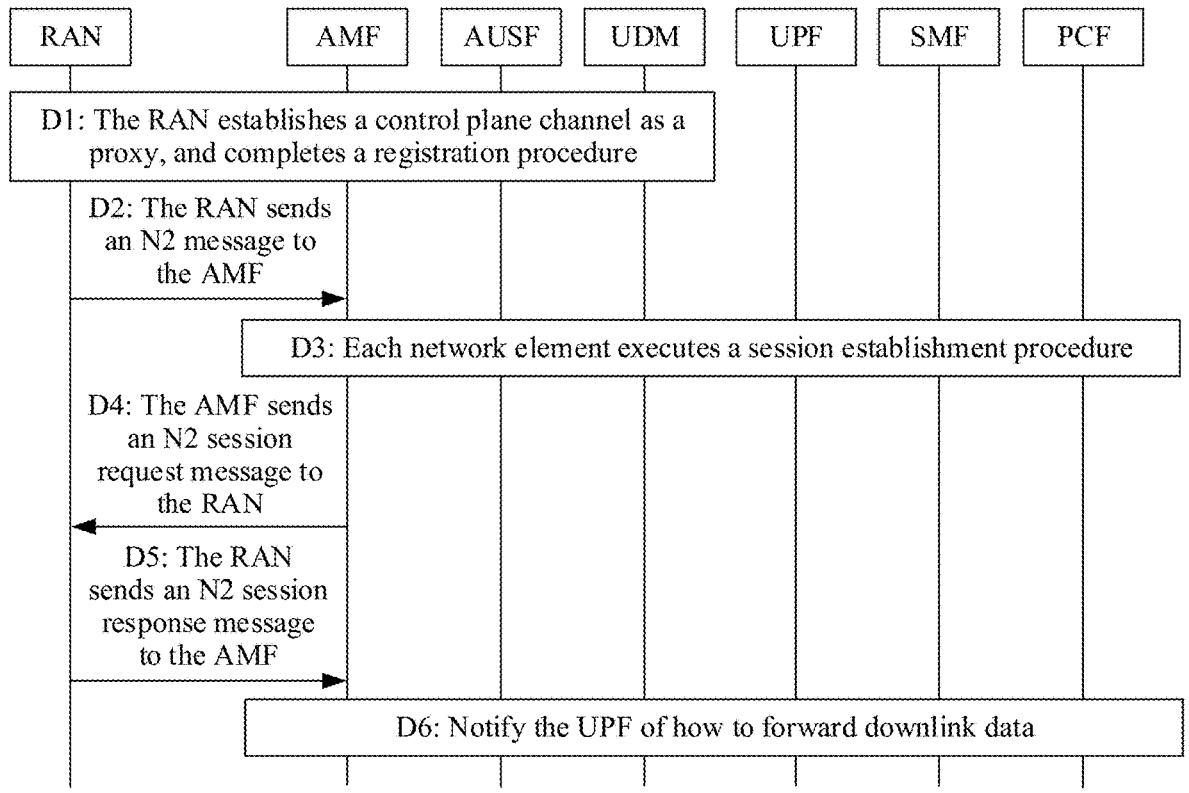
FIG. 9a is a schematic flowchart of a procedure of establishing a session by a RAN as a proxy according to an embodiment of this application.

On the basis of FIG. 8, that the RAN establishes the user plane channel for the tag is described. FIG. 9a is a schematic flowchart of a procedure in which a RAN completes a protocol data unit PDU session establishment procedure for a tag according to an embodiment of this application. Before sending a PDU session establishment request, the RAN needs to help the tag complete a registration procedure shown in FIG. 9a.

D1: A RAN establishes a control plane channel as a proxy, and completes a registration procedure.

Operation D1 is similar to the operations shown in FIG. 8, and details are not described herein again.

D2: The RAN sends an N2 message to an AMF.

In operation D2, the RAN sends the N2 message to the AMF. The N2 message includes a PDU session establishment request message (PDU Session Establishment Request), and the PDU session establishment request message is a NAS message.

The PDU session establishment request message includes a session identifier (e.g., PDU Session ID). Optionally, the PDU session establishment request message further includes one or more of the following parameters: a request type, a UE requested data network name (UE Requested DNN), slice information (S-NSSAI), or the like. The request type may include one or more of the following:

A. Initial request, which indicates that a session establishment request message is used to request to establish a new session. In this case, a session identifier in the message should be a new session identifier generated by UE, that is, should be different from a session identifier of a currently established session.

B. Existing PDU session, which indicates that a session establishment request message is used to request to switch a currently established session from 3GPP access to non-3GPP access, or from non-3GPP access to 3GPP access, or is used to request to switch a currently established 4G PDN connection to 5G. In this case, the session identifier should be a session identifier of a currently established session, indicating that the session needs to be switched.

C. Emergency request, which indicates that a session establishment request message is used to request to establish a PDU session for an emergency service.

D3: Each network element executes a session establishment procedure.

In operation D3, main operations of establishing a session are as follows:

D3.1: The AMF selects an SMF.

D3.2: The AMF sends a session create session context request message to the SMF, where the session create session context request message includes parameters such as an SUPI (e.g., UE identifier), a UE requested DNN, and a PDU session ID.

D3.3: The SMF obtains session management subscription data from a UDM, where operation D3.3 is an optional operation.

D3.4: The SMF feeds back a session create session context response message to the AMF.

D3.5: Execute a session authentication or authorization procedure, where D3.5 is an optional operation.

D3.6: If a dynamic PCC rule is required, the SMF selects a PCF, and establishes a session policy association with the PCF.

D3.7: The SMF selects a UPF.

D3.8: The SMF initiates session policy association modification to the PCF. In this operation, the SMF sends, to the PCF, an IP address allocated to the UE.

D3.9: The SMF establishes an N4 connection to the UPF.

D3.10: The SMF sends an N1N2 message to the AMF, where the message includes information such as a session identifier, N2 interface session management information (N2 SM information), and an N1 interface session management container (N1 SM Container). The N2 SM information is sent by the SMF to the RAN by using the AMF, and information in the N1 SM container is sent by the SMF to the RAN by using the AMF (the AMF subsequently sends the information to the RAN by using a NAS message). The N2 SM information includes information such as a tunnel endpoint identifier of the UPF. The information is sent to the RAN to inform the RAN where uplink data should be sent. The N1 SM container includes a session establishment accept message (an optional manner, PDU Session Establishment Accept) and other session-related parameter information.

D3.11: The AMF sends an N2 session request message to the RAN, where the N2 session request message includes the N2 SM information, and the NAS message that needs to be sent to the UE, and the NAS message includes the session identifier and the N1 SM container.

D3.12: The RAN establishes an air interface resource with the UE, and the RAN sends the NAS message to the UE, where the NAS message includes the PDU session establishment accept message.

D3.13: The RAN sends an N2 session response message to the AMF, where the N2 session response message includes a tunnel endpoint identifier (which is subsequently sent to the UPF by using the AMF and the SMF) on a RAN side. This information is used to inform the UPF where the downlink data should be sent.

D3.14: The AMF sends, to the SMF by using a PDU session update session context request, a message sent by the RAN.

D3.15: The SMF sends tunnel endpoint identifier information of an access network (AN) on the RAN side to the UPF by using an N4 session modification procedure.

D3.16: The SMF sends a session update session context response message to the AMF.

D4: The AMF sends the N2 session request message to the RAN.

In operation D4, the AMF sends an N2 PDU session request message to the RAN, where the N2 PDU session request message includes a session establishment accept message. The AMF sends N3 tunnel information (namely, CN Tunnel Info) to the RAN, so that the RAN learns how to send the uplink data.

D5: The RAN sends an N2 session response message to the AMF.

In operation D5, the RAN sends the N2 session response message to the AMF. The N2 session response message includes tunnel information of the RAN, and the tunnel information of the RAN includes an internet protocol (IP) address of the RAN, tunnel endpoint identifier information of the RAN, and the like.

D6: The AMF notifies the UPF of how to forward the downlink data.

In operation D6, the tunnel information of the RAN is sent to the UPF by using the AMF and the SMF, so that the UPF learns how to forward the downlink data. Specifically, the AMF sends the tunnel information of the RAN to the SMF, and the SMF sends the tunnel information of the RAN to the UPF.

The following describes embodiments of this application with reference to accompanying drawings. It should be noted that each network element (or network function) in the following embodiments may be another network element having a function of the network element. For example, an IoT function network element may be another network element (or network function) having a function of the IoT function network element in a future communication system. This is not limited herein. The IoT function network element in embodiments of this application includes but is not limited to: a UPF, an AMF, an SMF, an NRF, or a first network element.

Figure 9B:
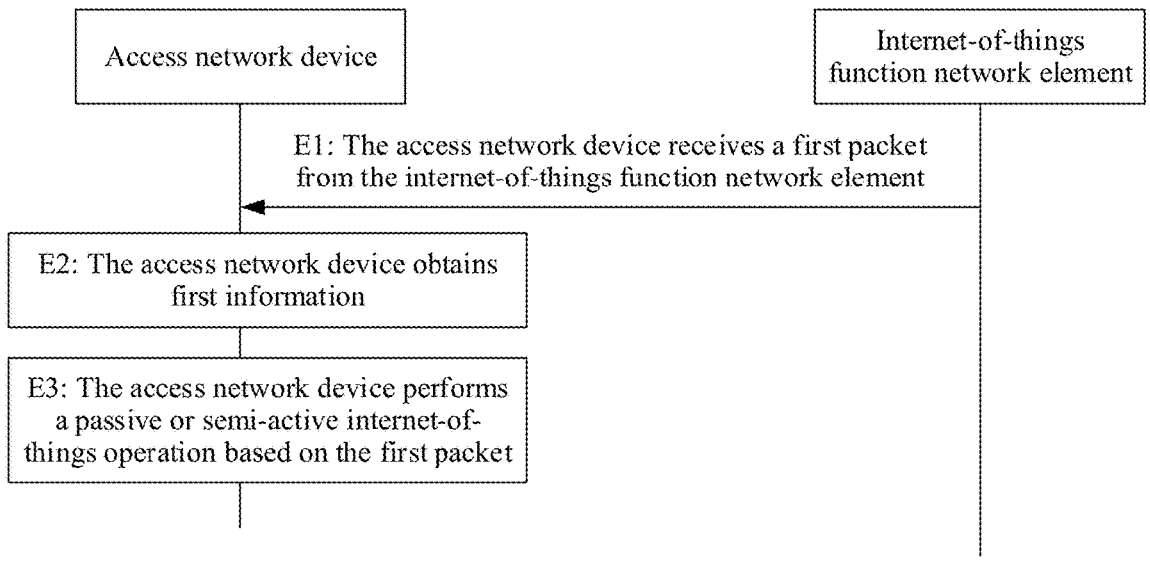
FIG. 9b is a schematic flowchart of an embodiment of a packet transmission method according to an embodiment of this application.

First, refer to FIG. 9b. FIG. 9b is a schematic flowchart of an embodiment of a packet transmission method according to an embodiment of this application. The packet transmission method provided in this embodiment of this application includes the following operations.

E1: An access network device receives a first packet from an IoT function network element.

In operation E1, the IoT function network element generates the first packet according to a passive or semi-active IoT instruction from a passive or semi-active IoT server. The first packet includes the passive or semi-active IoT instruction.

For example, the passive or semi-active IoT server sends the passive or semi-active IoT instruction by using a reading application programming interface (Reading API) or a writing application programming interface (Writing API) in an ALE protocol. The passive or semi-active IoT instruction includes an event cycle specification (ECSpecs) instruction or a command cycle specification (CCSpecs) instruction. The event cycle specification instruction or the command cycle specification instruction includes a tag range that needs to be inventoried, or a tag range on which a read operation or a write operation needs to be performed.

In an embodiment, the IoT function network element sends the first packet to the access network device by using a first session. A session type of the first session is the passive or semi-active internet of things, or a session identifier of the first session indicates that the first session is related to the passive or semi-active internet of things. For specific operations of establishing the first session, refer to operations S2 to S4 in subsequent embodiments.

E2: The access network device obtains first information.

In an embodiment, information indicating that the first packet includes the passive or semi-active IoT instruction is referred to as the first information. The first information may be sent by the IoT function network element to the access network device. Alternatively, the first information may be obtained by the access network device from the IoT function network element, or the first information may be obtained by the access network device from context information. This is not limited herein. Optionally, the first packet may include the first information, or the first packet and the first information may be independent of each other, may be sent together, or may not be sent together. This is not limited herein.

The access network device determines, based on the first information, that the first packet is related to the passive or semi-active internet of things. In other words, the first packet needs to be processed by using a second protocol, or the first packet includes the passive or semi-active IoT instruction.

In an embodiment, when the first packet satisfies the first information, the first packet includes the passive or semi-active IoT instruction. For example, the first information includes a session identifier of the first session or a session type of the first session. When the access network device receives a packet of the first session, the access network device determines that the packet is related to the passive or semi-active internet of things or that the first packet includes a passive or semi-active IoT instruction.

In an embodiment, the first information is indication information included in the first packet. When the packet received by the access network device includes the indication information, the first packet includes the passive or semi-active IoT instruction. For example, the first information includes one or more of the following: a message type of the first packet, a container type of the first packet, tunnel identifier information of the first packet, an information type of the first packet, or the session identifier of the first session. For example, the message type of the first packet may be described in a message type field in a packet header of the first packet. When the message type field in the packet header of the packet received by the access network device is the same as the message type of the first packet of the first information, the access network device determines that the packet is related to the passive or semi-active internet of things or that the first packet includes the passive or semi-active IoT instruction. For another example, the tunnel identifier information of the first packet is tunnel identifier information of the first session established by the access network device as a proxy, namely, an endpoint identifier (a tunnel endpoint identifier on an access network side and/or a tunnel endpoint identifier on a core network side) of an N3 tunnel when the access network device establishes the first session. The access network device may learn, by using the tunnel identifier information in the first packet header and the tunnel endpoint identifier (for example, the two are the same or indicate a same tunnel endpoint identifier) in the first information, that the first packet is related to the passive or semi-active internet of things. For details, refer to subsequent embodiments.

For example, in the first packet generated by the IoT function network element, the message type of the first packet indicates that the first packet includes the passive or semi-active IoT instruction, or that the first packet needs to be processed by using the second protocol. In an embodiment, the packet header of the first packet includes the message type of the first packet. The message type of the first packet indicates that the first packet includes the passive or semi-active IoT instruction, or that the first packet needs to be processed by using the second protocol.

For example, the IoT function network element generates the first packet through encapsulation by using a general packet radio service tunnelling protocol for a user plane (GTP-U). Specifically, the packet header of the first packet is a GTP-U packet header, the GTP-U packet header includes a message type field, and the message type field may also be referred to as the message type of the first packet. The message type field may indicate that the first packet includes the passive or semi-active IoT instruction, or that the first packet needs to be processed by using the second protocol. The message type field may be "RFID", "Passive IoT", "P-IoT", or "LLRP". This is not limited herein.

In an embodiment, the IoT function network element may further record the message type of the first packet in a reserved field or another field in the first packet.

E3: The access network device performs a passive or semi-active IoT operation based on the first packet.

In operation E3, the access network device determines, based on the first information, the passive or semi-active IoT instruction included in the first packet. The access network device performs the passive or semi-active IoT operation according to the passive or semi-active IoT instruction, and obtains a response to the passive or semi-active IoT instruction.

In an embodiment, the access network device determines, based on the first information, that the first packet includes the passive or semi-active IoT instruction. The access network device processes (or parses) the first packet by using the second protocol, to obtain first intermediate data. The first intermediate data includes the passive or semi-active IoT instruction.

In another possible embodiment, the access network device processes the first packet based on the first information by using the second protocol, to obtain the first intermediate data.

In an embodiment, after receiving the first packet, the access network device processes the first packet by using the second protocol, to obtain the first intermediate data.

For example, the passive or semi-active IoT operation includes but is not limited to a tag read/write operation, a tag inventory operation, and the like. The response to the passive or semi-active IoT instruction includes but is not limited to read data of a tag, an inventory operation result of a tag, or the like.

In an embodiment of this application, the access network device receives the first packet from the IoT function network element. The access network device obtains the first information, and determines, based on the first information, that the first packet includes the passive or semi-active IoT instruction. According to the foregoing method, the access network device learns that the packet from the IoT function network element is related to the passive or semi-active internet of things, and the access network device performs the passive or semi-active IoT operation based on the first packet. This resolves a packet transmission problem in a scenario in which a passive or semi-active IoT system is converged with a cellular network. In this way, the cellular network can parse a passive or semi-active IoT application packet, and can perform a related operation based on the application packet.

With reference to the foregoing embodiment, the following provides description by using an example in which the IoT function network element is a user plane network element or the IoT function network element serves as an independent network element (that is, the IoT function network element is the first network element) to establish a communication connection to the user plane network element. In this embodiment, an example in which the user plane network element is a UPF is used for description. Specifically, refer to FIG. 10a-1, FIG. 10a-2, and FIG. 10a-3. FIG. 10a-1, FIG. 10a-2, and FIG. 10a-3 are a schematic flowchart of an embodiment of a packet transmission method according to an embodiment of this application. The packet transmission method provided in this embodiment of this application includes the following operations.

1001: An SMF configures a first rule and/or a second rule for a UPF.

Operation 1001 is an optional operation.

In an embodiment, the first rule indicates how the UPF determines whether the received packet is from a passive or semi-active IoT server. The second rule is further used to indicate how the UPF processes a packet from the passive or semi-active IoT server. Alternatively, the second rule indicates how the UPF processes a packet that matches specific packet detection information (for example, a packet from the passive or semi-active IoT server has specific packet detection information).

The second rule may indicate a protocol type that needs to be used by the UPF to process a second packet, and send the second packet to the first network element, or send the parsed second packet to the access network device. The second packet is a packet from the passive or semi-active IoT server. For example, a method for processing the second packet by the UPF is shown in operations 1003a and 1003b or operations 1004a to 1004e in this embodiment of this application.

Optionally, the second rule includes a forwarding action rule (Forwarding Action Rule, FAR).

The first rule includes a packet detection rule (PDR).

For example, the UPF determines, according to the PDR rule, whether the received packet is from the passive or semi-active IoT server. The UPF determines, according to the FAR rule, how to process the packet from the passive or semi-active IoT server.

In another example, the UPF determines, based on address information of the packet, that the received packet is from the passive or semi-active IoT server. The UPF determines, according to the FAR rule, how to process the packet from the passive or semi-active IoT server.

In another example, the UPF determines, according to the PDR rule, whether the received packet is from the passive or semi-active IoT server. The UPF determines, according to another predefined rule, how to process the packet from the passive or semi-active IoT server.

Further, the first rule and/or the second rule may be an enhanced N4 rule. The enhanced N4 rule is related to a passive or semi-active IoT service. The first rule and/or the second rule may include an enhanced FAR rule and/or an enhanced PDR rule.

For example, the UPF determines, according to the enhanced PDR rule, whether the received packet is from the passive or semi-active IoT server. The UPF determines, according to the enhanced FAR rule, how to process the packet from the passive or semi-active IoT server.

In another example, the UPF determines, based on address information of the packet, that the received packet is from the passive or semi-active IoT server. The UPF determines, according to the enhanced FAR rule, how to process the packet from the passive or semi-active IoT server.

In another example, the UPF determines, according to the enhanced PDR rule, whether the received packet is from the passive or semi-active IoT server. The UPF determines, according to another predefined rule, how to process the packet from the passive or semi-active IoT server.

In an embodiment, when the UPF is co-located with the first network element, the SMF selects, from a plurality of UPFs in a current network, a UPF co-located with the first network element (or a UPF having a function of the first network element). The SMF configures the first rule and/or the second rule for the UPF.

It should be noted that the first rule and/or the second rule may alternatively be pre-configured in the UPF. In this case, operation 1001 is not performed. The first rule may be sent by the SMF to the UPF, or may be pre-configured on the UPF. The second rule may be sent by the SMF to the UPF, or may be pre-configured on the UPF. In an embodiment, the SMF sends the first rule and the second rule to the UPF. In an embodiment, the SMF sends the first rule to the UPF, and the second rule is pre-configured on the UPF. In still another embodiment, the SMF sends the second rule to the UPF, and the first rule is pre-configured on the UPF. In still another embodiment, the first rule and the second rule are pre-configured on the UPF.

1002: The UPF receives the second packet from the passive or semi-active IoT server.

In an embodiment, before operation 1002, the RAN establishes the first session as a proxy, where the first session is used to transmit an instruction or an operation result related to the passive or semi-active internet of things. For a procedure in which the RAN establishes the first session as a proxy, refer to descriptions in FIG. 9a.

Correspondingly, the passive or semi-active IoT server sends the second packet to the UPF.

Optionally, the UPF determines, according to the first rule, that the second packet is from the passive or semi-active IoT server.

In an embodiment, the UPF determines, according to the first rule, that the second packet includes the passive or semi-active IoT instruction. For example, if the UPF determines that the second packet matches the PDR rule, the UPF determines that the second packet includes the passive or semi-active IoT instruction, and the UPF indicates that the UPF or another network element processes the second packet.

For example, the UPF determines, based on address information of the second packet, whether the second packet is from the passive or semi-active IoT server. The address information of the second packet is, for example, a source IP address of the second packet.

Optionally, when operation 1001 is not performed, the UPF determines, according to the pre-configured first rule, whether the received second packet is from the passive or semi-active IoT server.

In an embodiment, when operation 1001 is not performed, the UPF determines, based on an IP address of the second packet, whether the received second packet is from the passive or semi-active IoT server. When the second packet is from the passive or semi-active IoT server, the UPF processes the second packet by using a first protocol and/or the second protocol, to generate the first packet.

In an embodiment, when operation 1001 is not performed, the UPF processes all received packets by using the first protocol and/or the second protocol. When the parsing is successful, the received packet is from the passive or semi-active IoT server. The UPF generates the first packet based on the received packet.

In an embodiment, when operation 1001 is performed, the UPF determines, according to the first rule configured by the SMF, whether the received second packet is from the passive or semi-active IoT server.

In an embodiment, the second packet includes the passive or semi-active IoT instruction. For example, the passive or semi-active IoT server sends the passive or semi-active IoT instruction by using a reading application programming interface (Reading API) or a writing application programming interface (Writing API) in an ALE protocol. The passive or semi-active IoT instruction includes an event cycle specification (ECSpecs) instruction or a command cycle specification (CCSpecs) instruction. The event cycle specification instruction or the command cycle specification instruction includes a tag range that needs to be inventoried, or a tag range on which a read operation or a write operation needs to be performed.

After operation 1002, based on a deployment relationship between the IoT function network element and the UPF, there may be two solutions: (1) The UPF and the IoT function network element are co-located, or the UPF implements a function of the IoT function network element, for example, an architecture shown in FIG. 5; and (2) the UPF and the IoT function network element are independent of each other, and the UPF establishes a communication connection to the IoT function network element, where the IoT function network element is also referred to as the first network element, for example, an architecture shown in FIG. 6. Specifically, operations corresponding to the solution (1) are 1003a and 1003b, and operations corresponding to the solution (2) are 1004a to 1004e.

1003a: The UPF processes the second packet by using the first protocol, to generate the first intermediate data.

In this embodiment, the UPF processes (or parses) the second packet by using the first protocol, and data obtained through processing is referred to as the first intermediate data.

In an embodiment, the first protocol is the ALE protocol.

In an embodiment, the UPF determines, according to the second rule, that the second packet needs to be processed by using the first protocol.

1003b: The UPF processes the first intermediate data by using the second protocol, to generate the first packet.

In this embodiment, the UPF processes the first intermediate data by using the second protocol, to generate the first packet.

For example, the second protocol is an LLRP.

In an embodiment, the UPF determines, according to the second rule, that the first intermediate data needs to be processed by using the second protocol.

The following describes operations in which the UPF generates the first packet.

In this embodiment, the first packet generated by the UPF may include the first information. Alternatively, the first packet generated by the UPF may not include the first information.

For example, in the first packet generated by the UPF, the message type of the first packet indicates that the first packet includes the passive or semi-active IoT instruction, or that the first packet needs to be processed by using the second protocol. In an embodiment, the packet header of the first packet includes the message type of the first packet. The message type of the first packet indicates that the first packet includes the passive or semi-active IoT instruction, or indicates that the first packet needs to be processed by using the second protocol.

In another example, the UPF generates the first packet through encapsulation by using a general packet radio service tunnelling protocol for a user plane (GTP-U). Specifically, the packet header of the first packet is a GTP-U packet header, the GTP-U packet header includes a message type field, and the message type field may also be referred to as the message type of the first packet. The message type field may indicate that the first packet includes the passive or semi-active IoT instruction, or that the first packet needs to be processed by using the second protocol. The message type field may be "RFID", "Passive IoT", "P-IoT", or "LLRP". This is not limited herein.

In an embodiment, the UPF may further record the message type of the first packet in a reserved field or another field in the first packet.

1004a: The UPF sends the second packet to the first network element.

In an embodiment, after determining that the second packet is from the passive or semi-active IoT server, the UPF sends the second packet to the first network element.

In an embodiment, the UPF sends the second packet to the first network element according to the second rule.

1004b: The first network element processes the second packet by using the first protocol, to generate the first intermediate data.

In this embodiment, after the first network element receives the second packet, the first network element processes (or parses) the second packet by using the first protocol, and data obtained through processing is referred to as the first intermediate data.

In an embodiment, the first protocol is the application level event (Application Level Event, ALE) protocol. The first intermediate data is referred to as an ALE protocol message.

1004c: The first network element processes the first intermediate data by using the second protocol, to generate second intermediate data.

In this embodiment, the first network element processes the first intermediate data by using the second protocol, to generate the second intermediate data.

In an embodiment, the second protocol is an LLRP. The second intermediate data is referred to as an LLRP protocol message.

1004d: The first network element sends the second intermediate data to the UPF.

1004e: The UPF processes the second intermediate data to generate the first packet.

In this embodiment, after the first network element sends the second intermediate data to the UPF, the UPF processes the second intermediate data to obtain the first packet. Specifically, the UPF encapsulates the second intermediate data to obtain the first packet.

Further, in an embodiment, in the first packet generated by the UPF, a packet header of the first packet indicates that the first packet needs to be processed by using the second protocol. In an embodiment, the packet header of the first packet includes the message type of the first packet. The message type of the first packet indicates that the first packet needs to be processed by using the second protocol.

For example, the UPF generates the first packet through encapsulation by using a general packet radio service tunnelling protocol for a user plane (GTP-U). Specifically, the packet header of the first packet is a GTP-U packet header, the GTP-U packet header includes a message type field, and the message type field may also be referred to as the message type of the first packet. The message type field may indicate that the first packet needs to be processed by using the second protocol. The message type field may be "RFID", "Passive IoT", "P-IoT", or "LLRP". This is not limited herein.

In an embodiment, the UPF may further record the message type of the first packet in a reserved field or another field in the first packet. The message type of the first packet indicates that the first packet needs to be processed by using the second protocol.

1005: The UPF sends the first packet to the access network device.

In an embodiment, after generating the first packet, the UPF sends the first packet to the access network device.

In an embodiment, the UPF sends the first packet to the access network device by using the first session. A procedure in which the RAN establishes the first session is a procedure in which the RAN establishes a session as a proxy in FIG. 9a. The session type of the first session is the passive or semi-active internet of things, or the session identifier of the first session indicates that the first session is related to the passive or semi-active internet of things. For a specific operation of establishing the first session, refer to operation S2 in a subsequent embodiment.

1006: The RAN processes the first packet based on the first information by using the second protocol, to obtain the first intermediate data.

In this embodiment, the RAN obtains the first information, and determines, based on the first information, that the first packet includes the passive or semi-active IoT instruction. For specific content of obtaining the first information by the RAN and specific content of the first information, refer to descriptions of E2 in FIG. 9b. The RAN processes the first packet by using the second protocol. For example, the RAN determines, based on the session identifier of the first session or the session type of the first session, that the first packet transmitted in the first session includes the passive or semi-active IoT instruction.

The RAN processes (or parses) the first packet by using the second protocol, to obtain the first intermediate data. The first intermediate data includes the passive or semi-active IoT instruction. The passive or semi-active IoT instruction may be an air interface instruction.

In an embodiment, the RAN directly processes the first packet by using the second protocol, to obtain the passive or semi-active IoT instruction.

In an embodiment, the RAN determines, based on the session identifier of the first session or the session type of the first session, that the first packet transmitted in the first session includes the passive or semi-active IoT instruction. Then, the RAN determines that the first packet needs to be processed by using the second protocol.

In a possible replacement of operation 1006, in an embodiment, the RAN determines, based on a source IP address included in the first packet, that the first packet is from the first network element or a UPF (the UPF and the first network element are co-located or the UPF has a function of the first network element). Then, the RAN determines that the first packet needs to be processed by using the second protocol.

1007: The RAN performs a passive or semi-active IoT operation based on the first intermediate data, and obtains a response to the passive or semi-active IoT instruction.

In this embodiment, the RAN performs the passive or semi-active IoT operation according to the passive or semi-active IoT instruction included in the first intermediate data, and obtains the response to the passive or semi-active IoT instruction. For example, the passive or semi-active IoT operation includes but is not limited to a tag read/write operation, a tag inventory operation, and the like. The response to the passive or semi-active IoT instruction includes but is not limited to read data of a tag, an inventory operation result of a tag, or the like.

1008: The RAN processes the response to the passive or semi-active IoT instruction by using the second protocol, to generate a third packet.

In an embodiment, the RAN processes the response to the passive or semi-active IoT instruction by using the second protocol, to obtain the third packet. Specifically, first, the RAN processes the response to the passive or semi-active IoT instruction, to obtain a message packet including the response to the passive or semi-active IoT instruction. Then, the RAN further encapsulates the message packet to obtain the third packet. The third packet includes the response to the passive or semi-active IoT instruction.

In an embodiment, the IoT function network element obtains second information. In this embodiment of this application, information indicating that the third packet includes signaling related to the passive or semi-active internet of things, or indicating that the third packet needs to be processed by using the second protocol is referred to as the second information. The second information may be sent by the access network device to the IoT function network element, or the second information may be obtained by the IoT function network element or from the access network device. This is not limited herein. In an embodiment, the third packet may include the second information, and the third packet may alternatively be independent of the second information. That is, the second information may be sent together with the third packet, or the second information and the third packet may be sent separately, or the IoT function network element obtains the second information in another manner. This is not limited herein. The IoT function network element determines, based on the second information, that the third packet is related to the passive or semi-active internet of things, which may also be referred to as determining that the third packet needs to be processed by using the second protocol.

Further, the second information includes one or more of the following: a message type of the third packet, a container type of the third packet, or tunnel identifier information of the third packet. Alternatively, the second information is an information type of the third packet.

For example, in the third packet generated by the RAN, the message type of the third packet indicates that the third packet is related to the passive or semi-active internet of things, or that the third packet needs to be processed by using the second protocol. In an embodiment, a packet header of the third packet includes the message type of the third packet. The message type of the third packet indicates that the third packet needs to be processed by using the second protocol.

For example, the RAN generates the third packet through encapsulation by using a general packet radio service tunnelling protocol for a user plane (GTP-U). Specifically, the packet header of the third packet is a GTP-U packet header, the GTP-U packet header includes a message type field, and the message type field is also referred to as the message type of the third packet. The message type field may indicate that the third packet needs to be processed by using the second protocol. The message type field may be "RFID", "Passive IoT", "P-IoT", or "LLRP". This is not limited herein.

In an embodiment, the RAN may further record the message type of the third packet in a reserved field or another field in the third packet. The message type of the third packet indicates that the third packet needs to be processed by using the second protocol.

1009: The RAN sends the third packet to the UPF.

In this embodiment, optionally, the RAN sends the third packet to the UPF by using the first session.

Operation 1010 or operations 1011a to 1011e are performed after operation 1009.

1010: The UPF generates a fourth packet based on the third packet.

For example, the UPF processes the third packet by using the second protocol and the first protocol, to generate the fourth packet.

In an embodiment, after receiving the third packet, the UPF determines, based on the second information (for example, the message type of the third packet, the packet header of the third packet, the session identifier of the first session, or the session type of the first session), that the third packet needs to be processed by using the second protocol.

For example, after receiving the third packet, the UPF determines, based on the session identifier of the first session or the session type of the first session, that the third packet transmitted in the first session includes the response to the passive or semi-active IoT instruction. Then, the UPF determines that the third packet needs to be processed by using the second protocol.

For example, the second protocol is the LLRP protocol. First, the UPF processes (or parses) the third packet by using the LLRP protocol, to obtain the response to the passive or semi-active IoT instruction. Then, the UPF processes the response to the passive or semi-active IoT instruction by using the first protocol (for example, the ALE protocol), and generates the fourth packet. The fourth packet includes the response to the passive or semi-active IoT instruction.

Operation 1012 is performed after operation 1010.

It may be understood that, in an embodiment, the UPF and the first network element collaboratively process the third packet, to generate the fourth packet. For example, an embodiment is as follows:

1011*a*: The UPF processes the third packet to generate third intermediate data.

In this embodiment, the UPF decapsulates the third packet to generate the third intermediate data. For example, the UPF decapsulates the third packet by using the GTP-U, to generate the third intermediate data. The third intermediate data includes the response to the passive or semi-active IoT instruction.

1011*b*: The UPF sends the third intermediate data to the first network element.

In an embodiment, the UPF sends the third intermediate data to the first network element, and the first network element processes the third intermediate data.

1011*c*: The first network element processes the third intermediate data by using the second protocol, to generate fourth intermediate data.

In an embodiment, after receiving the third packet, the first network element determines, based on the second information (for example, the message type of the third packet, the packet header of the third packet, the session identifier of the first session, or the session type of the first session), that the third packet needs to be processed by using the second protocol.

In an embodiment, the second protocol may be an LLRP.

Specifically, the first network element first parses the third intermediate data by using the second protocol, and generates the fourth intermediate data (including the response to the passive or semi-active IoT instruction). The fourth intermediate data may be an LLRP protocol message.

1011*d*: The first network element processes the fourth intermediate data to generate the fourth packet.

In this embodiment, the first network element processes the fourth intermediate data by using the first protocol, to generate the fourth packet. The fourth packet includes the response to the passive or semi-active IoT instruction. The first protocol may be an application level event ALE protocol.

1011*e*: The first network element sends the fourth packet to the UPF.

Operation 1012 is performed after operation 1011*e*.

1012: The UPF sends the fourth packet to the passive or semi-active IoT server.

It should be noted that operations 1008 to 1012 are optional operations.

In an embodiment of this application, the RAN first establishes the first session as a proxy. The session type of the first session is the passive or semi-active internet of things, or the session identifier of the first session indicates that the first session is related to the passive or semi-active internet of things. In a process in which the RAN agent establishes the first session, the SMF may select the UPF that supports a function of the first network element. The SMF may send the first rule and/or the second rule to the UPF, so that the UPF learns how to identify whether the packet is from the passive or semi-active IoT server, and/or how the UPF processes the second packet from the passive or semi-active IoT server. The first packet sent by the UPF to the RAN may include the first information, so that the RAN efficiently identifies a protocol that needs to be used to process the first packet. The third packet sent by the RAN to the UPF may include the second information, so that the UPF efficiently identifies a protocol that needs to be used to process the third packet. According to the foregoing solutions, a packet transmission problem in a scenario in which a passive or semi-active IoT system is converged with a cellular network is resolved. In this way, the cellular network can parse a passive or semi-active IoT application packet, and a network function (or a network element) deployed in the cellular network can perform a related operation based on the application packet.

In the embodiment shown in FIG. 10*a*-1, FIG. 10*a*-2, and FIG. 10*a*-3, based on a relationship between the first network element and the UPF, there may be two solutions: (1) The UPF and the first network element are co-located, or the UPF implements a function of the first network element, for example, an architecture shown in FIG. 5; and (2) the UPF and the first network element are independent of each other, and the UPF establishes a communication connection to the first network element, for example, an architecture shown in FIG. 6. Descriptions are separately provided below with reference to the accompanying drawings.

(1) The UPF and the first network element are co-located, or the UPF implements a function of the first network element. FIG. 10*b* is a schematic flowchart of a packet transmission method in an application scenario according to an embodiment of this application. The application scenario provided in this embodiment of this application includes the following.

S1: A RAN completes a procedure of establishing a control plane channel of a tag or the RAN.

In operation S1, the RAN establishes the control plane (or user plane) channel at a granularity of the RAN or the tag. A specific establishment method is similar to the method corresponding to FIG. 8, and details are not described herein again.

S2: The RAN sends a PDU session establishment request message to an AMF.

In operation S2, after the RAN establishes the control plane channel of the tag or the RAN, the RAN sends a request message, where the request message is for establishing the first session. For example, the RAN sends the PDU session establishment request message (PDU session establishment request) to the AMF. The PDU session establishment request message is for establishing the first session. The session type of the first session is the passive or semi-active internet of things, or the session identifier of the first session indicates that the first session is related to the passive or semi-active internet of things.

In an embodiment, the PDU session establishment request message includes PDU session type information. The PDU session type information indicates that the session type of the first session is the passive or semi-active internet of things, or indicates that the first session transmits data related to the passive or semi-active internet of things.

In an embodiment, the RAN sends the PDU session type information to the AMF during establishing the PDU session.

The AMF obtains the PDU session type information in a plurality of manners. For example, the RAN sends the PDU session type information to the AMF by using a non-access stratum NAS message, or the RAN sends the PDU session type information to the AMF by using an N2 message. Alternatively, the AMF obtains the PDU session type information from subscription data of the tag or subscription data of a terminal at a granularity of the RAN. Alternatively, the AMF obtains the PDU session type information from data stored in the AMF. This is not limited herein.

After the RAN sends, to the AMF, the PDU session establishment request message for requesting to establish the first session, subsequent actions are similar to those in the foregoing operations D3 to D6. It should be noted that, when D3 is performed, this embodiment has the following differences. For details, refer to the following descriptions of S3a, S3b, and S4.

S3a: The AMF sends a PDU session create session context request to the SMF.

In operation S3a, the AMF sends the PDU session create session context request (for example, an Nsmf_PDUSession_CreateSM Context Request) to the SMF, where the PDU session create session context request indicates to establish the first session. The PDU session create session context request includes the PDU session type information, and the PDU session type information includes the session identifier of the first session and/or the session type of the first session. The PDU session type information indicates that the session type of the first session is the passive or semi-active internet of things, or indicates that the first session transmits data related to the passive or semi-active internet of things.

The session type of the first session is the passive or semi-active internet of things, or the session identifier of the first session indicates that the first session is related to the passive or semi-active internet of things. In this embodiment of this application, the first information may be that the session type of the first session is the passive or semi-active internet of things, or the first information may be the session identifier of the first session. The second information may be that the session type of the first session is the passive or semi-active internet of things, or the second information may be the session identifier of the first session. The access network device may determine, by obtaining the session type of the first session or the session identifier of the first session, that the first packet transmitted in the first session includes the passive or semi-active IoT instruction. The IoT function network element may determine, by obtaining the session type of the first session or the session identifier of the first session, that the third packet transmitted in the first session is related to the passive or semi-active internet of things, or that the third packet includes data related to the passive or semi-active internet of things.

S3b: The SMF sends a PDU session create session context response to the AMF.

In operation S3b, the SMF sends the PDU session create session context response (for example, an Nsmf_PDUSession_CreateSM Context Response) to the AMF in response to the PDU session create session context request.

S4: The SMF selects an appropriate UPF.

In operation S4, in response to the PDU session create session context request received in operation S3a, the SMF selects a UPF supporting a function of the first network element, or the SMF selects a UPF co-located with the first network element. Operation S4 is optional.

After the SMF determines the appropriate UPF, the SMF sends a session establishment accept message to the RAN by using the AMF, to complete a procedure of establishing the first session.

S5: Perform the foregoing operations 1001 and 1002, operations 1003a and 1003b, and operations 1005 to 1012.

(2) The UPF and the first network element are independent of each other, and the UPF establishes a communication connection to the first network element. FIG. 10c is a schematic flowchart of a packet transmission method in an application scenario according to an embodiment of this application. Another application scenario provided in this embodiment of this application includes the following.

Q1: The RAN completes a procedure of establishing a control plane channel of a tag or the RAN.

Q2: The RAN sends a PDU session establishment request message to an AMF.

After the RAN sends, to the AMF, the PDU session establishment request message for requesting to establish the first session, subsequent actions are similar to those in the foregoing operations D3 to D6. It should be noted that, when D3 is performed, this embodiment has the following differences. For details, refer to the following descriptions of Q3a, Q3b, and Q4.

Q3a: The AMF sends a PDU session create session context request to the SMF.

Q3b: The SMF sends a PDU session create session context response to the AMF.

Operations Q1 to Q3b are similar to the foregoing operations S1 to S3b, and details are not described herein again.

Q4: The SMF selects an appropriate UPF.

In operation Q4, in response to the PDU session create session context request received in operation Q3a, the SMF selects a UPF communicatively connected to the first network element. Operation Q4 is optional. For example, all UPFs in the network are communicatively connected to the first network element.

After the SMF determines the appropriate UPF, the SMF sends a session establishment accept message to the RAN by using the AMF, to complete a procedure of establishing the first session.

Q5: Perform operations 1001 and 1002, operations 1004a to 1004e, and operations 1005 to 1012.

The following describes an application scenario in which the IoT function network element is deployed in a core network, for example, architectures shown in FIG. 7a and FIG. 7b. In an embodiment, the IoT function network element is the first network element. In this application scenario, the first packet is transmitted by using a control plane channel. Specifically, refer to FIG. 11A and FIG. 11B. FIG. 11A and FIG. 11B are a schematic flowchart of an embodiment of a packet transmission method according to an embodiment of this application. The packet transmission method provided in this embodiment of this application includes the following operations.

1101: A RAN establishes a first session as a proxy for a tag.

For operation 1101, refer to descriptions of D2 and D3 in FIG. 9a. A session type of the first session is a passive or semi-active internet of things, or a session identifier of the first session indicates that the first session is related to the passive or semi-active internet of things. The first session is used to transmit data related to the passive or semi-active internet of things.

In an embodiment, for the first session, a user plane channel between the RAN and a UPF does not need to be established, and user plane data of the first session is transmitted by using a control plane channel. For example, the first session is a "non-IP data delivery (Non-IP Data Delivery, NIDD) session".

1102: An SMF sends a session management context create request message to an NEF.

In operation 1102, to establish a control plane channel between the RAN and a passive or semi-active IoT server, the SMF sends the session management context create request message (for example, an Nnef_SMContext_Create Request) to the NEF. The session management context create request message includes one or more of parameters such as identifier information of the tag, the session identifier of the first session, the session type of the first session, an SMF identifier, and NIDD information. The NIDD information indicates a maximum packet size. When the SMF establishes a connection to the NEF, the SMF obtains the NIDD information from the NEF. The PDU session establishment accept message sent by the SMF to the tag includes the NIDD information.

1103: The NEF sends a session management context create response message to the SMF.

In operation 1103, the NEF creates session context information. The context information is associated with related information such as the identifier information of the tag, the session identifier of the first session, and the session type of the first session. The NEF sends the session management context create response message (for example, an Nnef_SM-Context_Create Response) to the SMF. The session management context create response message includes the NIDD information, and is used to notify the SMF that session context information of the tag has been created.

Through operations 1101 to 1103, a communication network establishes an NIDD session for the tag. When downlink data sent by the passive or semi-active IoT server is transmitted in the NIDD session, the downlink data is sent to the RAN by using the NEF, the SMF, and an AMF, and then is sent to the tag by using the RAN. Uplink data of the tag is sent to the passive or semi-active IoT server by using the RAN, the AMF, the SMF, and the NEF.

1104: The AMF receives a second packet from the passive or semi-active IoT server.

Operation 1104 may be divided into the following operations.

In operation 1104.1, after the passive or semi-active IoT server sends the second packet to a first network element, the first network element parses the second packet by using a first protocol, and processes the second packet by using a second protocol, to generate a first packet. The second packet includes a passive or semi-active IoT instruction. The first packet includes the passive or semi-active IoT instruction.

In an embodiment, the passive or semi-active IoT server sends the second packet to the first network element by using the NEF. The passive or semi-active IoT server sends a message to the NEF. The message includes the passive or semi-active IoT instruction and an external identifier of the tag (the external identifier of the tag may be understood as identifier information that can be identified by an external network). The external identifier of the tag corresponds to a SUPI of the tag. Specifically, the external identifier is a GPSI. The NEF allocates a corresponding GPSI identifier to the SUPI, and the GPSI identifier is used for interaction with an external third party, to prevent the third party from obtaining the SUPI and avoid a privacy risk. The NEF identifies a corresponding SUPI based on the external identifier of the tag, and sends a message to the first network element, where the message includes the second packet and the SUPI.

In operation 1104.2, the first network element sends the first packet to the SMF. Optionally, the first network element further sends, to the SMF, an SUPI established by the RAN as a proxy for the tag.

In an embodiment, the first network element sends the first packet to the SMF through a service-based interface, where the first packet includes the SUPI established by the RAN as a proxy for the tag.

In an embodiment, the first network element sends the SUPI and the first packet to the SMF through the service-based interface.

In operation 1104.3, the SMF sends the first packet to the AMF.

For example, the SMF sends an Namf_Communication_N1N2MessageTransfer message to the AMF. The Namf_Communication_N1N2MessageTransfer message includes the SUPI, the session identifier of the first session, the session type of the first session, and the first packet.

1105: The AMF sends the first packet to the RAN by using the first session.

In operation 1105, the AMF sends the first packet to the RAN by using the first session. Specifically, the first packet is a downlink non-access stratum transport (DL NAS Transport) message.

Specifically, the first information is the session identifier of the first session and/or the session type of the first session.

1106: An access network device determines that the first packet needs to be processed by using the second protocol.

In operation 1106, the RAN determines, based on the session type of the first session or the session identifier of the first session, that the first packet transmitted in the first session needs to be processed by using the second protocol.

A specific processing manner is similar to the foregoing operation 1006, and details are not described herein again.

It should be noted that operation 1106 is an optional operation, and the access network device may directly process the first packet by using the second protocol, that is, directly proceed to operation 1107 after operation 1005.

1107: The access network device processes the first packet by using the second protocol, to obtain first intermediate data.

Operation 1107 is similar to operation 1006, and details are not described herein again.

1108: The RAN performs a passive or semi-active IoT operation based on the first intermediate data, and obtains a response to the passive or semi-active IoT instruction.

Operation 1108 is similar to operation 1007, and details are not described herein again.

1109: The RAN sends the response to the passive or semi-active IoT instruction to the passive or semi-active IoT server.

Operation 1109 may be divided into the following operations.

In 1109.1, after completing the passive or semi-active IoT operation, the RAN sends the response to the passive or semi-active IoT instruction to the AMF by using an uplink NAS transport message or an N2 message. Specifically, the uplink NAS transport message or the N2 message includes a third packet, and the second packet includes the response to the passive or semi-active IoT instruction. The uplink NAS transport message or the N2 message further includes the session identifier of the first session and/or the session type of the first session.

In 1109.2, the AMF sends an Nsmf_PDUSession_SendMOData request message to the SMF through the service-based interface. The Nsmf_PDUSession_SendMOData request message includes the SUPI established by the RAN as a proxy, the session identifier of the first session, the session type of the first session, and the third packet (the response to the passive or semi-active IoT instruction).

In operation 1109.3, the SMF sends an Nnef_SMContext_Delivery request message to the NEF through the service-based interface. The Nnef_SMContext_Delivery request message includes the SUPI and the third packet (the response to the passive or semi-active IoT instruction).

In operation 1109.4, the NEF sends an Nnef_NIDD_DeliveryNotify request message to the first network element through the service-based interface. The Nnef_NIDD_DeliveryNotify request message includes the third packet (the response to the passive or semi-active IoT instruction).

In operation 1109.5, the first network element parses, by using the second protocol, the third packet included in the Nnef_NIDD_DeliveryNotify request message, and obtains the response to the passive or semi-active IoT instruction. Then, the first network element processes the response to the passive or semi-active IoT instruction by using the first protocol, to generate a fourth packet. Next, the first network element sends the fourth packet to the passive or semi-active IoT server. The fourth packet includes the response to the passive or semi-active IoT instruction.

In an embodiment, the first protocol is an ALE protocol.

In an embodiment, the second protocol is an LLRP.

In an embodiment of this application, the passive or semi-active IoT instruction and the response to the passive or semi-active IoT instruction are transmitted by using the control plane channel. The RAN parses, based on the first information (the session type of the first session or the session identifier of the first session), the data (or the packet) transmitted in the first session by using the second protocol. The RAN performs the passive or semi-active IoT operation based on a parsing result (the passive or semi-active IoT instruction). According to the foregoing solutions, a packet transmission problem in a scenario in which a passive or semi-active IoT system is converged with a cellular network is resolved. In this way, the cellular network can parse a passive or semi-active IoT application packet, and a network function (or a network element) deployed in the cellular network can perform a related operation based on the application packet.

Figure 12A:
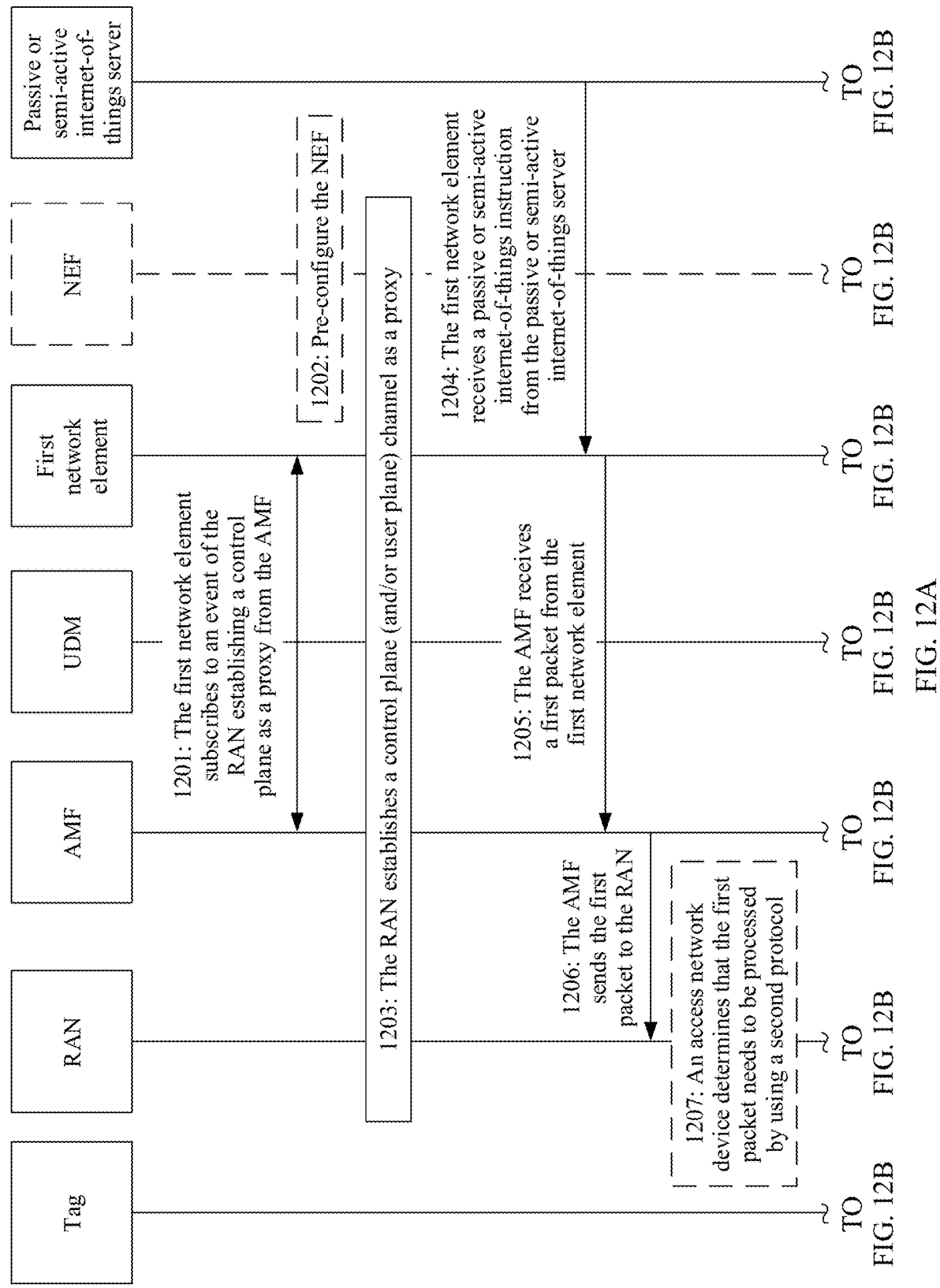
FIG. 12A and FIG. 12B are a schematic flowchart of another embodiment of a packet transmission method according to an embodiment of this application.
Figure 12B:
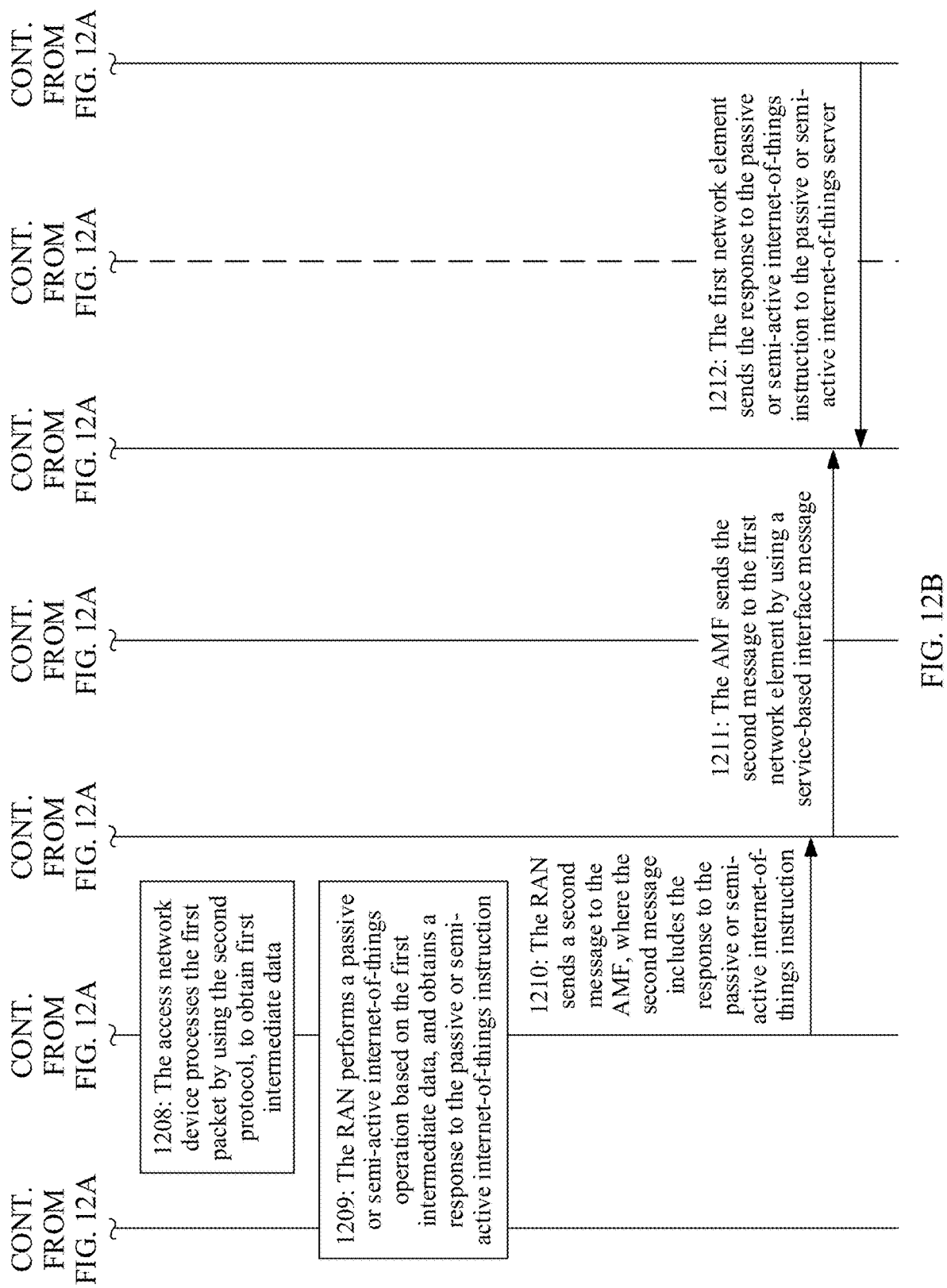

Next, an architecture shown in FIG. 7a is used as an example to describe another embodiment provided in this application. An IoT function network element is a first network element, and the first network element is deployed in a core network. Specifically, refer to FIG. 12A and FIG. 12B. FIG. 12A and FIG. 12B are a schematic flowchart of another embodiment of a packet transmission method according to an embodiment of this application. The packet transmission method provided in this embodiment of this application includes the following operations.

1201: A first network element subscribes to an event of a RAN establishing a control plane as a proxy from an AMF.

In an embodiment, an example in which an IoT function network element is the first network element is used for description. The first network element sends a subscription request to a second network element. The subscription request is used to obtain information about an access network device. The information about the access network device includes but is not limited to a permanent identifier (for example, an SUPI) of the access network device, and information about a core network element that serves the access network device. The information about the access network device includes but is not limited to address information and/or identifier information of the core network element, reader identifier information of the access network device, and the like. In operation 1201, only an example in which the second network element is the AMF is used for description. It may be understood that the IoT function network element may further send the subscription request to another second network element, to subscribe to the event of the RAN establishing the control plane as a proxy.

The core network element includes but is not limited to the AMF, an SMF, a UPF, an NRF, a UDM, an AUSF, a PCF, or the like.

The second network element includes but is not limited to the AMF, the SMF, the UPF, the NRF, the UDM, the AUSF, the PCF, or the like.

For example, the first network element subscribes to the event of the RAN establishing the control plane as a proxy from the AMF, so that the first network element obtains a relationship between an SUPI established by the RAN as a proxy and the RAN (for example, identifier information of the RAN (which may be a reader identifier of the RAN)). For example, the AMF may subscribe from all AMFs in a network, or may subscribe from some AMFs. In this operation, each time the RAN establishes the control plane channel as a proxy, the first network element may learn, by using an event reported by the AMF, which RAN establishes the control plane channel as a proxy, SUPI information established by the RAN as a proxy, and the like. Subsequently, when a passive or semi-active IoT server sends a passive or semi-active IoT instruction (or information, or data) to the first network element, a network element (or a network function, such as the NEF, the AMF, the UDM, or the SMF) responsible for forwarding a packet learns a destination peer end of the packet, that is, a target RAN to which the packet needs to be sent.

1202: Pre-configure the NEF.

Optionally, in an embodiment, the NEF learns, through pre-configuration, that all messages from the passive or semi-active IoT server are forwarded to the first network element. Similarly, all messages from the first network element are forwarded to the passive or semi-active IoT server.

It should be noted that operation 1202 is an optional operation. When operation 1202 is not performed, the passive or semi-active IoT server may directly interact with the first network element.

1203: The RAN establishes a control plane (and/or user plane) channel as a proxy.

In an embodiment, the RAN establishes the control plane (and/or user plane) channel at a granularity of the RAN or a tag. A specific establishment method is similar to the method corresponding to FIG. 8 (and/or FIG. 9a), and details are not described herein again.

1204: The first network element receives the passive or semi-active IoT instruction from the passive or semi-active IoT server.

In this embodiment, the passive or semi-active IoT server sends the passive or semi-active IoT instruction to the first network element.

Optionally, the passive or semi-active IoT server sends the passive or semi-active IoT instruction to the first network element by using the NEF.

The first network element parses the passive or semi-active IoT instruction by using a first protocol, and performs processing by using a second protocol, to generate the first packet. The first packet includes the passive or semi-active IoT instruction.

In an embodiment, the first protocol is an ALE protocol.

In an embodiment, the second protocol is an LLRP protocol.

1205: The AMF receives the first packet from the first network element.

For example, the first network element may send the first packet to the AMF by using a service-based interface message (for example, an Namf_Communication_N1N2MessageTransfer message).

The first packet includes the SUFI established by the RAN as a proxy, and a payload container (Payload container) or an information type. The payload container is also referred to as a container type of the first packet, or is referred to as a container type included in the first packet. The information type is also referred to as an information type of the first packet. That is, first information includes a container type of the first packet or an information type of the first packet.

Specifically, the container type included in the first packet is N1 P-IoT (or N1 Passive IoT) transport. Alternatively, the container type included in the first packet is N2 P-IoT (or N2 Passive IoT) transport.

The information type of the first packet may be "passive IoT information", "P-IoT information", "LLRP information", or the like.

The container type or the information type indicates that the first packet is related to a passive or semi-active internet of things. It should be noted that the container type or the information type is merely an example for description, and does not limit a name of the container type or the information type.

The container includes the passive or semi-active IoT instruction. That is, the passive or semi-active IoT instruction is encapsulated into the first packet by using the second protocol.

1206: The AMF sends the first packet to the RAN.

In an embodiment, when the container type included in the first packet is the N1 P-IoT (or N1 Passive IoT) transport, the AMF sends the first packet by using a non-access stratum (Non-Access Stratum, NAS) protocol stack, and the first packet is an N1 P-IoT (or N1 Passive IoT) transport message (also referred to as a downlink NAS transport message, DL NAS Transport).

Alternatively, when the container type included in the first packet is the N2 P-IoT (or N2 Passive IoT) transport, the AMF sends the first packet by using a next generation application protocol (NGAP) protocol stack, and the first packet is an N2 P-IoT (or N1 Passive IoT) transport message.

Specifically, the first packet includes the first information. The first information includes the container type of the first packet or an information type of a second packet.

Specifically, the container type of the first packet is the N1 P-IoT (or N1 Passive IoT) transport. Alternatively, the container type of the first packet is the N2 P-IoT (or N2 Passive IoT) transport. The information type of the first packet may be "passive IoT information", "P-IoT information", "LLRP information", or the like.

The container type or the information type indicates that the first packet is related to the passive or semi-active internet of things. It should be noted that the container type or the information type is merely an example for description, and does not limit a name of the container type or the information type.

The container (an "N1 P-IoT (or N1 Passive IoT) transport" container or an "N2 P-IoT (or N2 Passive IoT) transport" container) includes the passive or semi-active IoT instruction. That is, the passive or semi-active IoT instruction is encapsulated into the first packet by using the second protocol. The first packet includes the passive or semi-active IoT instruction.

1207: The access network device determines that the first packet needs to be processed by using the second protocol.

In this embodiment, the access network device determines, based on the first information, that the first packet needs to be processed by using the second protocol.

A specific processing method is similar to operation 1006, and details are not described herein again.

It should be noted that operation 1207 is an optional operation. When operation 1207 is not performed, operation 1208 is performed after operation 1206.

1208: The access network device processes the first packet by using the second protocol, to obtain first intermediate data.

Operation 1208 is similar to operation 1006, and details are not described herein again.

1209: The RAN performs a passive or semi-active IoT operation based on the first intermediate data, and obtains a response to the passive or semi-active IoT instruction.

Operation 1209 is similar to operation 1007, and details are not described herein again.

1210: The RAN sends a third packet to the AMF, where the third packet includes the response to the passive or semi-active IoT instruction.

In an embodiment, after performing the passive or semi-active IoT operation and obtaining the response to the passive or semi-active IoT instruction, the RAN sends the response to the passive or semi-active IoT instruction to the AMF by using the third packet.

In an embodiment, the third packet may be the N1 P-IoT (or N1 Passive IoT) transport message (also referred to as an uplink NAS transport message, UL NAS Transport), or may be the N2 P-IoT (or N2 Passive IoT) transport message. If the RAN sends the response to the passive or semi-active IoT instruction to the AMF by using the N1 P-IoT (or N1 Passive IoT) transport, a container type of the N1 P-IoT (or N1 Passive IoT) transport message is second protocol transport, to indicate the AMF that the message is related to the passive or semi-active internet of things, and that the message needs to be sent to the first network element. Similarly, the RAN may alternatively send the response to the passive or semi-active IoT instruction to the AMF by using the N2 P-IoT (or N2 Passive IoT) transport message, to indicate the AMF that the N2 message is related to the passive or semi-active internet of things, and that the N2 message needs to be forwarded to the first network element.

The third packet includes second information. The second information includes a container type of the third packet or an information type of the third packet.

Specifically, the container type of the third packet is the N1 P-IoT (or N1 Passive IoT) transport. Alternatively, the container type of the third packet is the N2 P-IoT (or N2 Passive IoT) transport. The information type of the third packet may be "passive IoT information", "P-IoT information", "LLRP information", or the like.

The container type or the information type indicates that the third packet is related to the passive or semi-active internet of things, or that the third packet needs to be processed by using the second protocol. It should be noted that the container type or the information type is merely an example for description, and does not limit a name of the container type or the information type.

The container (the "N1 P-IoT (or N1 Passive IoT) transport" container or the "N2 P-IoT (or N2 Passive IoT) transport" container) includes the response to the passive or semi-active IoT instruction. That is, the response to the passive or semi-active IoT instruction is encapsulated into the third packet by using the second protocol. The third packet includes the response to the passive or semi-active IoT instruction.

1211: The AMF sends the third packet to the first network element.

In an embodiment, after receiving the third packet sent by the RAN, the AMF learns that the third packet needs to be forwarded to the first network element, and that the third packet may be sent to the first network element through the service-based interface. A service-based interface message may be a newly defined message, for example, "Nx_PIoT_Delivery", where x indicates a name of the newly defined service-based interface. This is not limited in this application. The service-based interface message includes the SUFI established by the RAN as a proxy and the third packet.

1212: The first network element sends the response to the passive or semi-active IoT instruction to the passive or semi-active IoT server.

In an embodiment, based on the second information included in the third packet, the first network element determines to parse the message by using the second protocol, where the message is, for example, "Nx_PIoT_Delivery" (the third packet), to obtain the response to the passive or semi-active IoT instruction. Then, the first network element processes the response to the passive or semi-active IoT instruction by using the first protocol, to generate a fourth packet. Next, the first network element sends the fourth packet to the passive or semi-active IoT server. The fourth packet includes the response to the passive or semi-active IoT instruction.

In an embodiment of this application, the passive or semi-active IoT instruction and the response to the passive or semi-active IoT instruction are transmitted by using the control plane channel. Based on a message type, an information type, a container type, or a service-based interface, a control plane network element (or a network function) determines that the message is related to the passive or semi-active IoT operation, and that the message needs to be processed by using the second protocol. The control plane network element (or the network function) learns that the message from the RAN needs to be forwarded to the first network element. According to the foregoing solutions, a packet transmission problem in a scenario in which a passive or semi-active IoT system is converged with a cellular network is resolved. In this way, the cellular network can parse a passive or semi-active IoT application packet, and a network function (or a network element) deployed in the cellular network can perform a related operation based on the application packet.

Figure 13A:
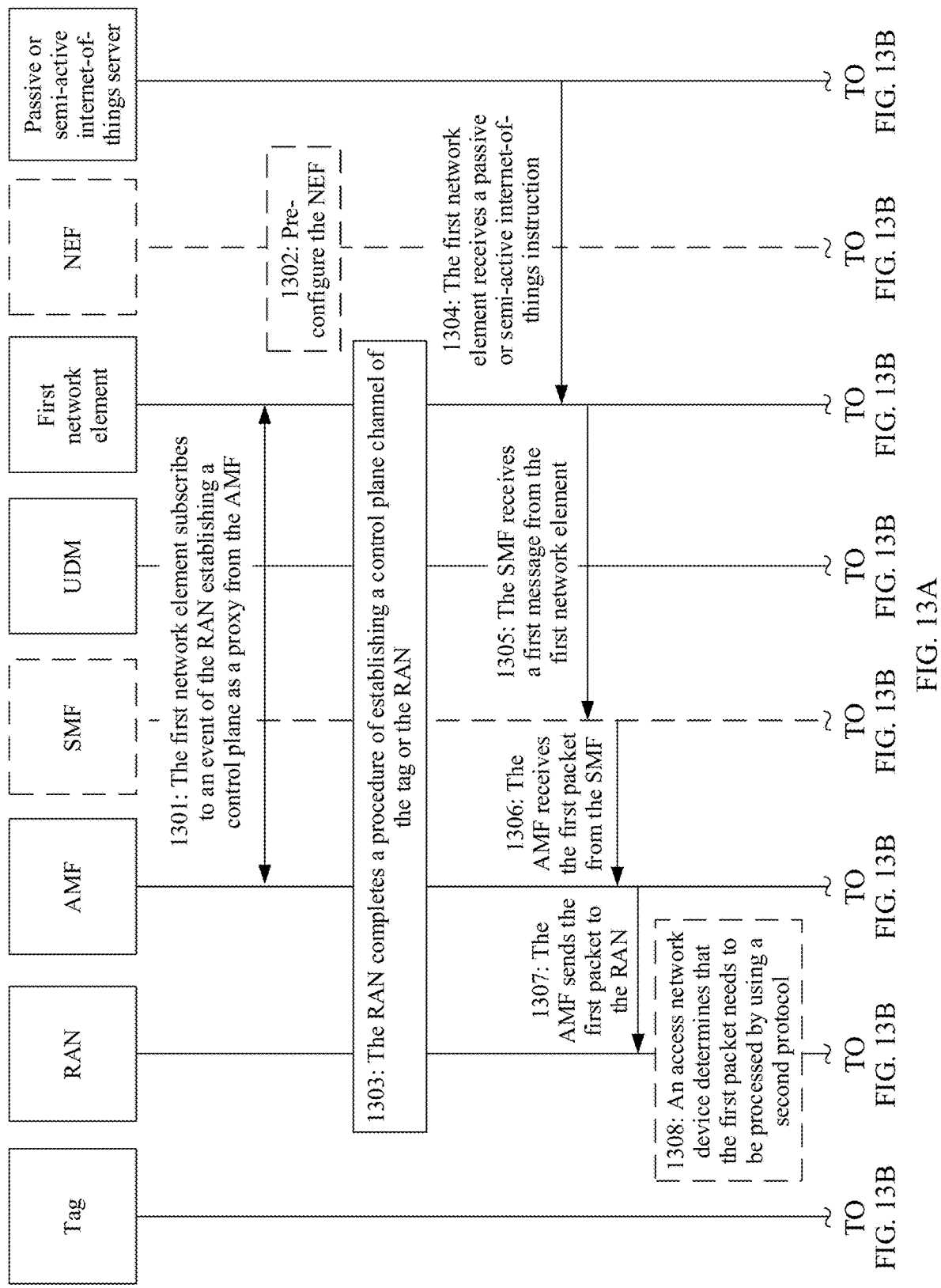
FIG. 13A and FIG. 13B are a schematic flowchart of another embodiment of a packet transmission method according to an embodiment of this application.
Figure 13B:
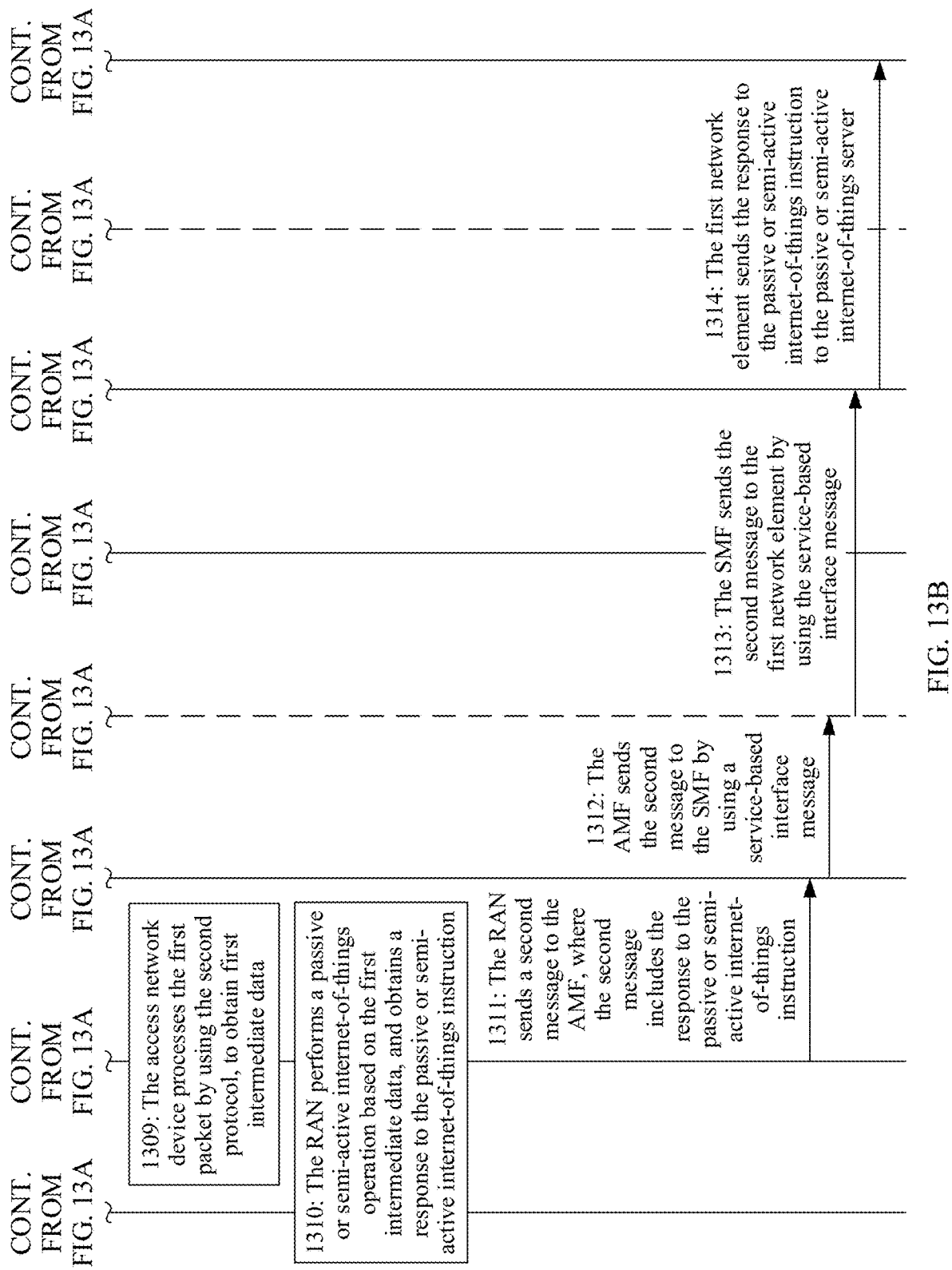

Next, an architecture shown in FIG. 7b is used as an example to describe another embodiment provided in this application. Specifically, refer to FIG. 13A and FIG. 13B. FIG. 13A and FIG. 13B are a schematic flowchart of another embodiment of a packet transmission method according to an embodiment of this application. The packet transmission method provided in this embodiment of this application includes the following operations.

1301: A first network element subscribes to an event of a RAN establishing a control plane as a proxy from an AMF.

1302: Pre-configure an NEF.

1303: The RAN completes a procedure of establishing a control plane channel of a tag or the RAN.

1304: The first network element receives a passive or semi-active IoT instruction.

Operations 1301 to 1304 are similar to operations 1201 to 1204, and details are not described herein again.

1305: An SMF receives a first packet from the first network element.

In this embodiment, the first packet includes an SUFI established by the RAN as a proxy, and the passive or semi-active IoT instruction. A second packet is a service-based interface message. For example, the service-based interface message is "Nsmf_PIoT_Command".

1306: The AMF receives the first packet from the SMF.

In an embodiment, after receiving the first packet, the SMF determines that the first packet is related to a passive or semi-active internet of things. Therefore, the SMF needs to forward, to the AMF, the passive or semi-active IoT instruction included in the first packet.

The SMF may send the first packet to the AMF by using a service-based interface message Namf_Communication_N1N2MessageTransfer. The first packet includes the SUFI established by the RAN as a proxy, and a payload container (Payload container) or an information type.

Specifically, a container type included in the first packet is N1 P-IoT (or N1 Passive IoT) transport. Alternatively, the container type included in the first packet is N2 P-IoT (or N2 Passive IoT) transport.

The information type of the first packet may be "passive IoT information", "P-IoT information", "LLRP information", or the like.

The container type or the information type indicates that the first packet is related to the passive or semi-active internet of things. It should be noted that the container type or the information type is merely an example for description, and does not limit a name of the container type or the information type.

The container includes the passive or semi-active IoT instruction. That is, the passive or semi-active IoT instruction is encapsulated into the first packet by using a second protocol.

1307: The AMF sends the first packet to the RAN.

1308: The RAN determines that the first packet needs to be processed by using the second protocol.

1309: The RAN processes the first packet by using the second protocol, to obtain first intermediate data.

1310: The RAN performs a passive or semi-active IoT operation based on the first intermediate data, and obtains a response to the passive or semi-active IoT instruction.

1311: The RAN sends a third packet to the AMF, where the third packet includes the response to the passive or semi-active IoT instruction.

Operations 1307 to 1311 are similar to operations 1206 to 1210, and details are not described herein again.

1312: The AMF sends the third packet to the SMF.

In an embodiment, the AMF may send the third packet to the SMF by using the service-based interface message. For example, the service-based interface message is "Nsmf_PIoT_report". The service-based interface message indicates the SMF that the message includes the response to the passive or semi-active IoT instruction and needs to be processed by using the second protocol.

The third packet includes the second information. Specifically, the third packet includes the second information. The second information includes a container type of the third packet or an information type of the third packet.

Specifically, the container type of the third packet is the N1 P-IoT (or N1 Passive IoT) transport. Alternatively, the container type of the third packet is the N2 P-IoT (or N2 Passive IoT) transport. The information type of the third packet may be "passive IoT information", "P-IoT information", "LLRP information", or the like.

The container type or the information type indicates that the third packet is related to the passive or semi-active internet of things, or that the third packet needs to be processed by using the second protocol. It should be noted that the container type or the information type is merely an example for description, and does not limit a name of the container type or the information type.

The container (the "N1 P-IoT (or N1 Passive IoT) transport" container or the "N2 P-IoT (or N2 Passive IoT) transport" container) includes the response to the passive or semi-active IoT instruction. That is, the response to the passive or semi-active IoT instruction is encapsulated into the third packet by using the second protocol. The third packet includes the response to the passive or semi-active IoT instruction.

1313: The SMF sends the third packet to the first network element.

In an embodiment, the SMF may send the third packet to the first network element by using the service-based interface message. For example, the service-based interface message is "Nx_RFID_report". The service-based interface message indicates the first network element that the message includes the third packet (the response to the passive or semi-active IoT instruction) and needs to be processed by using the second protocol.

1314: The first network element sends the response to the passive or semi-active IoT instruction to a passive or semi-active IoT server.

In this embodiment, the first network element parses the service-based interface message (the third packet) by using the second protocol, to obtain the response to the passive or semi-active IoT instruction. Then, the first network element processes the response to the passive or semi-active IoT instruction by using the first protocol, to generate a fourth packet. Next, the first network element sends the fourth packet to the passive or semi-active IoT server. The fourth packet includes the response to the passive or semi-active IoT instruction.

In an embodiment of this application, the passive or semi-active IoT instruction and the response to the passive or semi-active IoT instruction are transmitted by using the control plane channel. Based on a message type, an information type, a container type, or a service-based interface, a control plane network element (or a network function) determines that the message is related to the passive or semi-active IoT operation, and that the message needs to be processed by using the second protocol. The control plane network element (or the network function) learns that the message from the RAN needs to be forwarded to the first network element. According to the foregoing solutions, a packet transmission problem in a scenario in which a passive or semi-active IoT system is converged with a cellular network is resolved. In this way, the cellular network can parse a passive or semi-active IoT application packet, and a network function (or a network element) deployed in the cellular network can perform a related operation based on the application packet.

The foregoing mainly describes the solutions provided in embodiments of this application from the perspective of the methods. It may be understood that, to implement the foregoing functions, a communication apparatus includes corresponding hardware structures and/or software modules for performing the functions. A person skilled in the art should be easily aware that, in combination with example modules and algorithm operations described in embodiments disclosed in this specification, this application can be implemented by using hardware or a combination of hardware and computer software. Whether a function is performed by hardware or hardware driven by computer software depends on a particular application and a design constraint of technical solutions. A person skilled in the art may use different methods to implement the described functions for each particular application, but it should not be considered that the embodiment goes beyond the scope of this application.

In embodiments of this application, the communication apparatus may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

Figure 14:
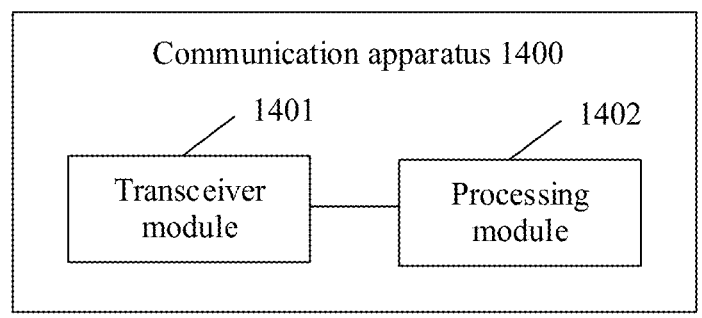
FIG. 14 is a schematic diagram of an embodiment of a communication apparatus according to an embodiment of this application.

The following describes in detail a communication apparatus in this application. FIG. 14 is a schematic diagram of an embodiment of a communication apparatus according to an embodiment of this application. The communication apparatus may be deployed in a network device (an access network device) or a chip system. The communication apparatus 1400 includes a transceiver module 1401 and a processing module 1402. The communication apparatus 1400 may be configured to perform operations performed by the access network device in FIG. 9b to FIG. 13B. For details, refer to related descriptions in the foregoing method embodiments.

Specifically, the transceiver module 1401 is configured to receive a first packet from an IoT function network element.

The transceiver module 1401 is further configured to obtain first information, where the first information indicates that the first packet includes a passive or semi-active IoT instruction.

The processing module 1402 is configured to perform a passive or semi-active IoT operation based on the first packet.

In an embodiment, the communication apparatus is a network device. In an embodiment, the processing module 1402 may be a processor, and the transceiver module 1401 may be a transceiver.

In another embodiment, the network device is a chip, a chip system, or a circuit configured in the network device. The processing module 1402 may be a processor, a processing circuit, a logic circuit, or the like. The transceiver module 1401 may be an input and/or output interface, an interface circuit, an output circuit, an input circuit, a pin, a related circuit, or the like on the chip, the chip system, or the circuit. Optionally, the foregoing "receive" may also be understood as "input".

In an embodiment, the first information includes one or more of the following: a message type of the first packet, a container type of the first packet, or tunnel identifier information of the first packet. Alternatively, the first information is an information type of the first packet.

In an embodiment, the processing module 1402 is further configured to process the first packet based on the first information by using a second protocol, to obtain the passive or semi-active IoT instruction.

In an embodiment, the transceiver module 1401 is further configured to obtain a response to the passive or semi-active IoT instruction.

The processing module 1402 is further configured to process the response to the passive or semi-active IoT instruction by using the second protocol, to generate a third packet.

The transceiver module 1401 is further configured to send the third packet to the IoT function network element.

In an embodiment, the transceiver module 1401 is further configured to send second information to the IoT function network element. The second information indicates that the third packet is related to a passive or semi-active internet of things, or that the third packet needs to be processed by using the second protocol.

In an embodiment, the second information includes one or more of the following: a message type of the third packet, a container type of the third packet, or tunnel identifier information of the third packet. Alternatively, the second information is an information type of the third packet.

In an embodiment, the transceiver module 1401 is further configured to send a request message, where the request message is for establishing the first session.

The session type of the first session is the passive or semi-active internet of things, or the session identifier of the first session indicates that the first session is related to the passive or semi-active internet of things.

The transceiver module 1401 is further configured to receive, by using the first session, the first packet sent by the IoT function network element.

In an embodiment, the transceiver module 1401 is further configured to send the third packet to the IoT function network element by using the first session.

In an embodiment, the first information further includes the session type of the first session or the session identifier of the first session.

In an embodiment, the second information further includes the session type of the first session or the session identifier of the first session.

In an embodiment, the IoT function network element includes: a UPF, an AMF, an SMF, an NRF, or a first network element.

Figure 15:
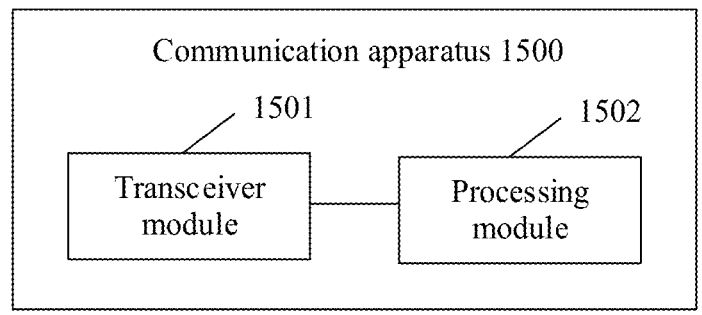
FIG. 15 is a schematic diagram of an embodiment of a communication apparatus according to an embodiment of this application.

The following describes in detail another communication apparatus in this application. FIG. 15 is a schematic diagram of an embodiment of a communication apparatus according to an embodiment of this application. The communication apparatus 1500 may be deployed in a chip system. The communication apparatus 1500 includes a transceiver module 1501 and a processing module 1502. The communication apparatus 1500 may be configured to perform operations performed by the IoT functional unit in FIG. 9b to FIG. 13B. For details, refer to related descriptions in the foregoing method embodiments.

The transceiver module 1501 is configured to send a first packet to an access network device, where the first packet includes a passive or semi-active IoT instruction.

The transceiver module 1501 is further configured to send first information to the access network device. The first information indicates that the first packet includes the passive or semi-active IoT instruction, to enable the access network device to perform a passive or semi-active IoT operation.

In an embodiment, the transceiver module 1501 is further configured to receive a second packet from a passive or semi-active IoT server.

The processing module 1502 is configured to generate the first packet based on the second packet. The first packet includes the passive or semi-active IoT instruction included in the second packet.

The transceiver module 1501 is further configured to send the first packet to the access network device.

In an embodiment, the communication apparatus is a network device. In an embodiment, the processing module 1502 may be a processor, and the transceiver module 1501 may be a transceiver.

In another embodiment, the network device is a chip, a chip system, or a circuit configured in the network device. The processing module 1502 may be a processor, a processing circuit, a logic circuit, or the like. The transceiver module 1501 may be an input and/or output interface, an interface circuit, an output circuit, an input circuit, a pin, a related circuit, or the like on the chip, the chip system, or the circuit. Optionally, the foregoing "receive" may also be understood as "input".

In an embodiment, the processing module 1502 is configured to process the second packet by using a first protocol, to generate first intermediate data.

The processing module 1502 is configured to process the first intermediate data by using a second protocol, to generate the first packet.

In an embodiment, the transceiver module 1501 is configured to send the second packet to the first network element.

The transceiver module 1501 is configured to receive second intermediate data sent by the first network element. The second intermediate data is data obtained by the first network element processing the second packet by using the first protocol and the second protocol.

The processing module 1502 is configured to process the second intermediate data, to generate the first packet.

In an embodiment, the transceiver module 1501 is further configured to receive a third packet from the access network device.

The transceiver module 1501 is further configured to obtain second information. The second information indicates that the third packet is related to a passive or semi-active internet of things, or that the third packet needs to be processed by using the second protocol.

The processing module 1502 is further configured to determine, based on the second information, to process the third packet by using the second protocol, to generate a fourth packet.

The third packet and the fourth packet include responses to the passive or semi-active IoT instruction obtained by the access network device.

In an embodiment, the processing module 1502 is further configured to generate the first packet based on the second packet according to a first rule and/or a second rule.

The first rule and/or the second rule are/is configured by a session management function SMF, or the first rule and/or the second rule are/is pre-configured in a user plane function.

In an embodiment, the second rule includes a forwarding action rule, and the first rule includes a packet detection rule.

In an embodiment, the transceiver module 1501 is further configured to send the first packet to the access network device by using a first session. A session type of the first session is the passive or semi-active internet of things. Alternatively, a session identifier of the first session indicates that the first session is related to the passive or semi-active internet of things.

In an embodiment, the second information further includes the session type of the first session or the session identifier of the first session.

In an embodiment, the transceiver module 1501 is further configured to send a subscription request to the second network element. The subscription request is used to obtain information about the access network device.

The information about the access network device includes one or more pieces of the following information: a permanent identifier of the access network device, information about a core network element that serves the access network device, and reader identifier information of the access network device.

The second network element includes one or more of the following: an AMF, the SMF, a UDM, or an NRF.

In an embodiment, the IoT function network element includes: a UPF, an AMF, an SMF, an NRF, or a first network element.

In an embodiment, the first information includes one or more of the following: a message type of the first packet, a container type of the first packet, tunnel identifier information of the first packet, or an information type of the first packet.

In an embodiment, the second information includes one or more of the following: a message type of the third packet, a container type of the third packet, tunnel identifier information of the third packet, or an information type of the third packet.

Figures 1, 10A:
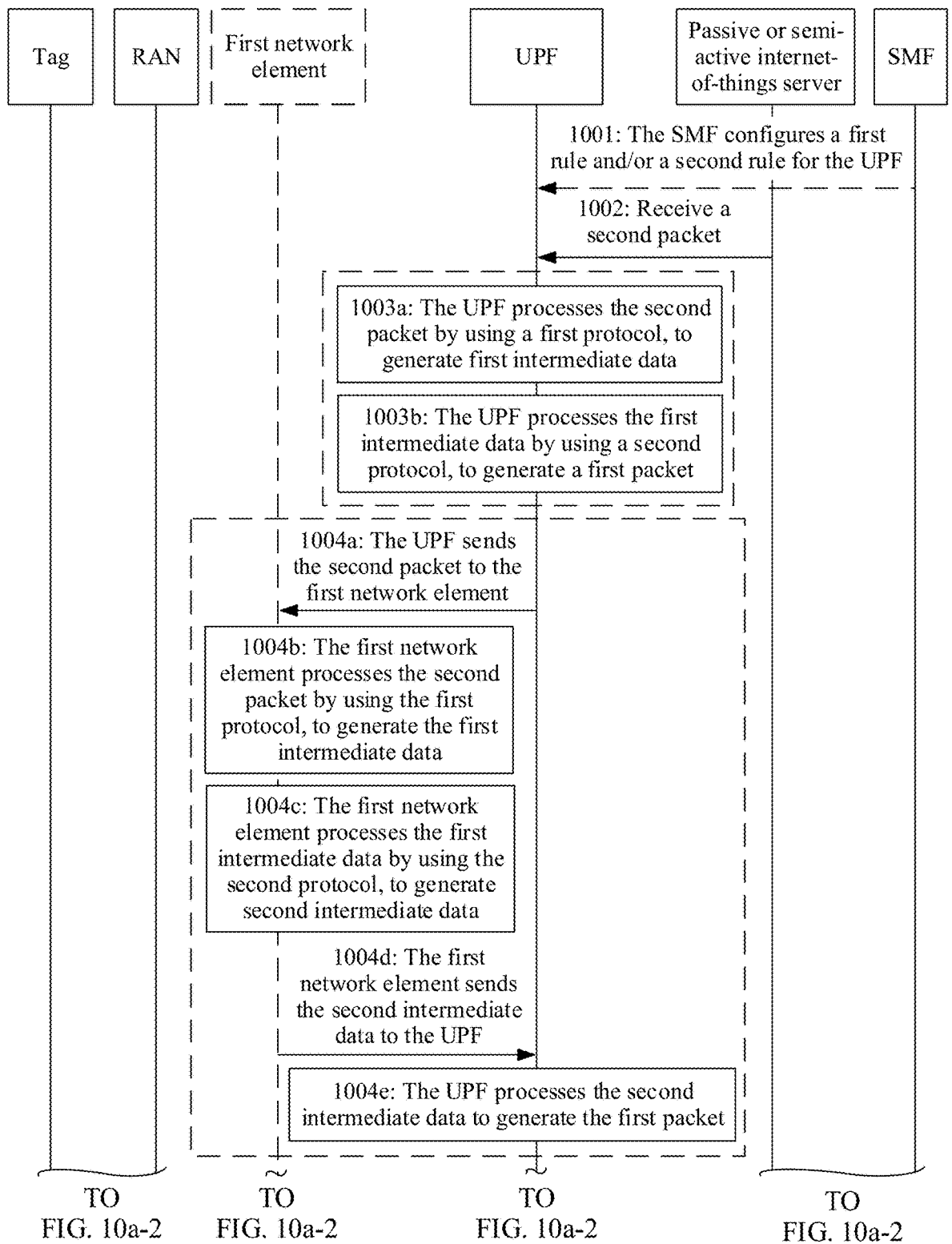
Figures 2, 10A:
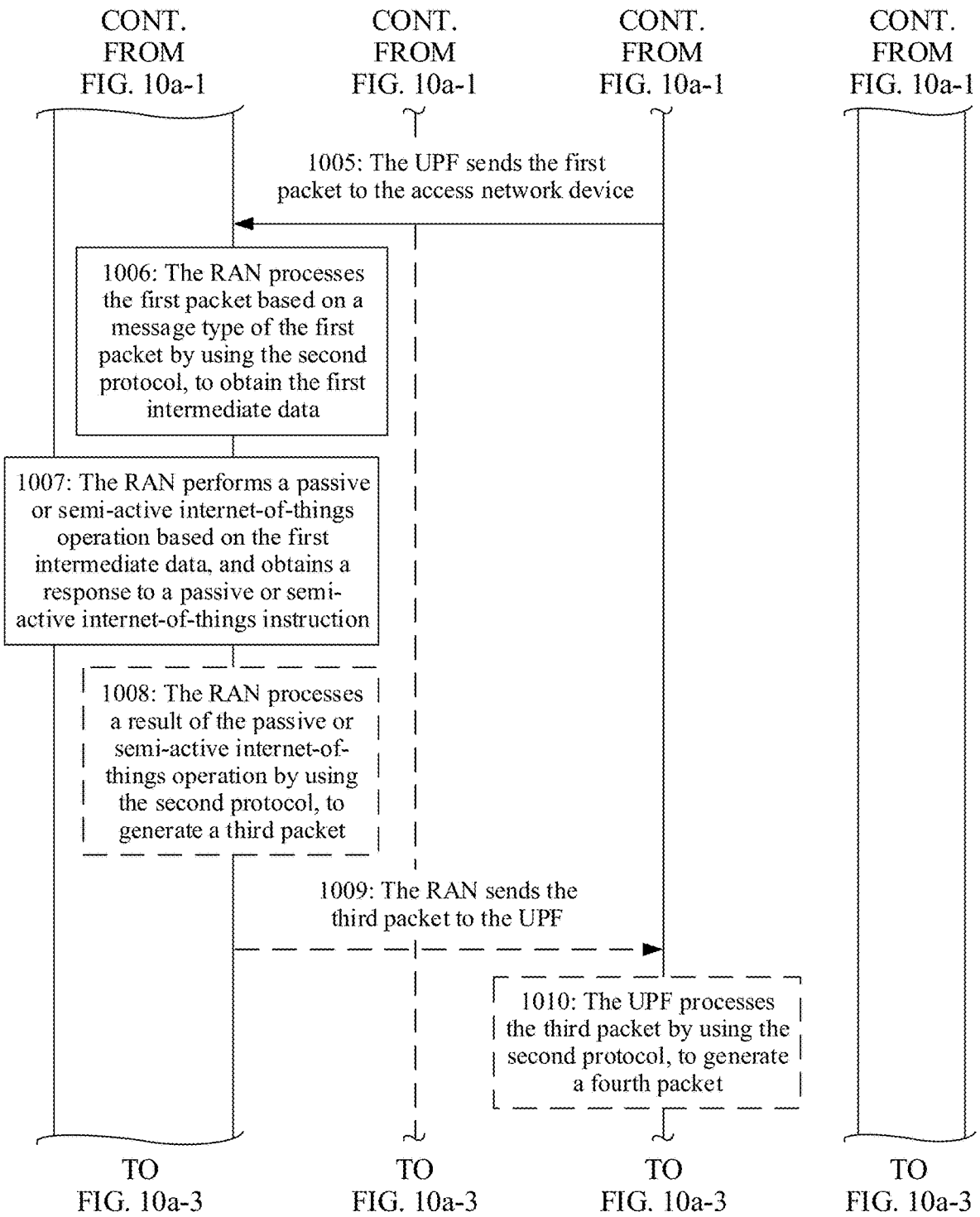
Figures 3, 10A:
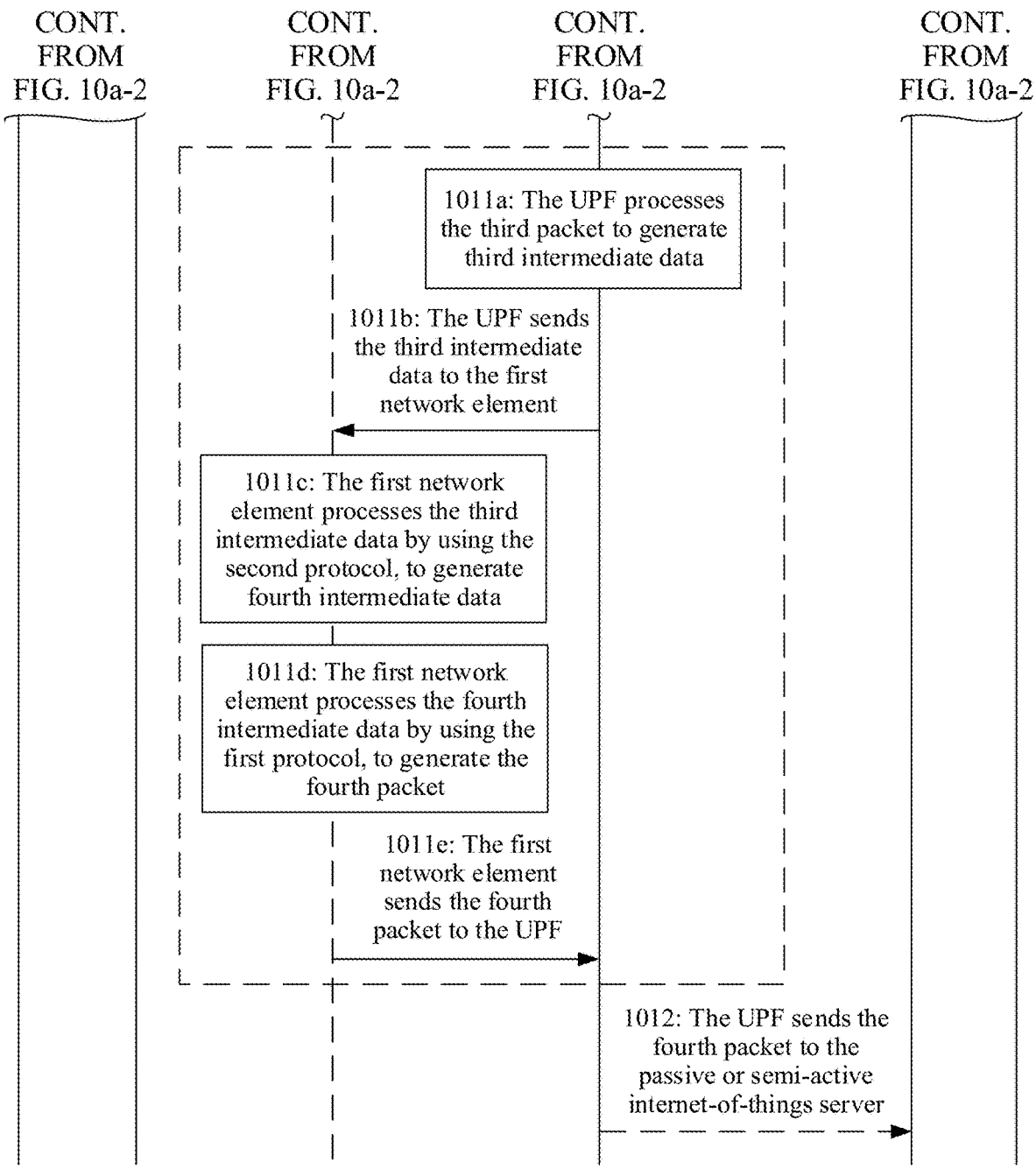
Figure 10B:
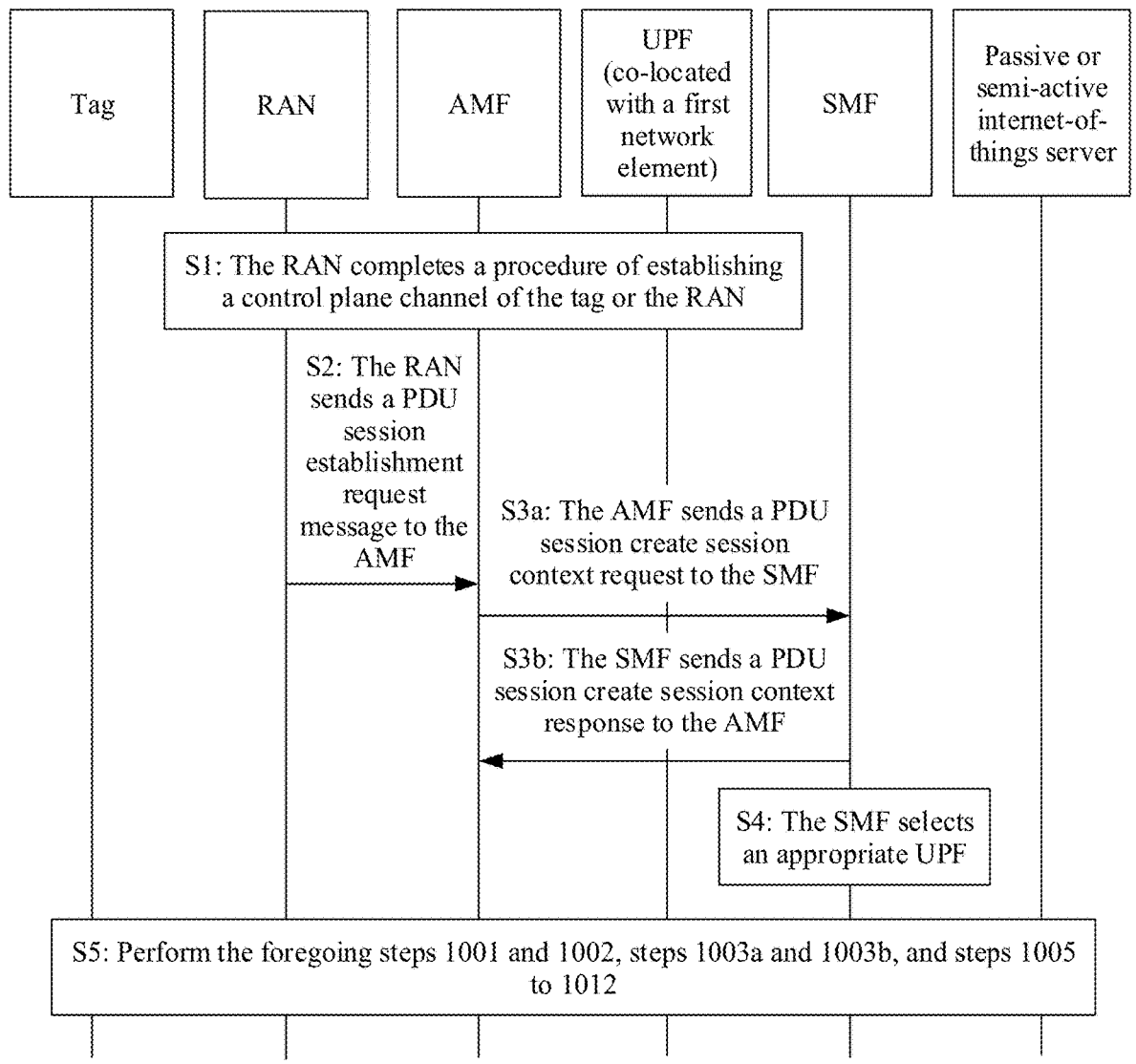
FIG. 10b is a schematic flowchart of a packet transmission method in an application scenario according to an embodiment of this application.
Figure 10C:
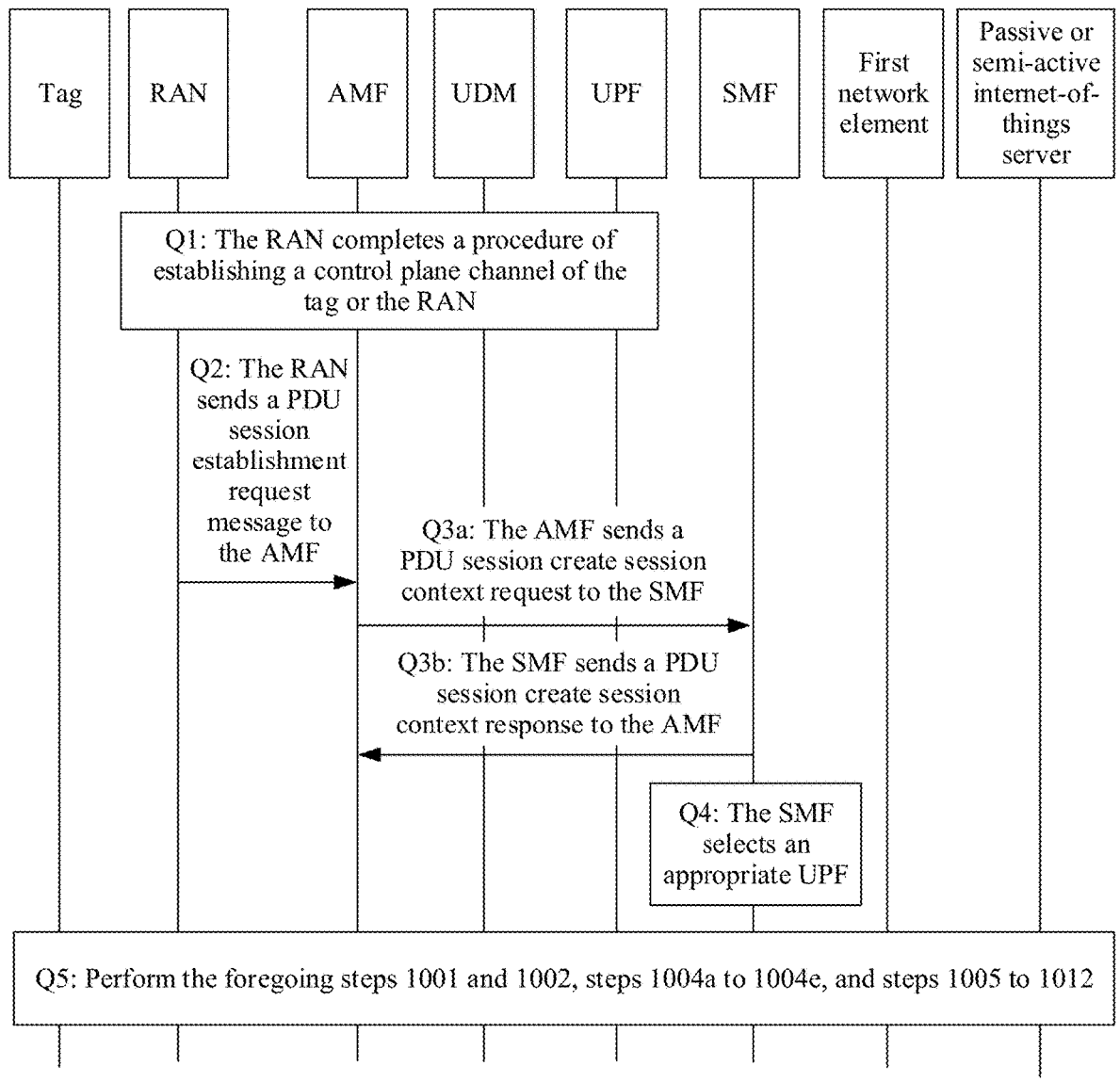
FIG. 10c is a schematic flowchart of a packet transmission method in an application scenario according to an embodiment of this application.

It should be noted that, for a specific embodiment of the communication apparatus and beneficial effects brought by the communication apparatus, refer to descriptions in the method embodiments corresponding to FIG. 10a-1 to FIG. 13B. Details are not described herein again.

An embodiment of this application further provides a processing apparatus. The processing apparatus includes a processor and an interface. The processor is configured to perform the packet transmission method in any one of the foregoing method embodiments.

It should be understood that the processing apparatus may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor and exist independently.

Herein, "implemented by using hardware" means that a function of the foregoing module or unit is implemented through a hardware processing circuit that does not have a function of processing program instructions. The hardware processing circuit may include a discrete hardware component, or may be an integrated circuit. To reduce power consumption and a size, an integrated circuit is usually used for implementation. The hardware processing circuit may include an ASIC or a PLD (programmable logic device). The PLD may further include an FPGA, a CPLD (complex programmable logic device), and the like. These hardware processing circuits may be an independently packaged semiconductor chip (for example, packaged into an ASIC), or may be integrated with another circuit (such as a CPU or a DSP) and then packaged into a semiconductor chip. For example, a plurality of hardware circuits and CPUs may be formed on one silicon base, and are independently packaged into a chip, where the chip is also referred to as a SoC; or a circuit that is configured to implement an FPGA function and a CPU may be formed on a silicon base, and are independently packaged into a chip, where the chip is also referred to as a SoPC (system on a programmable chip).

This application further provides a communication system, including at least one or more of the foregoing communication apparatuses.

An embodiment of this application further provides a computer-readable storage medium, including instructions. When the instructions are run on a computer, the computer controls the communication apparatus to perform any implementation shown in the foregoing method embodiments.

An embodiment of this application further provides a computer program product. The computer program product includes computer program code. When the computer program code is run on a computer, the computer performs any implementation shown in the foregoing method embodiments.

An embodiment of this application further provides a chip system, including a memory and a processor. The memory is configured to store a computer program, and the processor is configured to invoke the computer program from the memory and run the computer program, so that a chip performs any implementation shown in the foregoing method embodiments.

An embodiment of this application further provides a chip system, including a processor. The processor is configured to invoke and run a computer program, so that a chip performs any implementation shown in the foregoing method embodiments.

In addition, it should be noted that the apparatus embodiments described above are merely an example. The units described as separate parts may or may not be physically separate, and parts displayed as units may or may not be physical units, may be located in one place, or may be distributed on a plurality of network units. Some or all of the modules may be selected based on an actual requirement, to achieve objectives of the solutions in embodiments. In addition, in the accompanying drawings of the apparatus embodiments provided in this application, a connection relationship between modules indicates that the modules have a communication connection with each other, and may be implemented as one or more communication buses or signal cables.

Based on the description of the foregoing embodiments, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Usually, any function implemented by a computer program may be easily implemented by using corresponding hardware. In addition, specific hardware structures used to implement a same function may be various, for example, an analog circuit, a digital circuit, or a dedicated circuit. However, in this application, a software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device to perform the methods in embodiments of this application.

All or some of the foregoing embodiments may be implemented by using software, hardware, firmware, or any combination thereof. When software is used to implement embodiments, the foregoing embodiments may be implemented completely or partially in a form of a computer program product.

The computer program product includes one or more computer instructions. When the computer program instructions are loaded and executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, communication apparatus, computing device, or data center to another web site, computer, communication apparatus, computing device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a communication apparatus or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

It should be understood that "one embodiment" or "an embodiment" mentioned throughout this specification means that particular features, structures, or characteristics related to the embodiment are included in at least one embodiment of this application. Therefore, "in one embodiment" or "in an embodiment" appearing throughout this specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm operations can be implemented by electronic hardware, computer software, or a combination thereof. To clearly describe the interchangeability between the hardware and the software, the foregoing has generally described compositions and operations of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be indirect couplings or communication connections by using some interfaces, apparatuses, or units, and may also be connection in electrical, mechanical, or other forms.

The units described as separate parts may or may not be physically separate, and parts displayed as units may or may not be physical units, may be located in one place, or may be distributed on a plurality of network units. Some or all of the units may be selected based on an actual requirement to achieve the objectives of the solutions of the embodiments.

In addition, the functional units in embodiments of this application may be integrated into one processing unit, or each of the units may exist alone physically, or two or more units are integrated into one unit. The above integrated unit may be implemented either in the form of hardware or in the form of software functional units.

When the integrated unit is implemented in the form of a software functional unit and sold or used as an independent product, the integrated unit may be stored in a computer-readable storage medium. Based on such an understanding, technical solutions of this application essentially, or a part contributing to a conventional technology, or all or some of the technical solutions may be implemented in a form of a software product. The computer software product is stored in a storage medium and includes a plurality of instructions for instructing a computer device (which may be a personal computer, a server, or a network device) to perform all or some of the operations of the methods described in embodiments of this application.

What is claimed is:

1. A method for transmitting packets, comprising:
receiving, by an access network device, a first packet from an Internet-of-things (IoT) function network element; wherein the IoT function network element sends the first packet to the access network device;
receiving, at the access network device from the IoT function network element, the first packet using a first session, wherein a session type of the first session is a passive or semi-active internet of things, or a session identifier of the first session indicates that the first session is related to the passive or semi-active internet of things;
obtaining, by the access network device, first information indicating that the first packet comprises a passive or semi-active IoT instruction, wherein the first information comprises the session type of the first session for transmitting the first packet, or the session identifier of the first session; and
performing, by the access network device, a passive or semi-active IoT operation based on the first packet, wherein performing the passive or semi-active IoT operation based on the first packet comprises:
processing, by the access network device, the first packet based on the first information by using a second protocol, to obtain the passive or semi-active IoT instruction.

2. The method according to claim 1, wherein the first information comprises one or more of the following:
a message type of the first packet;
a container type of the first packet;
tunnel identifier information of the first packet; or
an information type of the first packet.

3. The method according to claim 1, further comprising:
obtaining, by the access network device, a response to the passive or semi-active IoT instruction;

processing, by the access network device, the response to the passive or semi-active IoT instruction by using the second protocol, to generate a third packet; and sending, by the access network device, the third packet to the IoT function network element.

4. The method according to claim 3, further comprising:
sending, by the access network device, second information to the IoT function network element, wherein the second information indicates that the third packet is related to the passive or semi-active internet of things, or that the third packet needs to be processed by using the second protocol.

5. The method according to claim 4, wherein the second information comprises one or more of the following: a message type of the third packet, a container type of the third packet, tunnel identifier information of the third packet, or an information type of the third packet.

6. The method according to claim 4, wherein the second information comprises one or more of the following:
the session type of the first session or the session identifier of the first session, wherein the first session is used to transmit the third packet, the session type of the first session is the passive or semi-active internet of things, and the session identifier of the first session indicates that the first session is related to the passive or semi-active internet of things.

7. The method according to claim 3, further comprising:
sending, by the access network device, a request message for establishing the first session, wherein
the session type of the first session is the passive or semi-active internet of things, or the session identifier of the first session indicates that the first session is related to the passive or semi-active internet of things; and
receiving the first packet from the IoT function network element comprises:
receiving, by the access network device by using the first session, the first packet sent by the IoT function network element.

8. The method according to claim 7, wherein sending the third packet to the IoT function network element comprises:
sending, by the access network device, the third packet to the IoT function network element by using the first session.

9. The method according to claim 1, wherein the IoT function network element comprises: a user plane function (UPF), an access and mobility management function (AMF), a session management function (SMF), a network repository function (NRF), or a first network element.

10. A method for transmitting packets, comprising:
sending, by an Internet-of-things (IoT) function network element, a first packet to an access network device, wherein the first packet comprises a passive or semi-active IoT instruction;
sending, by the IoT function network element, first information to the access network device, wherein the first information indicates that the first packet comprises the passive or semi-active IoT instruction, to enable the access network device to perform a passive or semi-active IoT operation, wherein the IoT function network element sends the first packet to the access network device, wherein performing the passive or semi-active IoT operation based on the first packet comprises:
processing the first packet based on the first information by using a second protocol, to obtain the passive or semi-active IoT instruction; and sending, by the IoT function network element, the first packet to the access network device using a first session, wherein a session type of the first session is the passive or semi-active internet of things, or a session identifier of the first session indicates that the first session is related to the passive or semi-active internet of things.

11. The method according to claim 10, wherein sending a first packet to the access network device comprises:
receiving, by the IoT function network element, a second packet from a passive or semi-active IoT server;
generating, by the IoT function network element, the first packet based on the second packet, wherein the first packet comprises the passive or semi-active IoT instruction comprised in the second packet; and
sending, by the IoT function network element, the first packet to the access network device.

12. The method according to claim 11, wherein generating the first packet based on the second packet comprises:
processing, by the IoT function network element, the second packet by using a first protocol, to generate first intermediate data; and
processing, by the IoT function network element, the first intermediate data by using the second protocol, to generate the first packet.

13. The method according to claim 12, wherein generating the first packet based on the second packet comprises:
sending, by the IoT function network element, the second packet to a first network element;
receiving, by the IoT function network element, second intermediate data sent by the first network element, wherein the second intermediate data is obtained by the first network element processing the second packet by using the first protocol and the second protocol; and
processing, by the IoT function network element, the second intermediate data, to generate the first packet.

14. The method according to claim 12, further comprising:
receiving, by the IoT function network element, a third packet from the access network device;
obtaining, by the IoT function network element, second information, wherein the second information indicates that the third packet is related to a passive or semi-active internet of things, or that the third packet needs to be processed by using the second protocol; and
processing, by the IoT function network element, the third packet based on the second information by using the second protocol, to generate a fourth packet, wherein
the third packet and the fourth packet comprise responses to the passive or semi-active IoT instruction.

15. The method according to claim 11, wherein the IoT function network element is a user plane function; and
generating the first packet based on the second packet comprises:
generating, by the user plane function, the first packet based on the second packet according to a first rule and/or a second rule, wherein
the first rule and/or the second rule are/is configured by a session management function (SMF), or the first rule and/or the second rule are/is pre-configured in the user plane function.

16. The method according to claim 15, wherein the second rule comprises a forwarding action rule, and the first rule comprises a packet detection rule.

17. A communication apparatus, comprising:
a transceiver configured to:
   receive a first packet from an Internet-of-things (IoT) function network element, wherein the IoT function network element sends the first packet to an access network device;
   receive the first packet using a first session, wherein a session type of the first session is a passive or semi-active internet of things, or a session identifier of the first session indicates that the first session is related to the passive or semi-active internet of things, and
   obtain first information, wherein the first information indicates that the first packet comprises a passive or semi-active IoT instruction, wherein the first information comprises the session type of the first session for transmitting the first packet, or the session identifier of the first session; and
a processor configured to perform a passive or semi-active IoT operation based on the first packet by processing the first packet based on the first information by using a second protocol, to obtain the passive or semi-active IoT instruction.

18. The communication apparatus of claim 17, wherein the first information comprises one or more of the following:
   a message type of the first packet;
   a container type of the first packet;
   tunnel identifier information of the first packet; or
   an information type of the first packet.

19. The communication apparatus of claim 17, wherein the IoT function network element is a user plane function; and wherein the first packet is generated based on a second packet by:
   generating, by the user plane function, the first packet based on the second packet according to a first rule and/or a second rule, wherein the first rule and/or the second rule are/is configured by a session management function (SMF), or the first rule and/or the second rule are/is pre-configured in the user plane function.

* * * * *